United States Patent
Wang et al.

(10) Patent No.: US 11,802,651 B2
(45) Date of Patent: *Oct. 31, 2023

(54) ACCESSORY FOR HANDHELD DEVICE

(71) Applicant: EVOLUTIVE LABS CO., LTD., Taipei (TW)

(72) Inventors: Ching-Fu Wang, Taipei (TW); Jui-Chen Lu, Taipei (TW); Po-Wen Hsiao, Taipei (TW); Chia-Ho Lin, Taipei (TW)

(73) Assignee: EVOLUTIVE LABS CO., LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,926

(22) Filed: Sep. 16, 2022

(65) Prior Publication Data

US 2023/0009175 A1     Jan. 12, 2023

Related U.S. Application Data

(62) Division of application No. 17/469,131, filed on Sep. 8, 2021, now Pat. No. 11,486,532.

(30) Foreign Application Priority Data

Jun. 4, 2021   (TW) .................................. 110120510

(51) Int. Cl.
*A45F 5/10*     (2006.01)
*F16M 11/04*    (2006.01)
(Continued)

(52) U.S. Cl.
CPC ............. *F16M 11/041* (2013.01); *A45F 5/00* (2013.01); *F16M 11/40* (2013.01); *F16M 13/04* (2013.01);
(Continued)

(58) Field of Classification Search
CPC .. A45F 2200/0516; A45F 5/10; F16M 11/041; F16M 11/40; F16M 13/04;
(Continued)

(56) References Cited

U.S. PATENT DOCUMENTS 8,428,664 B1    4/2013  Wyers
8,567,832 B2 *  10/2013 Kannaka ................... A45F 5/00
                                                       294/25
(Continued)

FOREIGN PATENT DOCUMENTS

CN         109008099 A    12/2018
KR       1020170031782 A   3/2017
WO         2020009795 A1   1/2020

OTHER PUBLICATIONS

Office Action, Cited References and Search Report dated Dec. 19, 2022 issued by the Office of the Controller General of Patents, Designs & Trade Marks for the India Counterpart Application No. 202224012146.

(Continued)

*Primary Examiner* — Adam J Waggenspack
(74) *Attorney, Agent, or Firm* — WPAT LAW; Anthony King

(57) ABSTRACT

The present disclosure provides an accessory for a handheld device. The accessory includes a first base, a second base, a first flexible element and a second flexible element. The first flexible element and the second flexible element are respectively disposed at the first base. The first flexible element has a first track. The second flexible element has a second track. The second base has a fastener for engaging with the first track and the second track. The first flexible element is flexed based on sliding of the fastener along the first track. The second flexible element is flexed based on sliding of the fastener along the second track.

6 Claims, 66 Drawing Sheets

(51) Int. Cl.
*A45F 5/00* (2006.01)
*F16M 11/40* (2006.01)
*F16M 13/04* (2006.01)
*H04B 1/3888* (2015.01)

(52) U.S. Cl.
CPC .... *A45F 2200/0516* (2013.01); *H04B 1/3888* (2013.01)

(58) Field of Classification Search
CPC .......... H04B 2001/3861; H04B 1/3888; A45C 2200/15; H04M 1/04
USPC ............................. 361/679.02; 224/217–218
See application file for complete search history.

(56) References Cited

U.S. PATENT DOCUMENTS

| | | | |
|---|---|---|---|
| 8,950,638 B2 | 2/2015 | Wangercyn, Jr. et al. | |
| 10,774,871 B1* | 9/2020 | Srour | F16C 11/12 |
| 10,953,535 B2* | 3/2021 | Karmatz | B25G 1/102 |
| 11,140,970 B2* | 10/2021 | Yeo | A45F 5/00 |
| 11,274,697 B2* | 3/2022 | Srour | F16F 1/428 |
| 11,486,532 B1* | 11/2022 | Wang | F16M 11/10 |
| 11,530,779 B2* | 12/2022 | Epstein | F16M 11/10 |
| 2009/0095854 A1* | 4/2009 | Forbes | G06F 1/166 248/316.1 |
| 2015/0335138 A1* | 11/2015 | Juarbe | H04M 1/04 224/218 |
| 2016/0069512 A1* | 3/2016 | Grieve | A45F 5/00 294/142 |
| 2016/0345715 A1 | 12/2016 | Lin et al. | |
| 2018/0302114 A1 | 10/2018 | Nielsen | |

OTHER PUBLICATIONS

Office Action, Cited References and Search Report dated Dec. 20, 2022 issued by the Korea Intellectual Property Office for the Korea Counterpart Application No. 10-2021-0141065.

U.S. Pat. No. 9,300,346 B2 is the US counterpart of KR 10-2017-0031782.

English translation of CN 109008099.

* cited by examiner

ACCESSORY FOR HANDHELD DEVICE

CROSS-REFERENCE TO RELATED APPLICATION

This application is a divisional of U.S. application Ser. No. 17/469,131, filed on Sep. 8, 2021. Priority is claimed based upon U.S. application Ser. No. 17/469,131, filed on Sep. 8, 2021, which claims the priority date of Taiwan patent application Ser. No. 110120510 filed on Jun. 4, 2021, all of which is hereby incorporated by reference in its entirety.

TECHNICAL FIELD

The present invention relates to a handheld device, and more particularly, to an accessory for a handheld device.

DISCUSSION OF THE BACKGROUND

Most handheld devices nowadays provide diverse entertainment functions, such as audio/video playback, electronic book display and electronic games, and users need to continually hold such devices in their hand while using the device. However, a handheld device may fall and become damaged due to carelessness when being used in a handheld manner, and the handheld device often cannot be adjusted for a most appropriate viewing angle when being used in a fixed manner. Therefore, there is a need for an additional accessory for the handheld device to overcome the above-mentioned issues.

SUMMARY

In view of the above, an objective of the present invention is to provide an accessory for improving the convenience of use of a handheld device.

Accordingly, the present invention provides an accessory for a handheld device. The accessory includes a first base, a second base, a first flexible element and a second flexible element. The first flexible element and the second flexible element are respectively disposed at the first base. The first flexible element has a first track. The second flexible element has a second track. The second base has a fastener for engaging with the first track and the second track. The first flexible element is flexed based on sliding of the fastener along the first track. The second flexible element is flexed based on sliding of the fastener along the second track.

In some embodiments, one end of the first flexible element is disposed at one end of the first base, and one end of the second flexible element is disposed at another end of the first base.

In some embodiments, the first flexible element and the second flexible element are located between the first base and the second base, and when the first base and the second base are adjoining, the first flexible element and the second flexible element are placed in an accommodating space of the second base.

In some embodiments, the accommodating space is formed at a recess of the second base, and a depth of one end of the recess is different from a depth of another end of the recess.

In some embodiments, the first flexible element and the second flexible element are located between the first base and the second base, and when the first base and the second base are adjoining, the first flexible element and the second flexible element are placed in a first accommodating space of the first base and a second accommodating space of the second base, respectively.

In some embodiments, the first accommodating space includes a first recess formed in the first base, and the second accommodating space includes a second recess formed in the second base. The second recess contains an annular projection at a periphery of the second recess, the annular projection protrudes toward the first base, and the first recess accommodates the annular projection.

In some embodiments, the first track includes a hollow portion formed in the first flexible element, and the second track includes a hollow portion formed in the second flexible element.

In some embodiments, the fastener passes through the hollow portion of the first flexible element and the hollow portion of the second flexible element so as to engage with the first track and the second track.

In some embodiments, the first track includes a hollow portion formed in the first flexible element, and the second track includes a groove formed in the second flexible element.

In some embodiments, the fastener passes through the hollow portion of the first flexible element and is inserted into the groove of the second flexible element so as to engage with the first track and the second track.

In some embodiments, the second base has a body and a baffle, the body and the baffle define a space therebetween, and the fastener is disposed at the baffle in the space.

In some embodiments, the body is provided with a hollow portion at a position corresponding to the baffle.

In some embodiments, the first track has at least one first positioning element, the second track has at least one second positioning element, and the at least one first positioning element and the at least one second positioning element are for positioning the fastener.

In some embodiments, the at least one first positioning element and the at least one second positioning element include a slot for positioning a protrusion of the fastener.

In some embodiments, the first flexible element and the second flexible element include sheet-like structures.

In some embodiments, the first base or the second base includes a long structure, and each of two lengthwise sides of the long structure has an indentation.

In some embodiments, the first base is provided with a recess for accommodating a chip.

Another aspect of the present invention provides an accessory for a handheld device. The accessory includes a first base, a second base and two flexible elements. The two flexible elements are respectively disposed on two ends of the first base, and each of the flexible elements has a track. The second base has a fastener for engaging with the tracks of the flexible elements. When a distance between the first base and the second base changes, the fastener slides along the tracks and the flexible elements are flexed.

Another aspect of the present invention provides an accessory for a handheld device. The accessory includes a first base, a second base, a first flexible element and a second flexible element. The first flexible element and the second flexible element are respectively disposed at the first base. The second base has a body and a baffle, the body and the baffle define at least one space therebetween, and the first flexible element and the second flexible element pass through the at least one space. The first flexible element and the second flexible element are flexed based on a change of a distance between the first base and the second base.

In some embodiments, the first flexible element has a fastener, the second flexible element has a track, and the track is engaged with the fastener.

In some embodiments, the at least one space includes a first space and a second space, and the first flexible element and the second flexible element respectively pass through the first space and the second space.

In some embodiments, in the at least one space, the first flexible element is located between the baffle and the second flexible element, one end of the first flexible element is disposed at the first base, another end of the first flexible element has a first fastener protruding toward the second flexible element, one end of the second flexible element is disposed at the first base, and another end of the second flexible element has a second fastener protruding toward the first flexible element.

In some embodiments, in the at least one space, the first flexible element is located between the baffle and the second flexible element, one end of the first flexible element is disposed at the first base, another end of the first flexible element has a first fastener protruding toward the baffle, one end of the second flexible element is disposed at the first base, another end of the second flexible element has a second fastener protruding toward the body, and the body has a track for engaging with the second fastener.

Another aspect of the present invention provides an accessory for a handheld device. The accessory includes a first base, a support assembly and a second base. The support assembly has a support body, a first flexible element and a second flexible element. The support body is disposed at the first base, the first flexible element is connected to one end of the support body, and the second flexible element is connected to another end of the support body. The second base has a base body and a baffle. The base body and the baffle define a space therebetween, and the first flexible element and the second flexible element pass through the space. The first flexible element and the second flexible element are flexed based on a change of a distance between the first base and the second base.

In some embodiments, the support body, the first flexible element and the second flexible element are integrally formed.

In some embodiments, the support assembly further includes a first connecting element and a second connecting element. The first connecting element covers a joint between the first flexible element and the support body, and the second connecting element covers a joint between the first flexible element and the support body.

BRIEF DESCRIPTION OF THE DRAWINGS

Embodiments are described in detail with the accompanying drawings below to better understand the present invention. It should be noted that the features of the present invention may not be drawn to scale. In fact, for the sake of clarity, sizes of the features may be increased or decreased as appropriate.

DETAILED DESCRIPTION

Figure 1A:
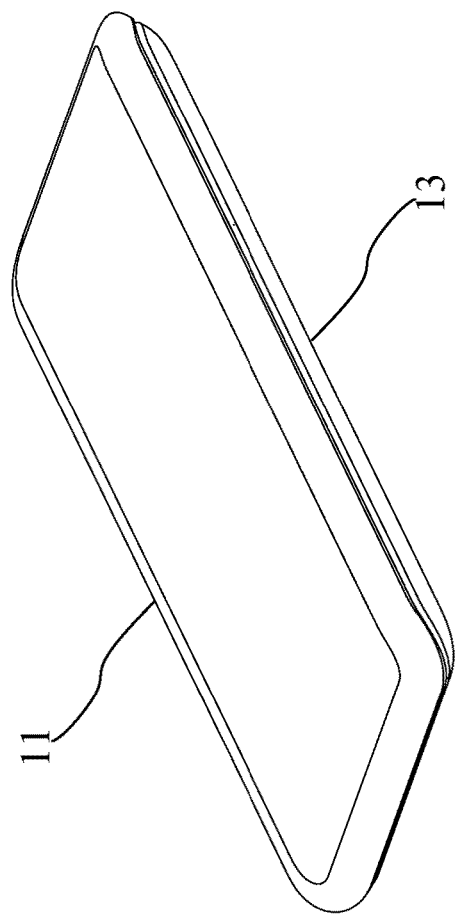
FIG. 1A is a three-dimensional diagram of an accessory according to some embodiments of the present invention.
Figure 1A:
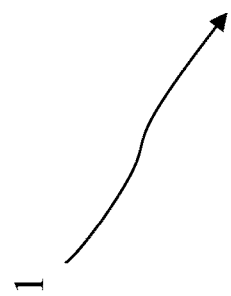

The disclosure below provides various embodiments, or examples, for implementing different features of the provided subject matter. Specific examples of components and configurations are given in the description below so as to simplify the present invention. It should be noted that the components and configurations are exemplary and are not intended to be restrictive. In the description of the present invention below, a first feature formed on or above a second feature may include embodiments in which the first feature and the second feature are formed in direct contact, and may also include embodiments in which additional features are formed between the first feature and the second feature in a way such that the first feature and the second feature may not contact directly. Moreover, numerals and/or alphabetical symbols may be repeated in the various embodiments of the present invention. Such repetition is intended for simplicity and clarity, and does not represent relations between the embodiments and/or configurations.

Embodiments of the present invention are given in detail in the description below. However, it should be understood that the present invention provides numerous applicable concepts that can be extensively embodied in diversified specific scenarios. The specific embodiments are illustrative and are not to be construed as limitations to the scope of the present invention.

Further, for better description, relative spatial terms such as "below," "under," "above," "an upper part," "a lower part," "left," "right" and the like may be used to describe the relation between one element or feature and other element(s) or features(s) as shown in the drawings. In addition to the orientation depicted in the drawings, the relative spatial terms are also intended to cover different orientations of a device in use or operation. An apparatus may be orientated by other means (rotated by 90 degrees or having another orientation), and descriptive relative spatial terms used in the disclosure may also be similarly and correspondingly interpreted. It should be understood that, when an element is "connected to" or "coupled to" another element, the element may be directly connected or coupled to the another element, or the two may be interposed with an element.

Numerical ranges and parameters for describing general ranges of the present invention are approximate values, and the values given in the specific embodiments are reported as precisely as possible. However, some values inevitably contain certain errors caused by standard errors discovered in measured values of individual tests. Moreover, the term "about" or 'approximately" used in the disclosure usually means that a value is within ±10%, ±5%, ±1% or ±0.5% of a rated value or range. Therefore, it is generally considered by a person skilled in the art that the term "about" or "approximately" means that an average value is within an acceptable standard error. Apart from operation/working embodiments, or unless otherwise specified by other means, numerical ranges, quantities, values and percentages (for example, material quantities, durations, temperatures, operating conditions, ratios of quantity and the like) disclosed herein should be understood as modified by the term "about" or "approximately" in all circumstances. Thus, unless otherwise specified, the numerical parameters given in the present invention and the appended claims may be variable approximate values. At least, the numerical parameters should be understood according to the reported numerals of effective digits by common rounding means. A range may be represented in the disclosure as from one end point to another end point or between the two end points. Unless otherwise specified, all ranges disclosed herein are inclusive of the end points. The expression "substantially coplanar" may refer to two surfaces within several microns (μm) along the same plane (for example, within 10 μm, 5 μm, 1 μm or 0.5 μm along the same plane). When numerical values or features are "substantially" the same, the term may mean that the values are within ±10%, ±5%, ±1% or ±0.5% of an average value of the values.

An accessory for a handheld device is disclosed by the present invention to improve convenience for operating a handheld device for a user. The accessory may be attached to the handheld device or a case amounting to the handheld device, and includes a first base, a second base and two flexible elements. The two flexible elements are respectively disposed on two ends of the first base, and each of the flexible elements has a track. The second base has a fastener for engaging with the tracks of the two flexible elements. When a distance between the first base and the second base changes, the fastener slides along the tracks and the flexible elements are flexed.

More specifically, when the user increases the distance between the first base and the second base, the fastener slides relative to the tracks and a first deformation occurs to each of the flexible elements. When the fastener slides to an end point of the track, the respective first deformation of the flexible elements can maintain the distance between the first base and the second base. Accordingly, the user may place the handheld device at a specific orientation by using the accessory based on the first deformation of the flexible elements (as shown in FIG. 1I, in which A1 is the accessory and A2 is the handheld device). In contrast, when the user reduces the distance between the first base and the second base, the fastener slides relative to the tracks and a second deformation occurs to each of the flexible elements. The second deformation restores the flexible elements to the original state of the flexible elements from the first deformation.

Figure 1B:
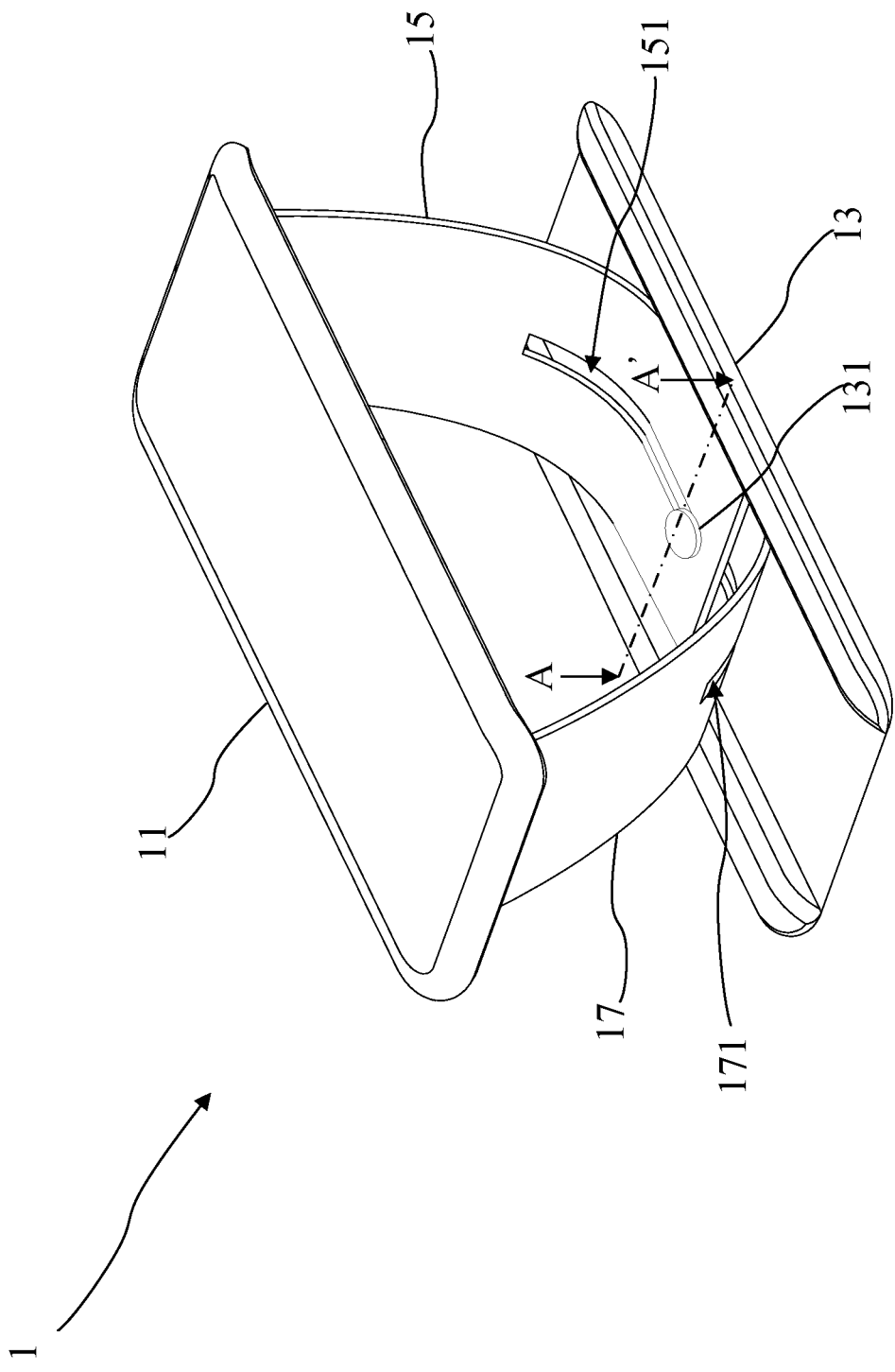
FIG. 1B is a three-dimensional diagram of an accessory according to some embodiments of the present invention.

Please refer to FIGS. 1A and 1B. FIG. 1A shows a three-dimensional diagram of an accessory 1 according to some embodiments of the present invention. FIG. 1B shows another three-dimensional diagram of the accessory 1 according to some embodiments of the present invention. The accessory 1 includes a first base 11, a second base 13, a first flexible element 15 and a second flexible element 17. The first flexible element 15 and the second flexible element 17 are respectively disposed at the first base 11, and are located between the first base 11 and the second base 13. The first flexible element 15 has a first track 151. The second flexible element 17 has a second track 171.

Figure 1C:
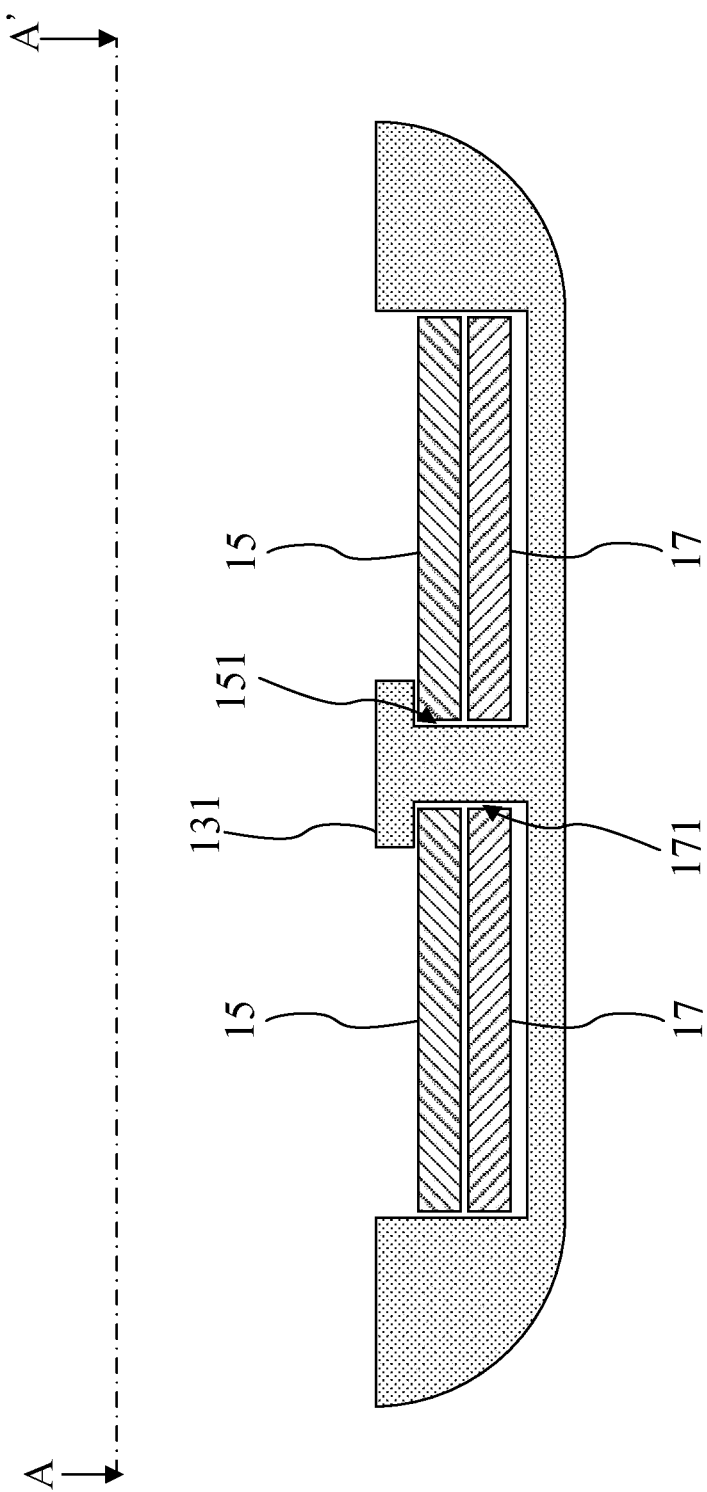
FIG. 1C is a cross-sectional diagram of an accessory according to some embodiments of the present invention.

FIG. 1C shows a cross-sectional diagram of the accessory 1 taken along a section line A-A' in FIG. 1B. Specifically, the second base 13 has a fastener 131 for engaging with the first track 151 and the second track 171, so that the first flexible element 15 and the second flexible element 17 may slide relative to the fastener 131. The first flexible element 15 is flexed based on sliding of the fastener 131 along the first track 151, and the second flexible element 17 is flexed based on sliding of the fastener 131 along the second track 171.

Further, in these embodiments, the fastener 131 has a column-like trunk and a head. One end of the trunk is connected to a body of the second base 13, another end of the trunk is connected to the head, and the trunk is located in the first track 151 and the second track 171. An outer diameter of the head is greater than channel widths of the first track 151 and the second track 171, so that the fastener 131 does not easily disengage from the first track 151 or the second track 171.

Figure 1D:
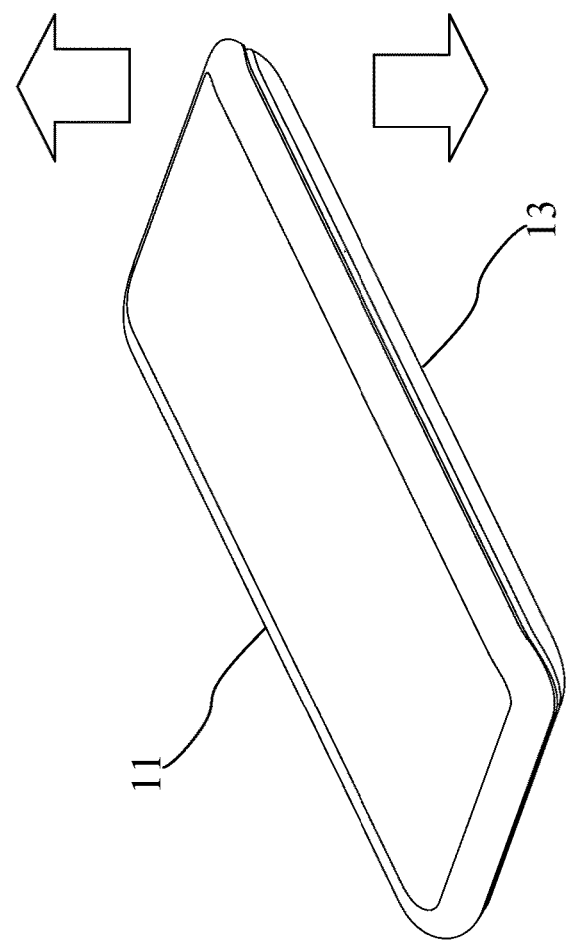
FIGS. 1D and 1E are operation schematic diagrams of an accessory according to some embodiments of the present invention.

FIG. 1D shows an operation schematic diagram of the accessory 1 according to some embodiments of the present invention. Specifically, when a distance between the first base 11 and the second base 13 increases (as shown by the arrows), the first base 11 pulls one end of the first flexible element 15 into motion. Since the fastener 131 of the second base 13 is engaged with the first track 151 of the first flexible element 15, the fastener 131 slides along the first track 151 when one end of the first flexible element 15 moves with the first base 11. As the fastener 131 slides to one end of the first track 151, as shown in FIG. 1B, a deformation occurs to the first flexible element 15, and such deformation can maintain a distance between one end of the first base 11 and one end of the second base 13.

Figure 1E:
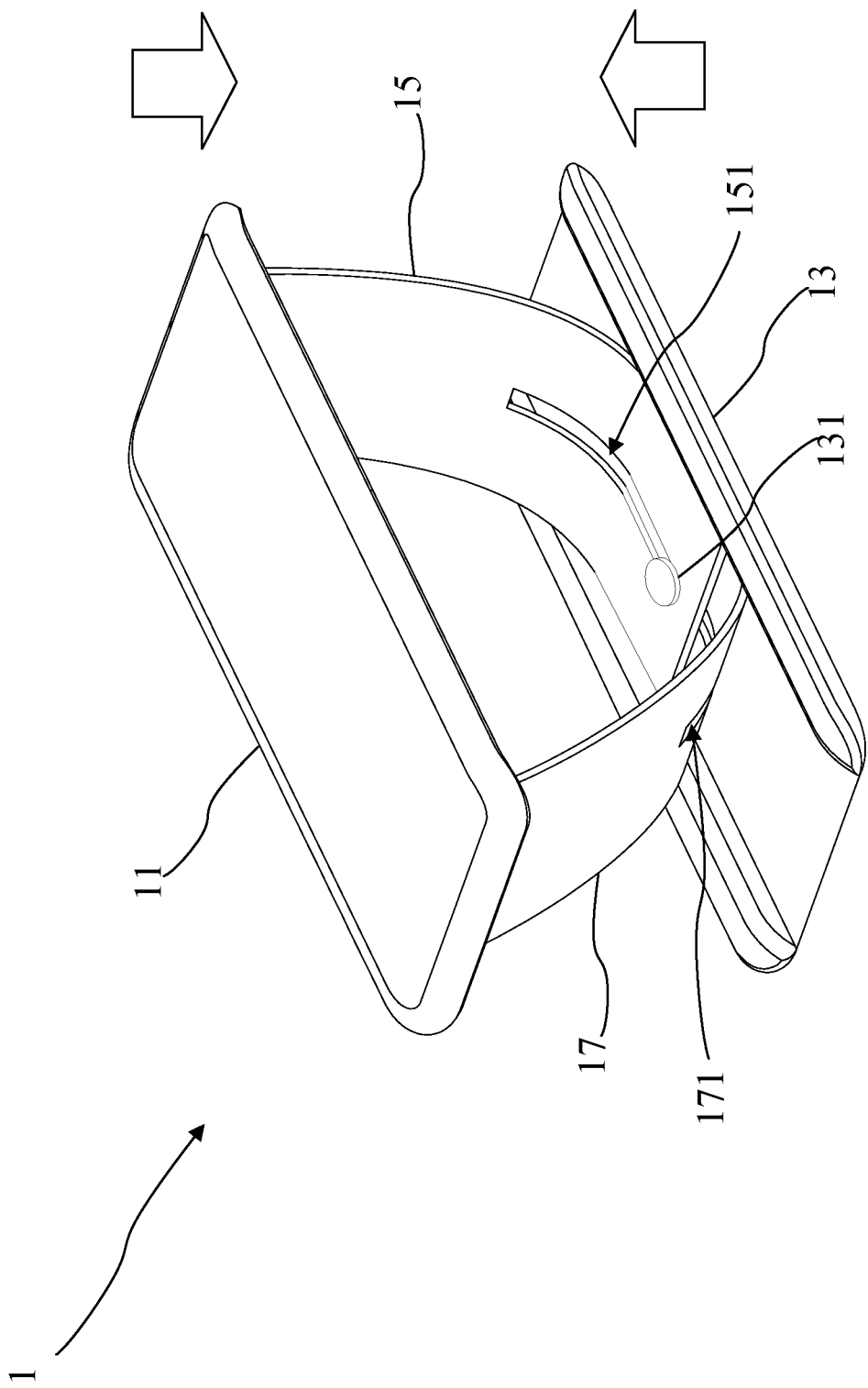

FIG. 1E shows another operation schematic diagram of the accessory 1 according to some embodiments of the present invention. In contrast to the above-described operation, when the distance between the first base 11 and the second base 13 decreases (as shown by the arrows), the first base 11 pushes one end of the first flexible element 15 into motion. Since the fastener 131 of the second base 13 is engaged with the first track 151 of the first flexible element 15, the fastener 131 slides along the first track 151 when one end of the first flexible element 15 moves with the first base 11. When the fastener 131 slides to another end of the first track 151, a deformation occurs to the first flexible element 15 for restoring the first flexible element 15 to its original state.

Similarly, when the distance between the first base 11 and the second base 13 increases, the first base 11 pulls one end of the second flexible element 17 into motion. Since the fastener 131 of the second base 13 is engaged with the second track 171 of the second flexible element 17, the fastener 131 slides along the second track 171 when one end of the second flexible element 17 moves with the first base 11. As the fastener 131 slides to one end of the second track 171, as shown in FIG. 1B, a deformation occurs to the second flexible element 17, and such deformation can maintain a distance between another end of the first base 11 and another end of the second base 13.

In contrast, when the distance between the first base 11 and the second base 13 decreases, the first base 11 pushes one end of the second flexible element 17 into motion. Since the fastener 131 of the second base 13 is engaged with the second track 171 of the second flexible element 17, the fastener 131 slides along the second track 171 when one end of the second flexible element 17 moves with the first base 11. Accordingly, a deformation occurs to the second flexible element 17 for restoring the second flexible element 17 to its original state.

Figure 1F:
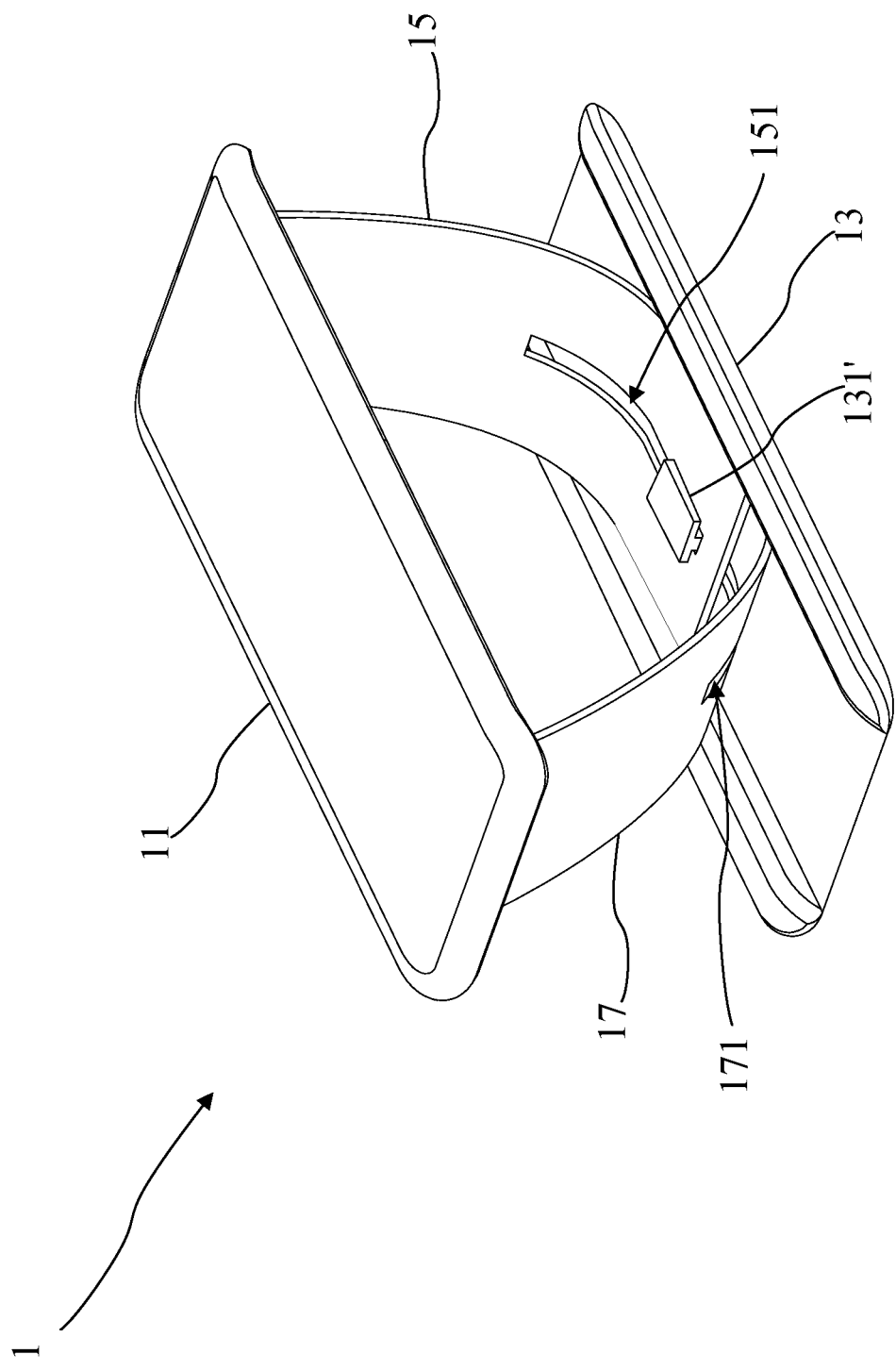
FIG. 1F is a three-dimensional diagram of an accessory according to some embodiments of the present invention.

Referring to FIG. 1F, in another embodiment, a fastener 131' may be a long structure, and has a trunk and a head. The trunk and the head are both long structures, and the trunk is located in the first track 151 and the second track 171. An outer diameter of the head is greater than channel widths of the first track 151 and the second track 171, so that the fastener 131' does not easily disengage from the first track 151 or the second track 171. Moreover, because the fastener 131' and the hollow-shaped tracks are both long structures, the fastener 131' can retain the first flexible element 15 and the second flexible element 17 from swaying or deviating relative to the fastener 131'.

Figure 2A:
FIG. 2A is a three-dimensional diagram of an accessory according to some embodiments of the present invention.
Figure 2A:
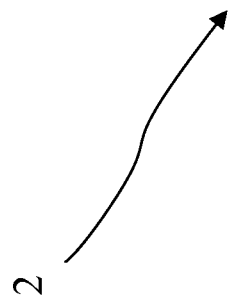
Figure 2B:
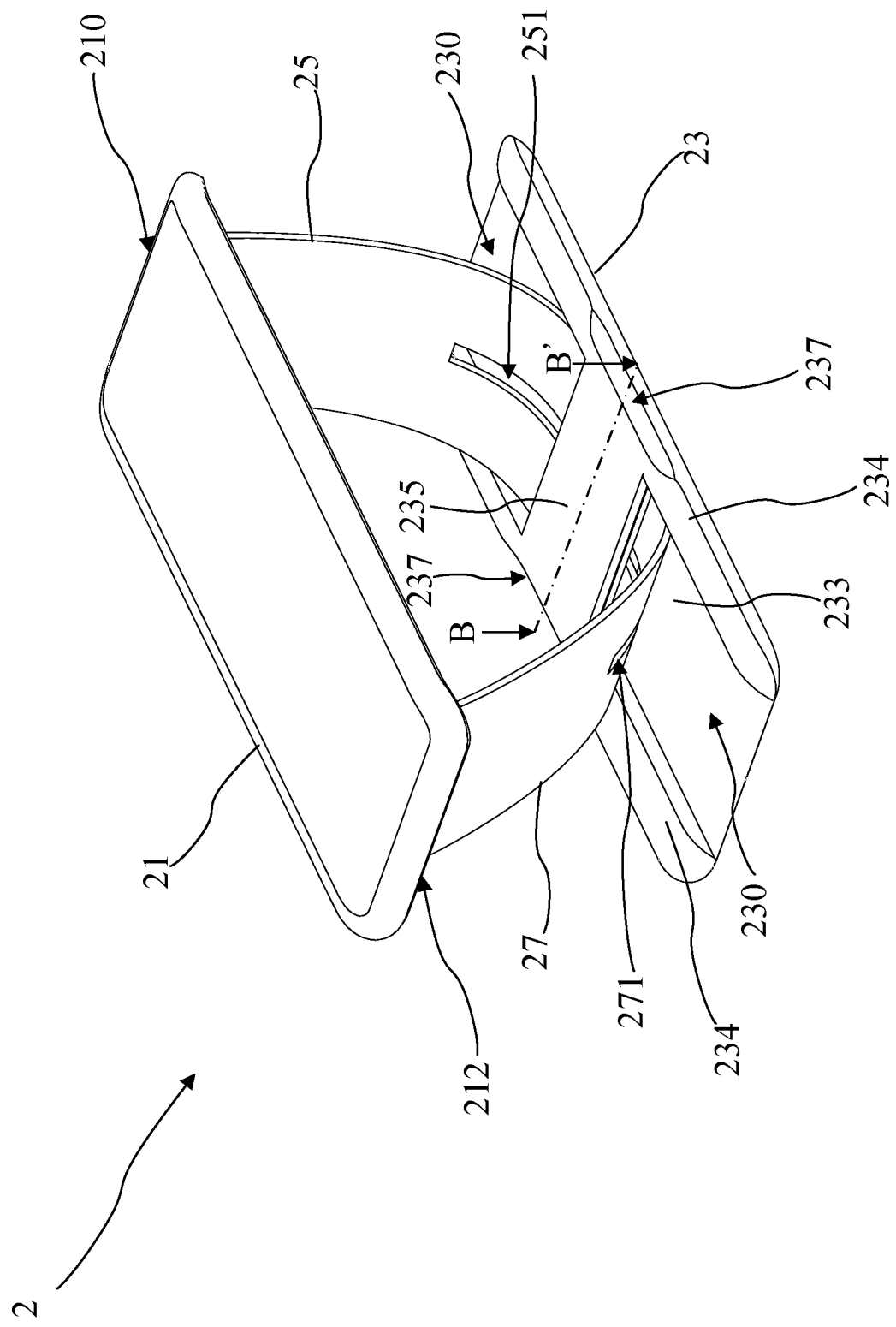
FIG. 2B is a three-dimensional diagram of an accessory according to some embodiments of the present invention.

Please refer to FIGS. 2A and 2B. FIG. 2A shows a three-dimensional diagram of an accessory 2 according to some embodiments of the present invention. FIG. 2B shows another three-dimensional diagram of the accessory 2 according to some embodiments of the present invention. The accessory 2 includes a first base 21, a second base 23, a first flexible element 25 and a second flexible element 27.

Specifically, the first base 21 and the second base 23 include long structures. In these embodiments, each of two lengthwise sides of the long structure of the second base 23 has an indentation 237. In other embodiments, each of two lengthwise sides of the long structure of the first base 21 has an indentation, or each of the two lengthwise sides of the long structures of the first base 21 and the second base 23 has an indentation, or one lengthwise side of either the long structure of the first base 21 or the long structure of the second base 23 has an indentation, wherein the design of the indentations facilitates a clamping operation of the user. The first flexible element 25 and the second flexible element 27 include sheet-like structures, and are disposed on the first base 21 and located between the first base 21 and the second base 23. The first flexible element 25 has a first track 251, and the second flexible element 27 has a second track 271.

One end of the first flexible element 25 is disposed on one end 210 of the first base 21, and one end of the second flexible element 27 is disposed on another end 212 of the first base 21. The second base 23 has an accommodating space 230, and the first flexible element 25 and the second flexible element 27 are accommodated in the accommodating space 230 when the first base 21 and the second base 23 are adjoining.

Figure 2C:
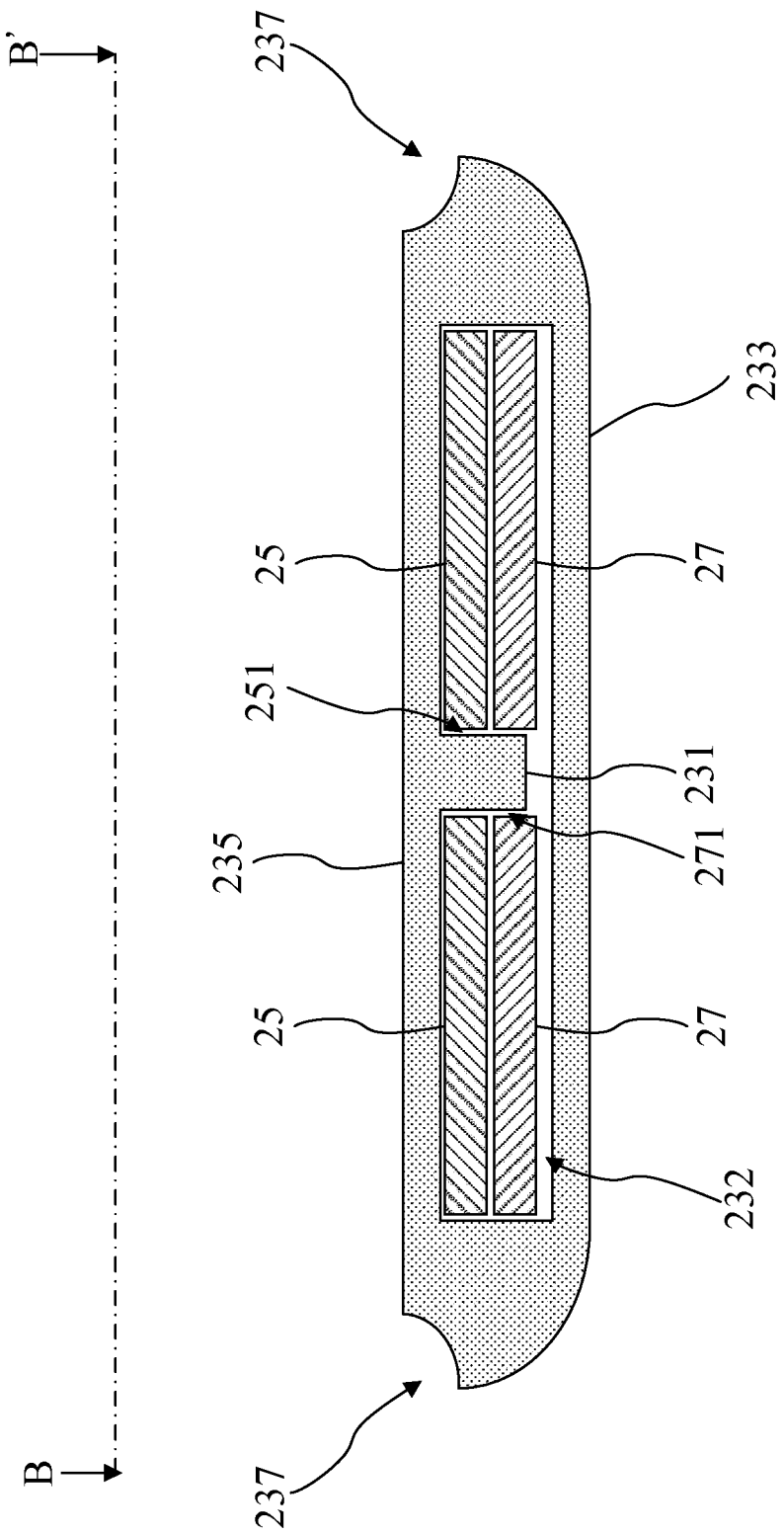
FIG. 2C is a cross-sectional diagram of an accessory according to some embodiments of the present invention.

Please refer also to FIG. 2C, which shows a cross-sectional diagram of the accessory 2 taken along a section line B-B' in FIG. 2B. Specifically, the second base 23 includes a fastener 231, a body 233, two sidewalls 234 and a baffle 235. The two sidewalls 234 are disposed at an interval at a top portion of the body 233 and together with the body 233 form the accommodating space 230 therebetween. The baffle 235 bridges the two sidewalls 234, and the baffle 235 and the body 233 together define a space 232. The fastener 231 is disposed on the baffle 235 and in the space 232. The fastener 231 is for engaging with the first track 251 and the second track 271.

In these embodiments, the first track 251 includes a hollow portion formed in the first flexible element 25, the second track 271 includes a hollow portion formed at the second flexible element 27, and the first flexible element 25 and the second flexible element 27 mutually overlap and pass through the space 232. The fastener 231 passes through the hollow portion of the first flexible element 25 and the hollow portion of the second flexible element 27 so as to engage with the first track 251 and the second track 271. The first flexible element 25 is flexed based on sliding of the fastener 231 along the first track 251, and the second flexible element 27 is flexed based on sliding of the fastener 231 along the second track 271.

Figure 2D:
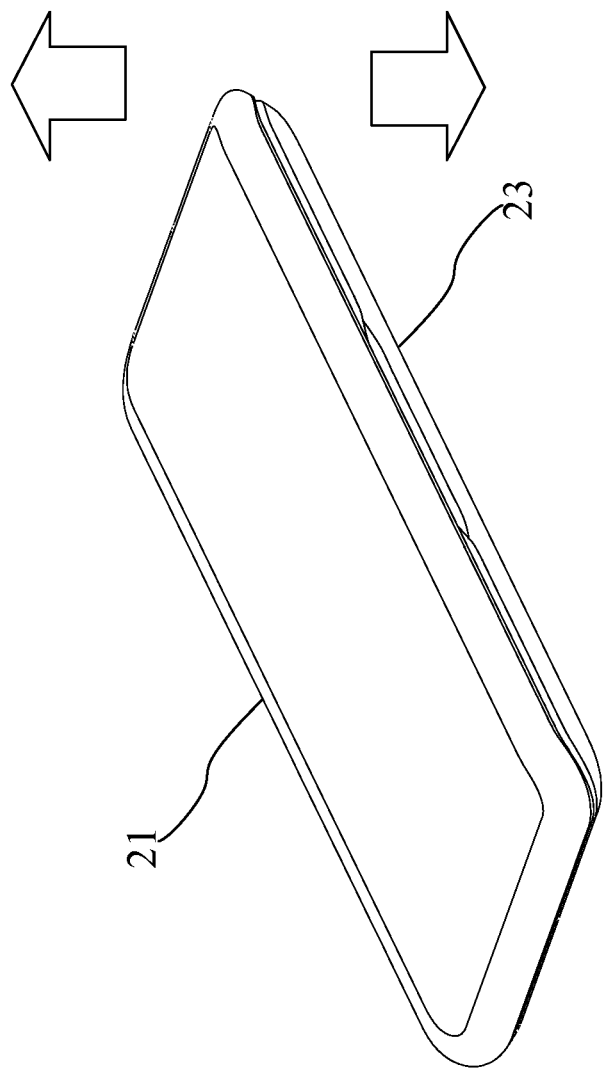
FIGS. 2D and 2E are operation schematic diagrams of an accessory according to some embodiments of the present invention.

FIG. 2D shows an operation schematic diagram of the accessory 2 according to some embodiments of the present invention. Specifically, when a distance between the first base 21 and the second base 23 increases (as shown by the arrows), the first base 21 pulls one end of the first flexible element 25 into motion. Since the fastener 231 of the second base 23 is engaged with the first track 251 of the first flexible element 25, the fastener 231 slides along the first track 251 as the end of the first flexible element 25 moves with the first base 21. As the fastener 231 slides to one end of the first track 251, as shown in FIG. 2B, a deformation occurs to the first flexible element 25, and such deformation can maintain the distance between one end of the first base 21 and one end of the second base 23.

Figure 2E:
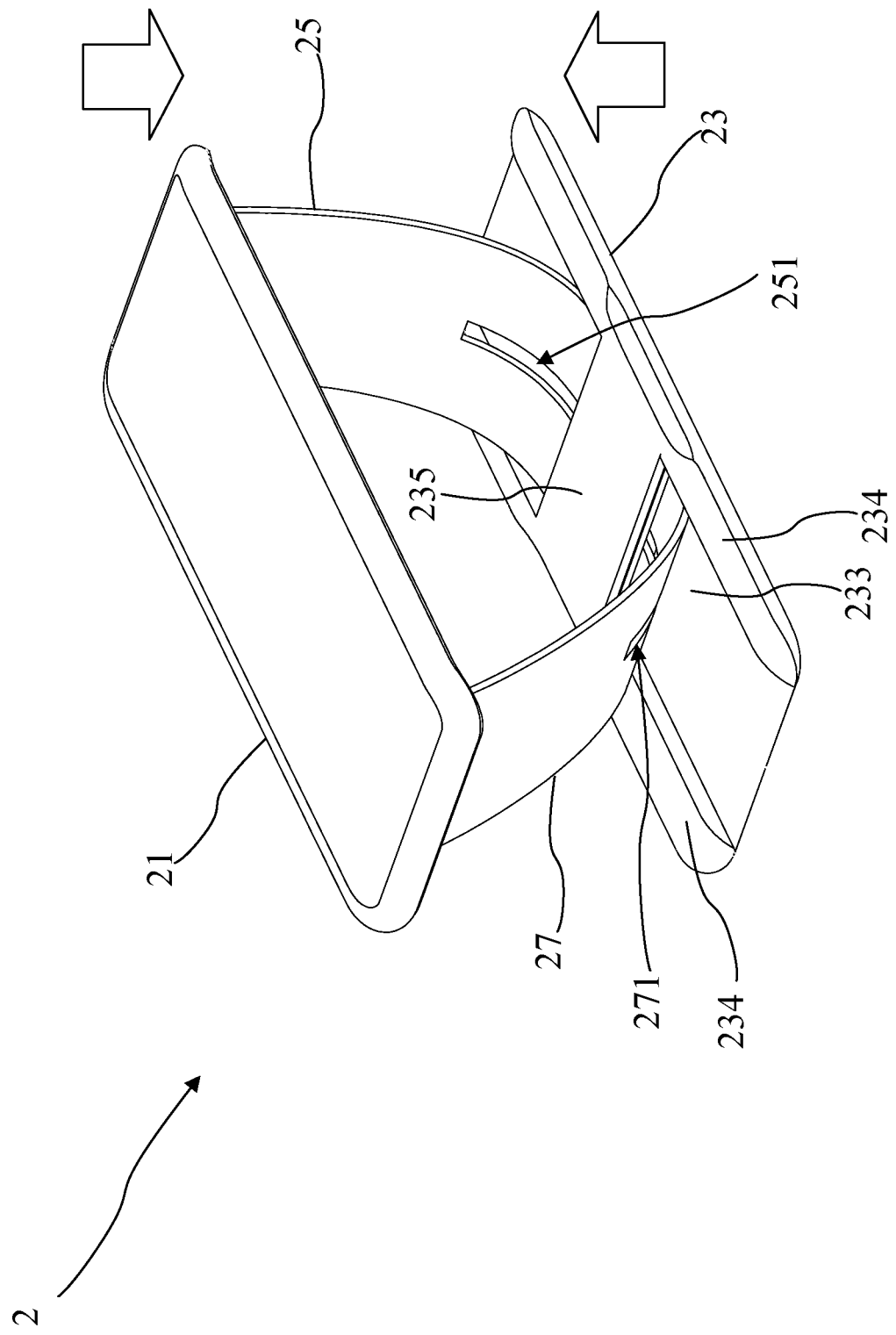

FIG. 2E shows another operation schematic diagram of the accessory 2 according to some embodiments of the present invention. In contrast to the above-described operation, when the distance between the first base 21 and the second base 23 decreases (as shown by the arrows), the first base 21 pushes one end of the first flexible element 25 into motion. Since the fastener 231 of the second base 23 is engaged with the first track 251 of the first flexible element 25, the fastener 231 slides along the first track 251 as one end of the first flexible element 25 moves with the first base 21. As the fastener 231 slides to another end of the first track 251, a deformation occurs to the first flexible element 25 for restoring the first flexible element 25 to its original state.

Similarly, when the distance between the first base 21 and the second base 23 increases, the first base 21 pulls one end of the second flexible element 27 into motion. Since the fastener 231 of the second base 23 is engaged with the second track 271 of the second flexible element 27, the fastener 231 slides along the second track 271 as one end of the second flexible element 27 moves with the first base 21. As the fastener 231 slides to one end of the second track 271, as shown in FIG. 2B, deformation occurs to the second flexible element 27, and such deformation can maintain a distance between the other end 212 of the first base 21 and another end of the second base 23.

In contrast, when the distance between the first base 21 and the second base 23 decreases, the first base 21 pushes one end of the second flexible element 27 into motion. Since the fastener 231 of the second base 23 is engaged with the second track 271 of the second flexible element 27, the fastener 231 slides along the second track 271 as one end of the second flexible element 27 moves with the first base 21. Accordingly, a deformation occurs to the second flexible element 27 for restoring the second flexible element 27 to its original state.

Figure 3A:
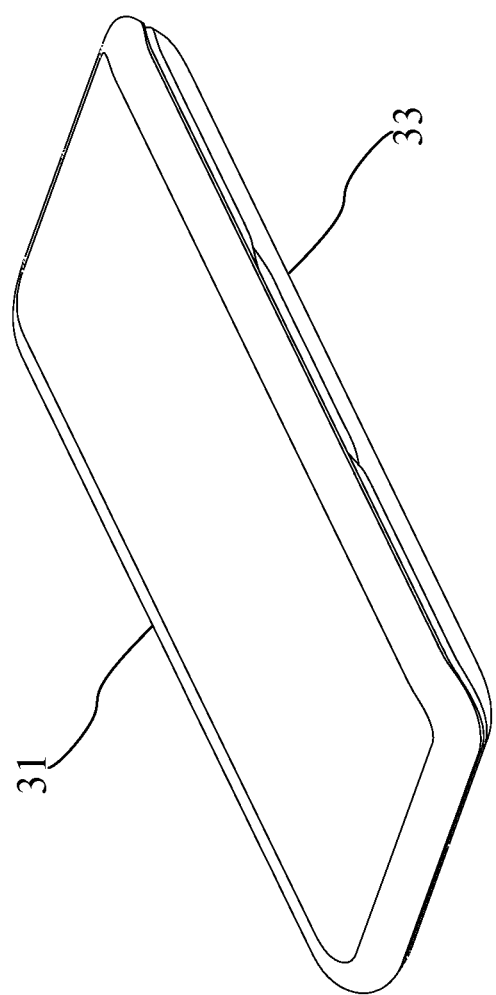
FIG. 3A is a three-dimensional diagram of an accessory according to some embodiments of the present invention.
Figure 3A:
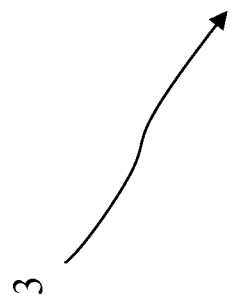
Figure 3B:
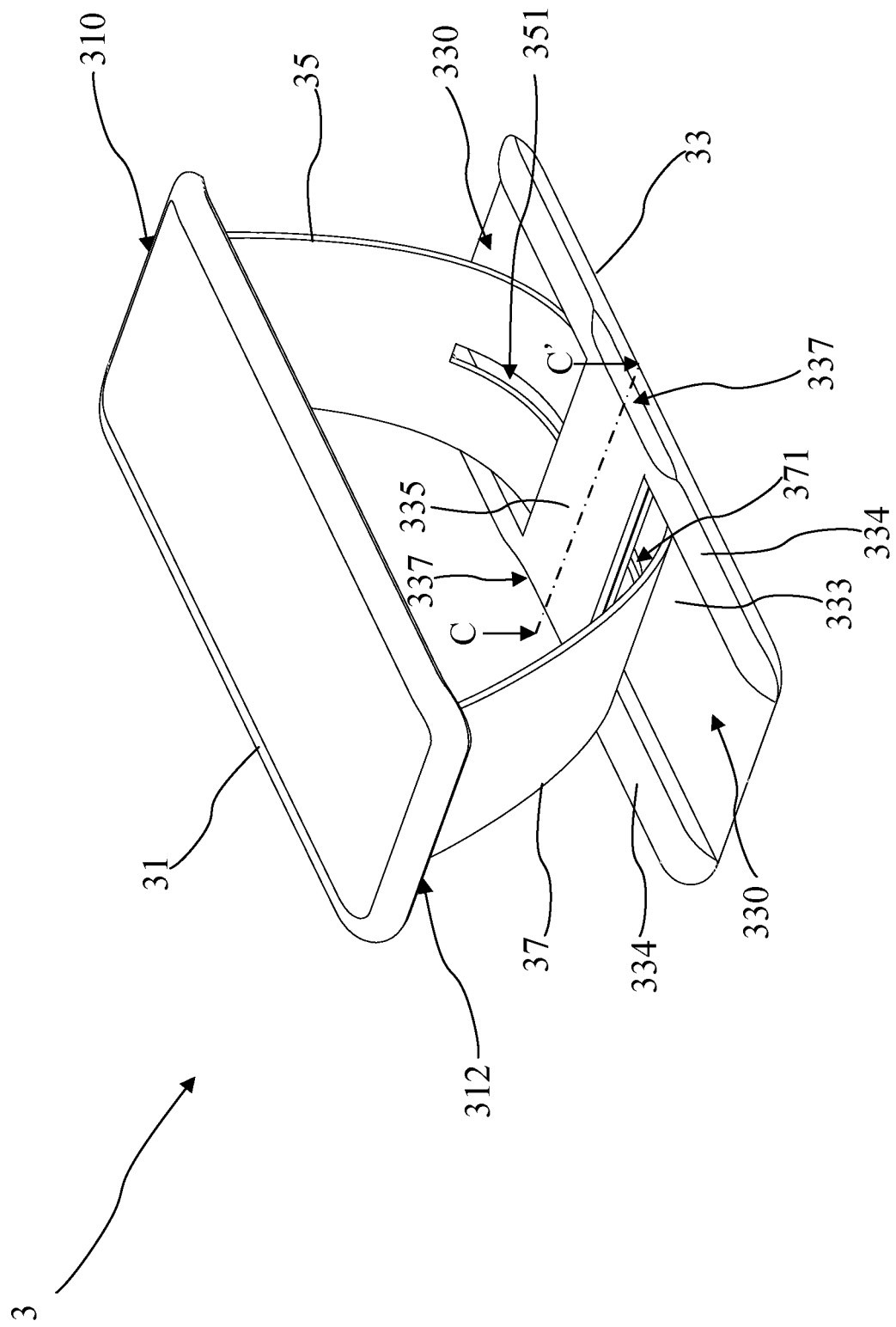
FIG. 3B is a three-dimensional diagram of an accessory according to some embodiments of the present invention.

Please refer to FIGS. 3A and 3B. FIG. 3A shows a three-dimensional diagram of an accessory 3 according to some embodiments of the present invention. FIG. 3B shows another three-dimensional diagram of the accessory 3 according to some embodiments of the present invention. The accessory 3 includes a first base 31, a second base 33, a first flexible element 35 and a second flexible element 37.

Specifically, the first base 31 and the second base 33 include long structures. In this embodiment, each of two lengthwise sides of the long structure of the second base 33 has an indentation 337. In other embodiments, each of two lengthwise sides of the long structure of the first base 31 has an indentation, or each of the two lengthwise sides of the long structures of the first base 31 and the second base 33 has an indentation, or one lengthwise side of either the long structure of the first base 31 or the long structure of the second base 33 has an indentation, wherein the design of the indentations facilitates a clamping operation of the user. The first flexible element 35 and the second flexible element 37 include sheet-like structures, and are disposed on the first base 31 and located between the first base 31 and the second base 33. The first flexible element 35 has a first track 351, and the second flexible element 37 has a second track 371.

One end of the first flexible element 35 is disposed on one end 310 of the first base 31, and one end of the second flexible element 37 is disposed on another end 312 of the first base 31. The second base 33 has an accommodating space 330, and the first flexible element 35 and the second flexible element 37 are accommodated in the accommodating space 330 when the first base 31 and the second base 33 are adjoining.

Figure 3C:
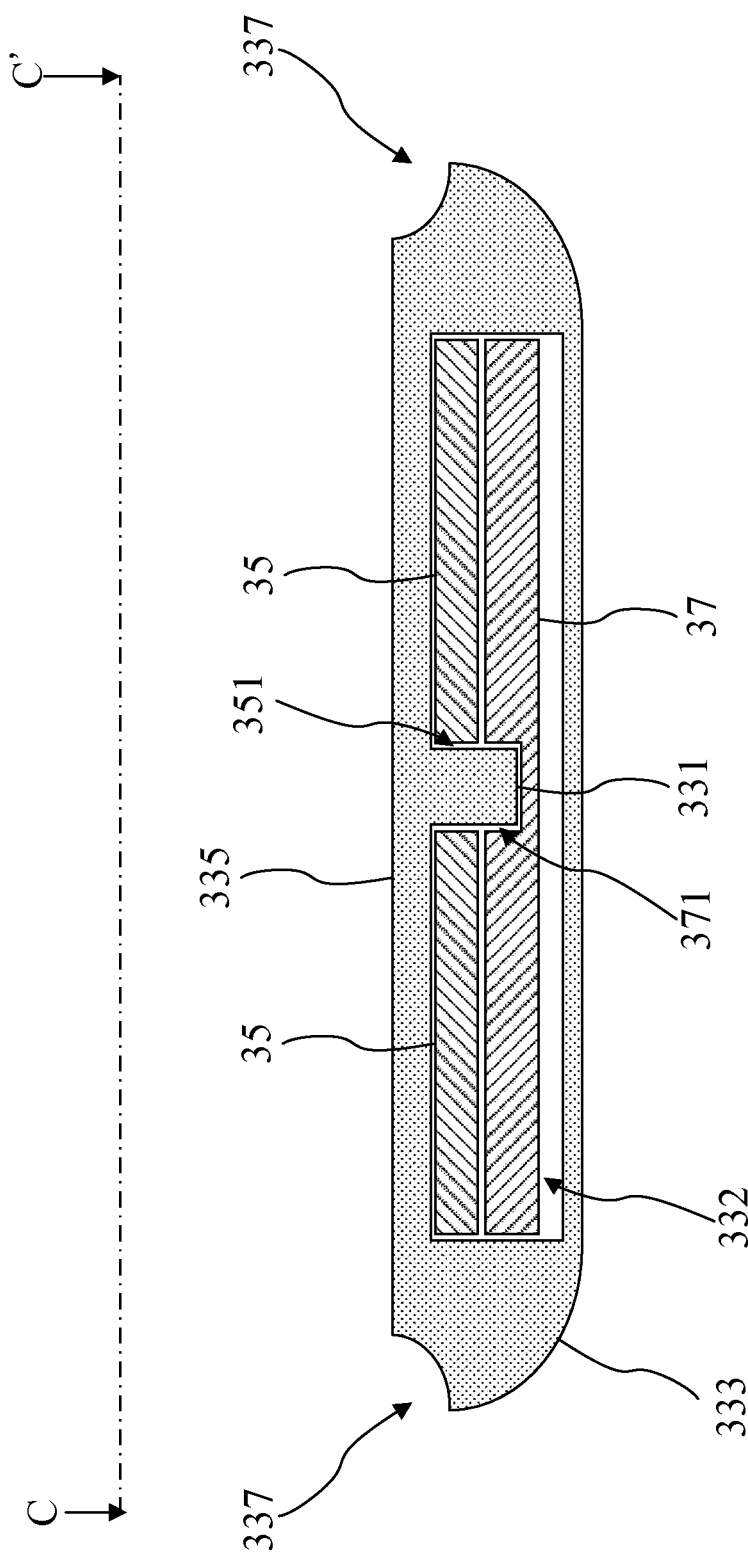
FIG. 3C is a cross-sectional diagram of an accessory according to some embodiments of the present invention.

Please also refer to FIG. 3C, which shows a cross-sectional diagram of the accessory 3 taken along a section line C-C' in FIG. 3B. Specifically, the second base 33 has a fastener 331, a body 333, two sidewalls 334 and a baffle 335. The two sidewalls 334 are disposed at an interval at a top portion of the body 333 and together with the body 333 form the accommodating space 330. The baffle 335 bridges the two sidewalls 334, and the baffle 335 and the body 333 together define a space 332. The fastener 331 is disposed on the baffle 335 in the space 332, and is for engaging with the first track 351 and the second track 371.

In these embodiments, the first track 351 includes a hollow portion formed in the first flexible element 35, the second track 371 includes a groove formed in the second flexible element 37, and the first flexible element 35 and the second flexible element 37 mutually overlap and pass through the space 332. The fastener 331 first passes through the hollow portion of the first flexible element 35 and is then inserted into the groove of the second flexible element 37, so as to engage with the first track 351 and the second track 371. The first flexible element 35 is flexed based on sliding of the fastener 331 along the first track 351, and the second flexible element 37 is flexed based on sliding of the fastener 331 along the second track 371.

Figure 3D:
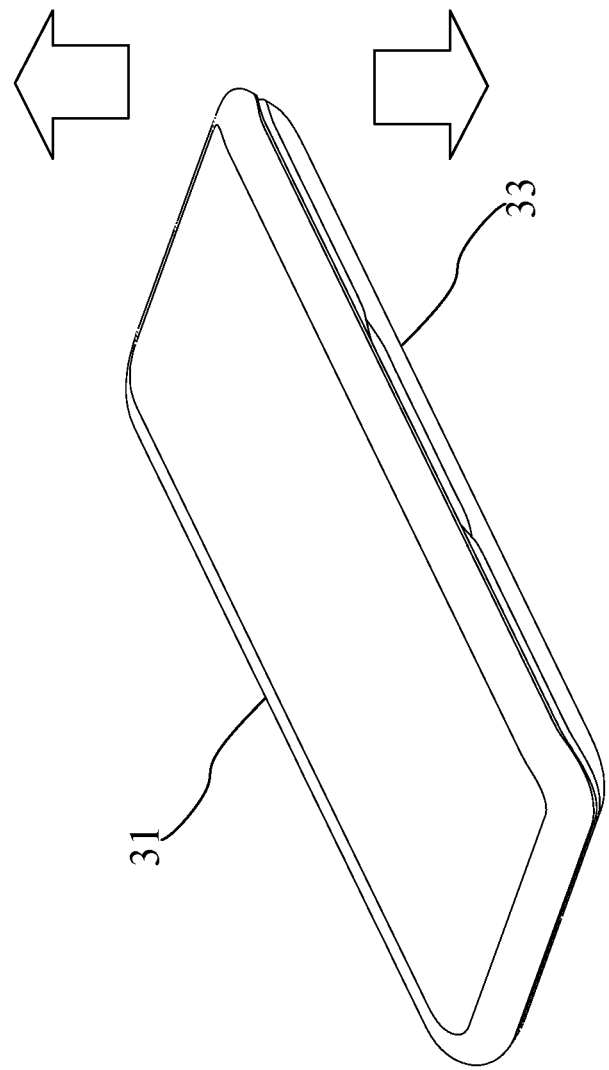
FIGS. 3D and 3E are operation schematic diagrams of an accessory according to some embodiments of the present invention.
Figure 3D:
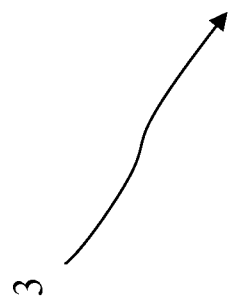

FIG. 3D shows an operation schematic diagram of the accessory 3 according to some embodiments of the present invention. Specifically, when a distance between the first base 31 and the second base 33 increases (as shown by the arrows), the first base 31 pulls one end of the first flexible element 35 into motion. Since the fastener 331 of the second base 33 is engaged with the first track 351 of the first flexible element 35, the fastener 331 slides along the first track 351 when one end of the first flexible element 35 moves with the first base 31. As the fastener 331 slides to one end of the first track 351, as shown in FIG. 3B, a deformation occurs to the first flexible element 35, and such deformation can maintain a distance between one end of the first base 31 and one end of the second base 33.

Figure 3E:
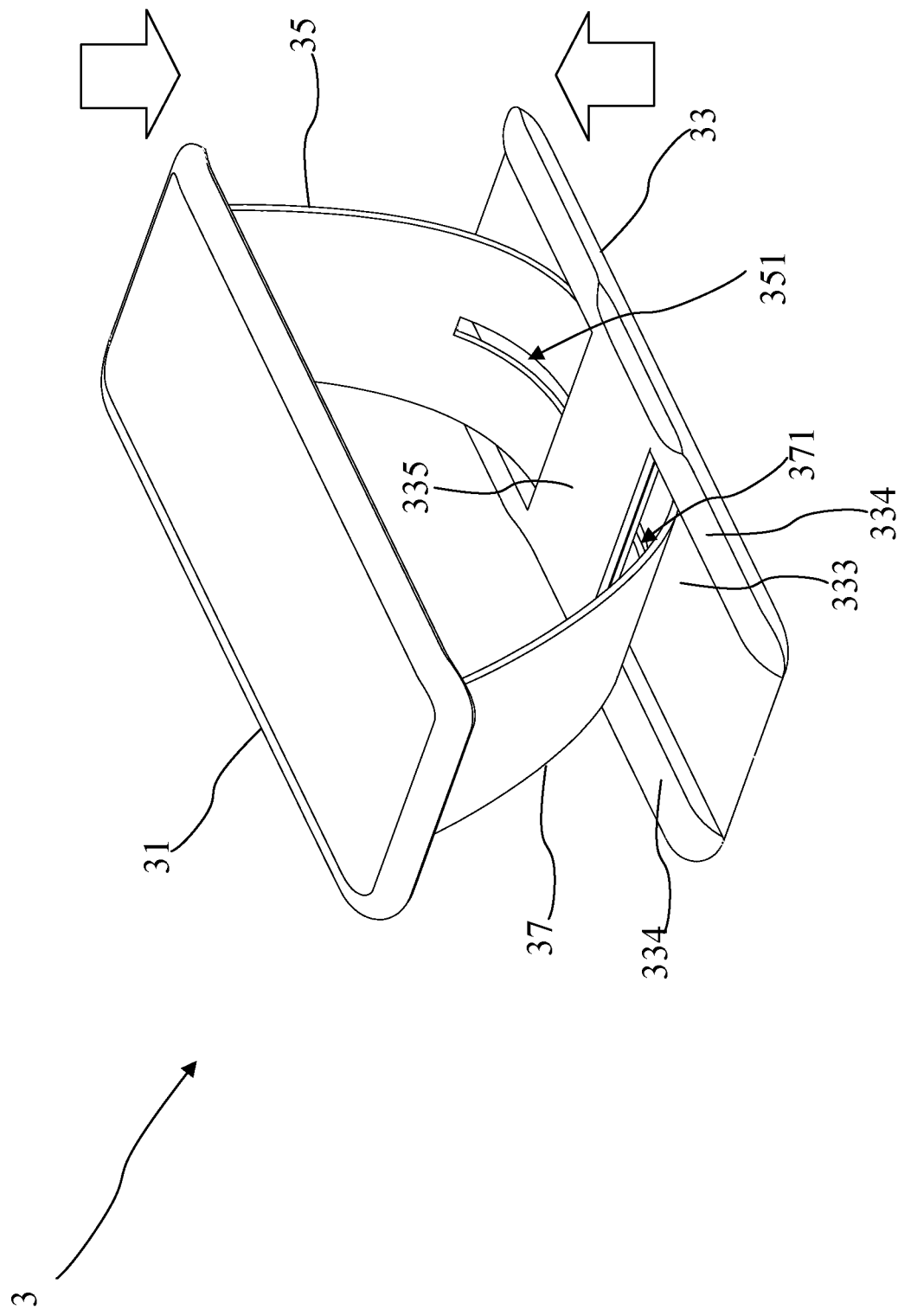

Please also refer to FIG. 3E, which shows another operation schematic diagram of the accessory 3 according to some embodiments of the present invention. In contrast to the above-described operation, when the distance between the first base 31 and the second base 33 decreases (as shown by the arrows), the first base 31 pushes one end of the first flexible element 35 into motion. Since the fastener 331 of the second base 33 is engaged with the first track 351 of the first flexible element 35, the fastener 331 slides along the first track 351 as one end of the first flexible element 35 moves with the first base 31. As the fastener 331 slides to another end of the first track 351, a deformation occurs to the first flexible element 35 for restoring the first flexible element 35 to its original state.

Similarly, when the distance between the first base 31 and the second base 33 increases, the first base 31 pulls one end of the second flexible element 37 into motion. Since the fastener 331 of the second base 33 is engaged with the second track 371 of the second flexible element 37, the fastener 331 slides along the second track 371 as one end of the second flexible element 37 moves with the first base 31. As the fastener 331 slides to one end of the second track 371, as shown in FIG. 3B, a deformation occurs to the second flexible element 37, and such deformation can maintain a distance between another end of the first base 31 and another end of the second base 33.

In contrast, when the distance between the first base 31 and the second base 33 decreases, the first base 31 pushes one end of the second flexible element 37 into motion. Since the fastener 331 of the second base 33 is engaged with the second track 371 of the second flexible element 37, the fastener 331 slides along the second track 371 as one end of the second flexible element 37 moves with the first base 31. Accordingly, a deformation occurs to the second flexible element 37 for restoring the second flexible element 37 to its original state.

Figure 3G:
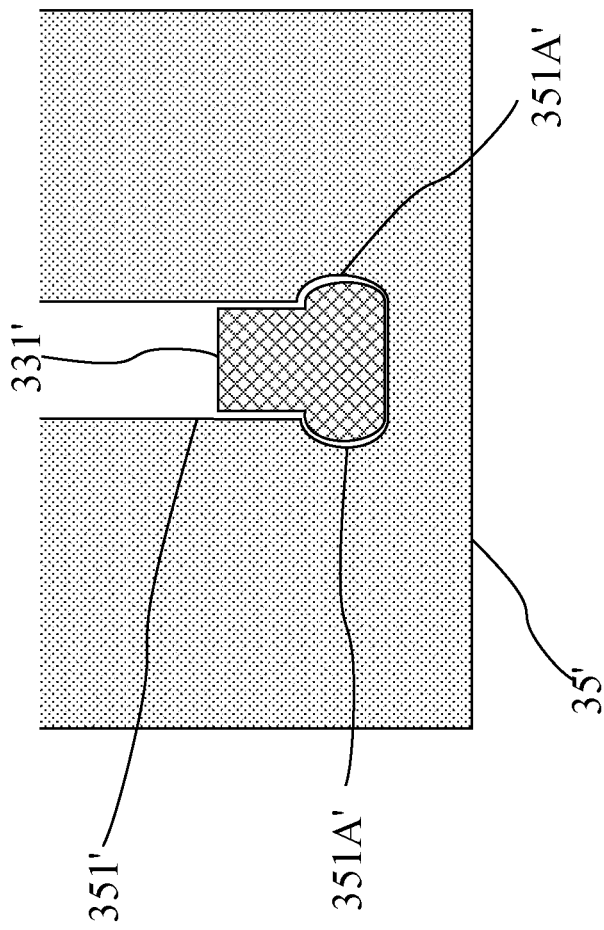
FIG. 3G is an enlarged schematic diagram of a positioning element of a first track positioning a fastener according to some embodiments of the present invention.
Figure 3F:
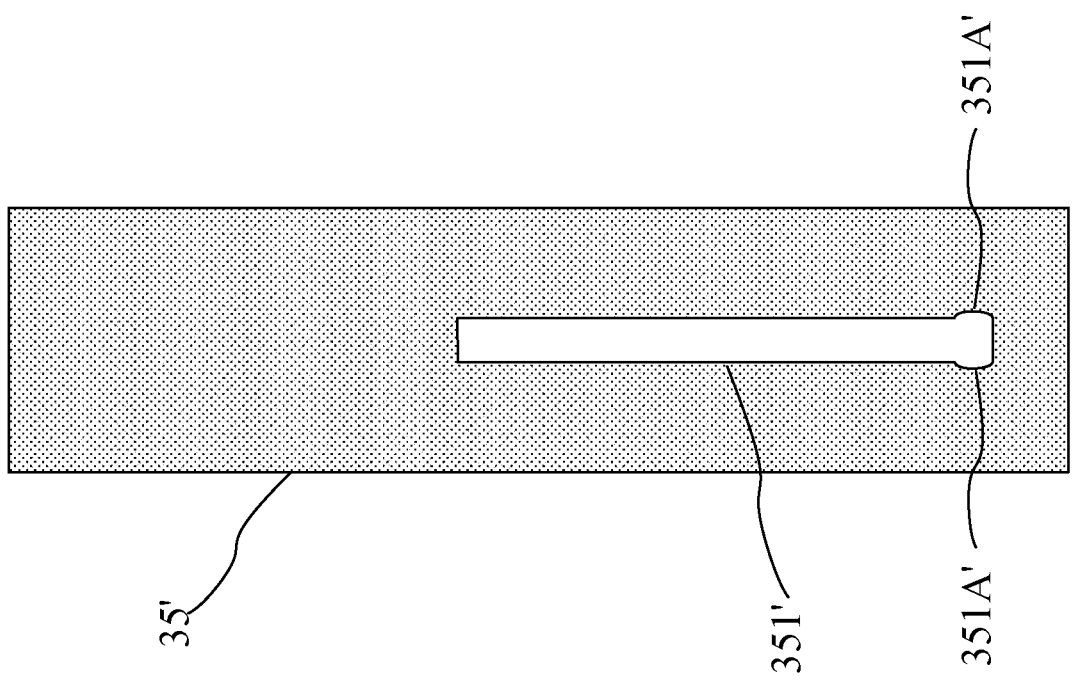
FIG. 3F is a top view of a first flexible element according to some embodiments of the present invention.

In some embodiments, the flexible elements and the fastener may be positioned using a positioning element therebetween, as illustrated in FIGS. 3F and 3G. FIG. 3F shows a top view of a first flexible element 35' of the present invention. FIG. 3G shows a schematic diagram of a positioning between a first track 351' of the first flexible element 35' and a fastener 331' of the present invention. Specifically, the first track 351' is a hollow portion, and is provided with a first positioning means 351A' for positioning the fastener 331'. In some embodiments, the first positioning means 351A' includes a dilated slot formed at one end of the first track 351', and the dilated slot is for receiving a protrusion block shape of the fastener 331'.

Figure 3I:
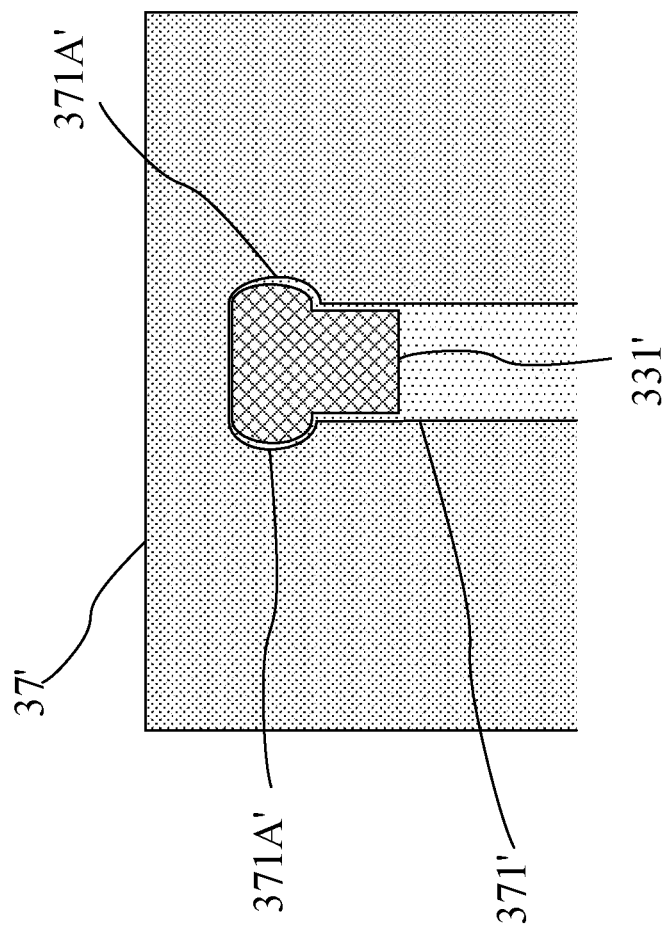
FIG. 3I is an enlarged schematic diagram of a positioning element of a second track positioning a fastener according to some embodiments of the present invention.
Figure 3H:
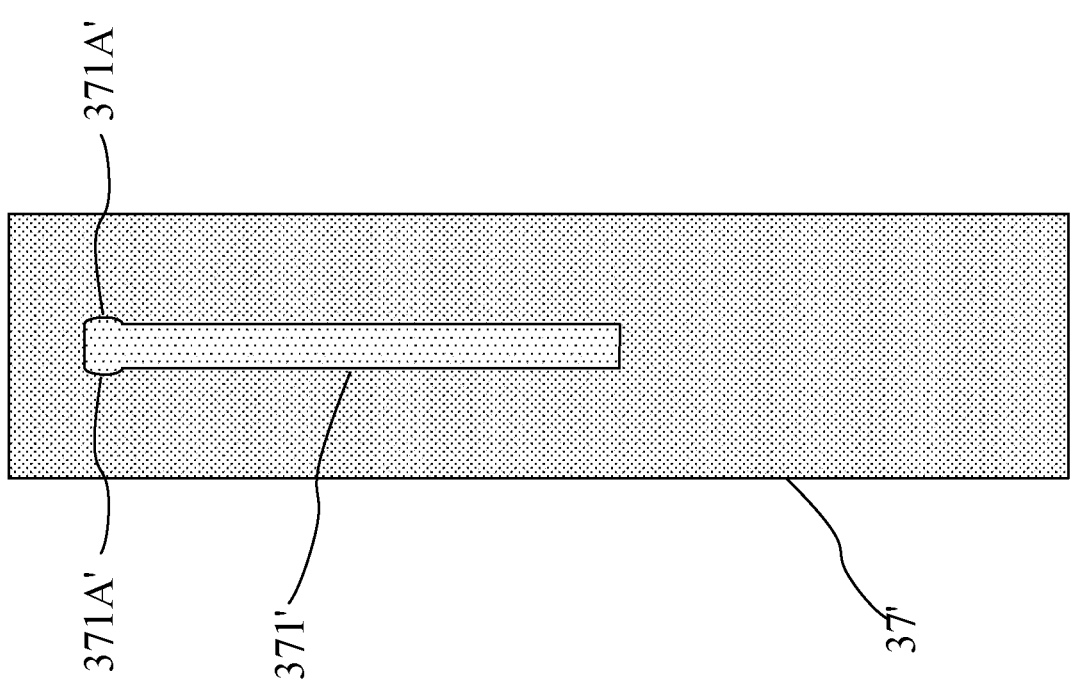
FIG. 3H is a top view of a second flexible element according to some embodiments of the present invention.

Please refer to FIGS. 3H and 3I. FIG. 3H shows a schematic diagram of a second flexible element 37' of the present invention. FIG. 3I shows a schematic diagram of a positioning between a second track 371' of the second flexible element 37' and the fastener 331' of the present invention. Specifically, the second track 371' is a groove, and is provided with a second positioning means 371A' for positioning the fastener 331'. In some embodiments, the second positioning means 371A' includes a dilated slot formed at one end of the second track 371', and the dilated slot is for receiving the protrusion block shape of the fastener 331'.

Figure 4A:
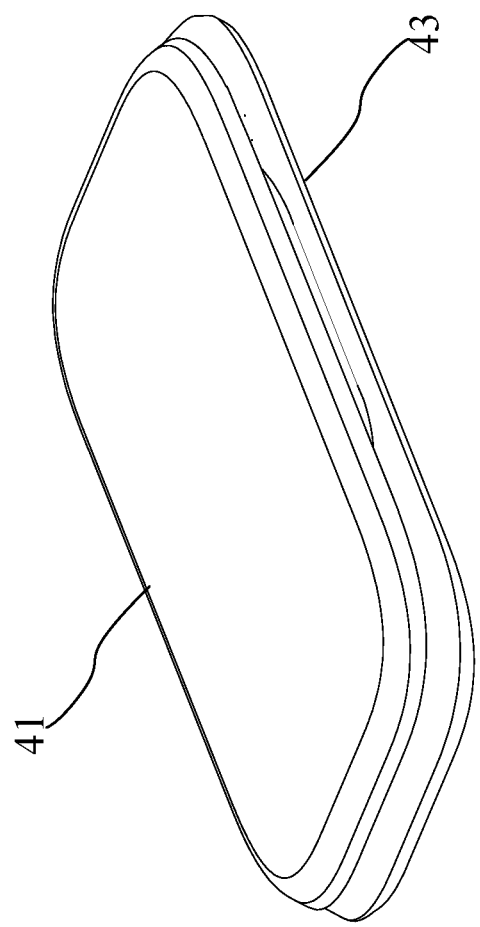
FIG. 4A is a three-dimensional diagram of an accessory according to some embodiments of the present invention.
Figure 4A:
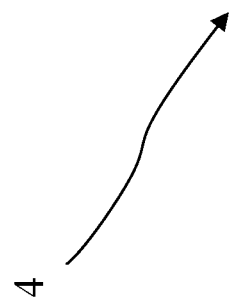
Figure 4B:
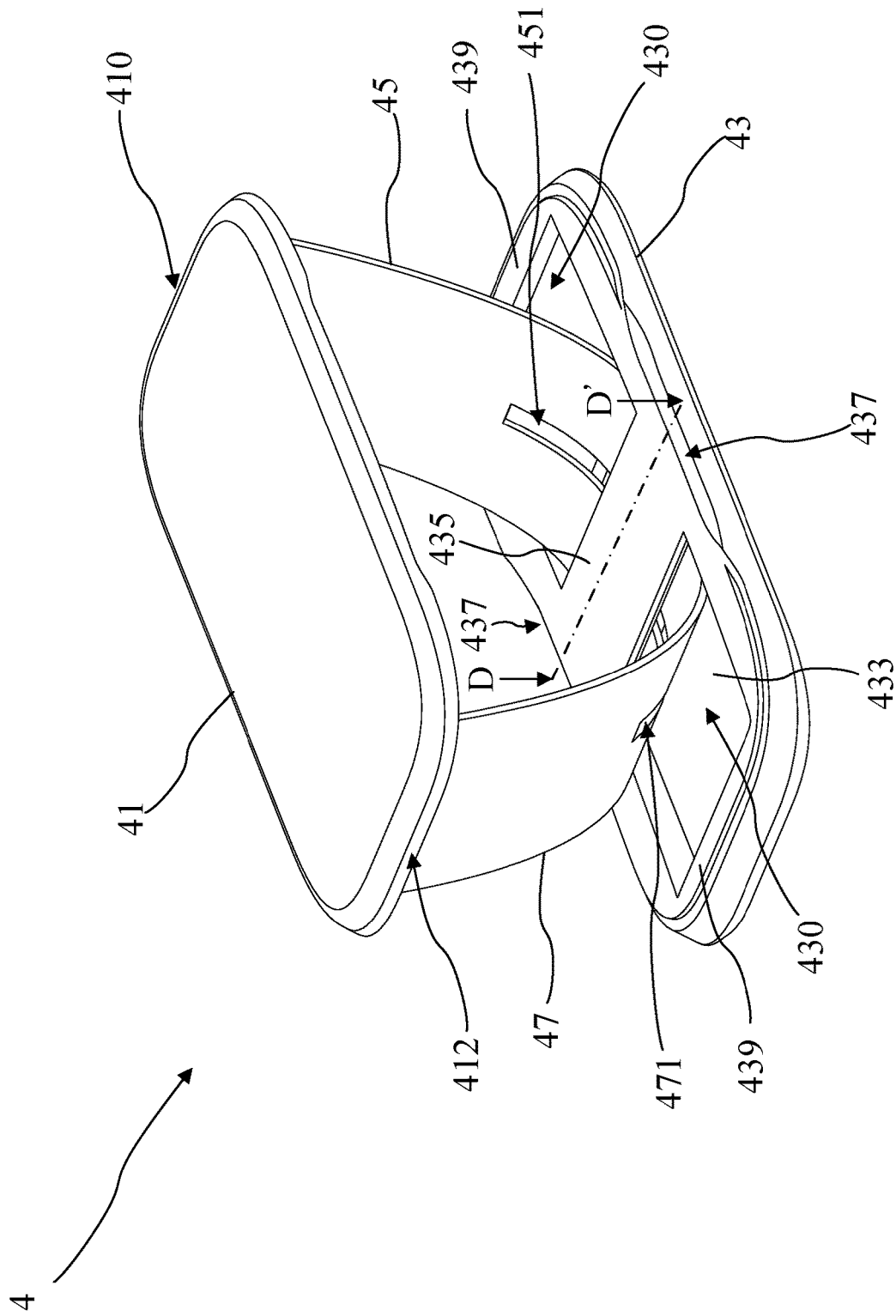
FIG. 4B is a three-dimensional diagram of an accessory according to some embodiments of the present invention.
Figure 4C:
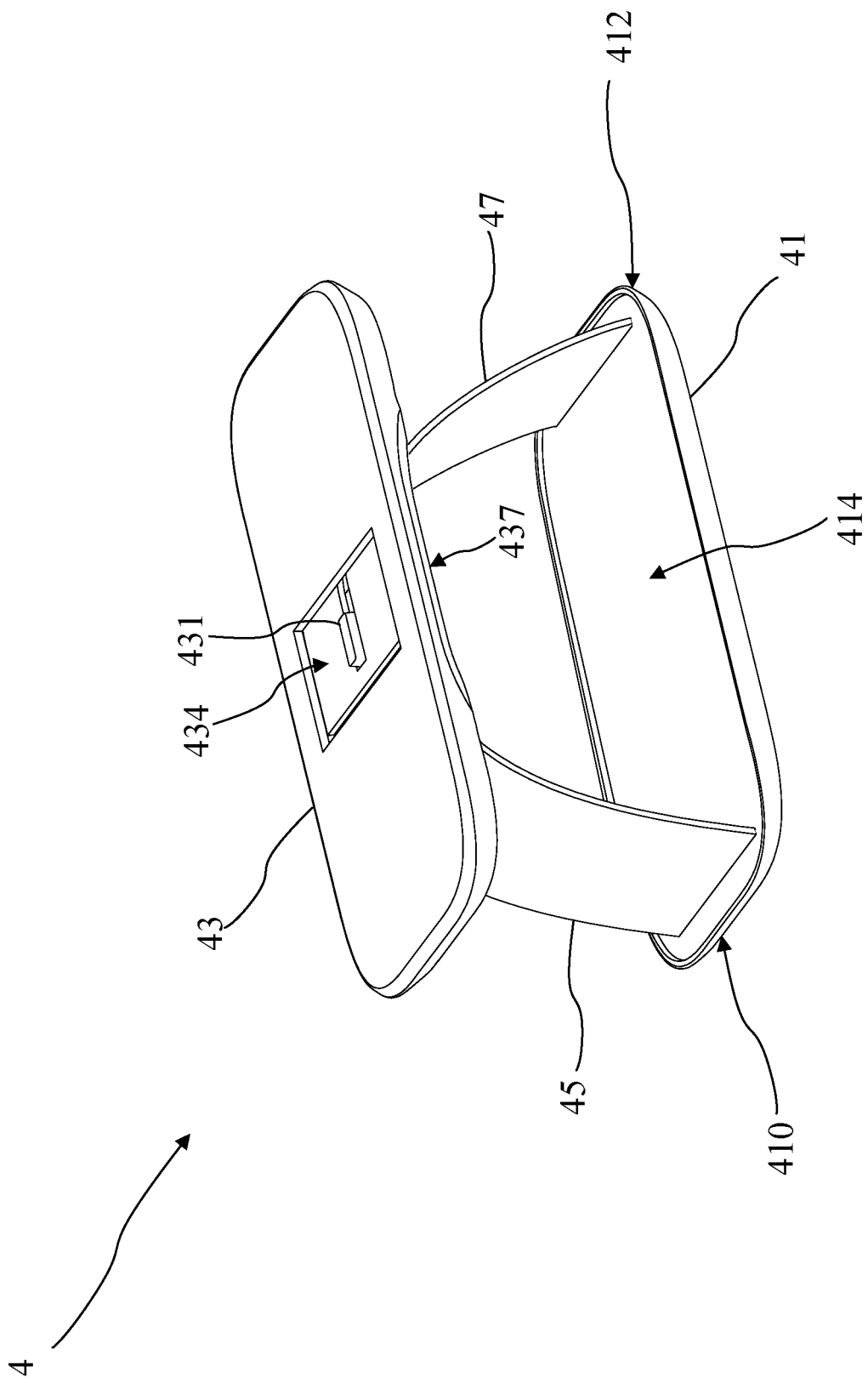
FIG. 4C is a three-dimensional diagram of an accessory according to some embodiments of the present invention.

Please refer to FIGS. 4A to 4C. FIG. 4A shows a three-dimensional diagram of an accessory 4 according to some embodiments of the present invention. FIG. 4B shows another three-dimensional diagram of the accessory 4 according to some embodiments of the present invention. FIG. 4C shows a three-dimensional diagram of the accessory 4 from another angle according to some embodiments of the present invention. The accessory 4 includes a first base 41, a second base 43, a first flexible element 45 and a second flexible element 47.

Specifically, the first base 41 and the second base 43 include long structures, and each of two lengthwise sides of the long structure of the first base 41 or the second base 43 has an indentation to facilitate a clamping operation of the user. In this embodiment, each of the two lengthwise sides of the long structure of the second base 43 has an indentation 437. The first flexible element 45 and the second flexible element 47 include sheet-like structures, and are disposed on the first base 41 and located between the first base 41 and the second base 43. The first flexible element 45 has a first track 451, and the second flexible element 47 has a second track 471.

One end of the first flexible element 45 is disposed on one end 410 of the first base 41, and one end of the second flexible element 47 is disposed on another end 412 of the first base 41. The first base 41 has an accommodating space 414, the second base 43 has an accommodating space 430, and the first flexible element 45 and the second flexible element 47 are accommodated in the accommodating spaces 414 and 430 when the first base 41 and the second base 43 are adjoining.

In some embodiments, the accommodating space 414 includes a first recess formed in the first base 41, and the accommodating space 430 includes a second recess formed in the second base 43. The second recess contains an annular projection 439 at a periphery of the second recess, the annular projection 439 protruding toward the first base 41. The first recess is shaped corresponding to the annular shape of the annular projection 439, and the first recess can accordingly accommodate the annular projection 439 when the first base 41 and the second base 43 are adjoining.

Figure 4D:
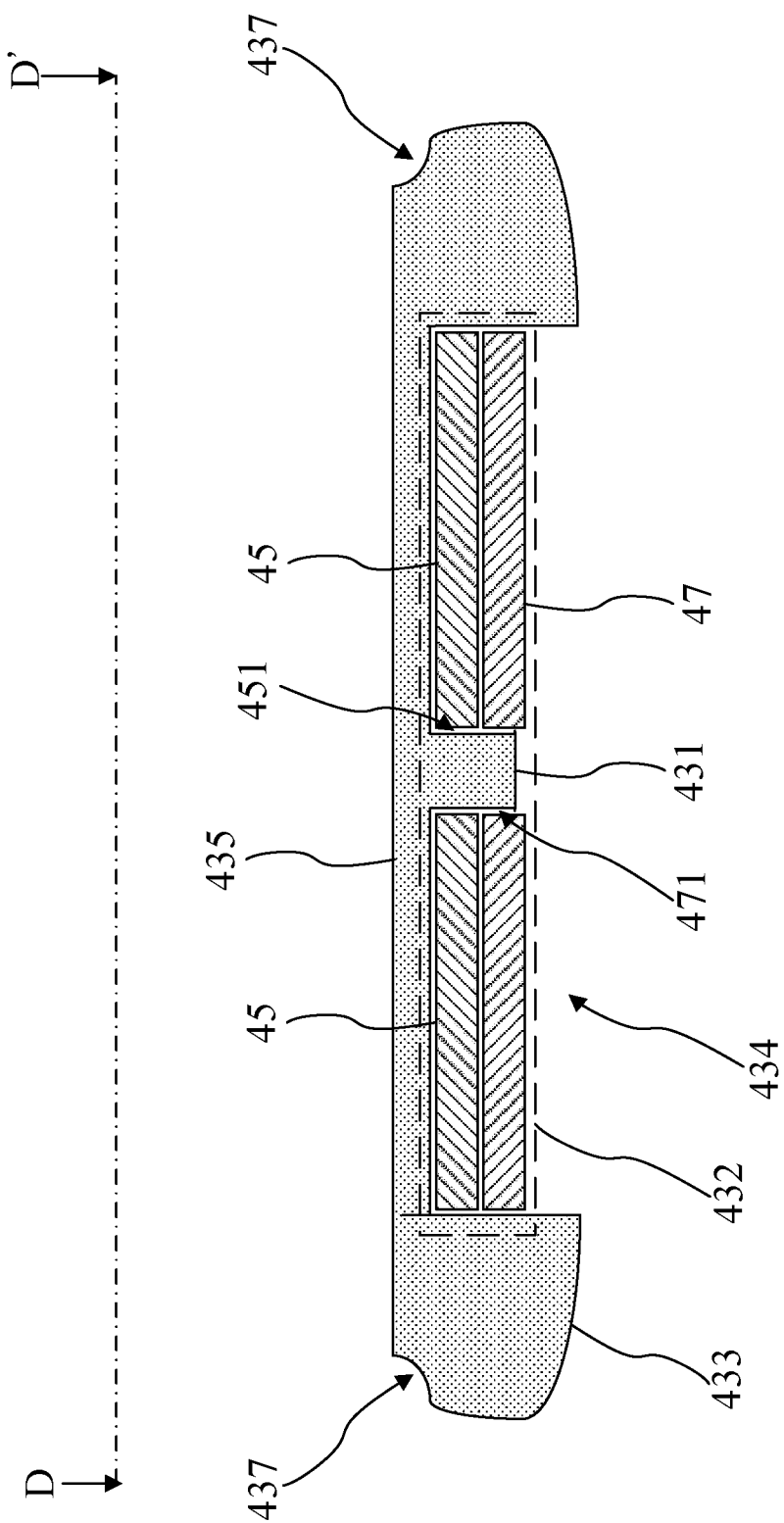
FIG. 4D is a cross-sectional diagram of an accessory according to some embodiments of the present invention.

Please also refer to FIG. 4D, which shows a cross-sectional diagram of the accessory 4 taken along a section line D-D' in FIG. 4B. Specifically, the second base 43 has a fastener 431, a body 433 and a baffle 435. The baffle 435 bridges two sides of the second recess (that is, the accommodating space 430) of the second base 43, and the body 433 and the baffle 435 together define a space 432. The fastener 431 is disposed on the baffle 435 in the space 432, and is for engaging with the first track 451 and the second track 471. In these embodiments, the body 433 is provided, at a position corresponding to the baffle 435, with a hollow portion 434 for exposing the fastener 431, to facilitate the user to operate the first track 451 and the second track 471 for their respective engagement with the fastener 431.

In these embodiments, the first track 451 includes a hollow portion formed in the first flexible element 45, the second track 471 includes a hollow portion formed in the second flexible element 47, and the first flexible element 45 and the second flexible element 47 mutually overlap and pass through the space 432. The fastener 431 passes through the hollow portion of the first flexible element 45 and the hollow portion of the second flexible element 47 so as to engage with the first track 451 and the second track 471. The first flexible element 45 is flexed based on sliding of the fastener 431 along the first track 451, and the second flexible element 47 is flexed based on sliding of the fastener 431 along the second track 471.

Figure 4E:
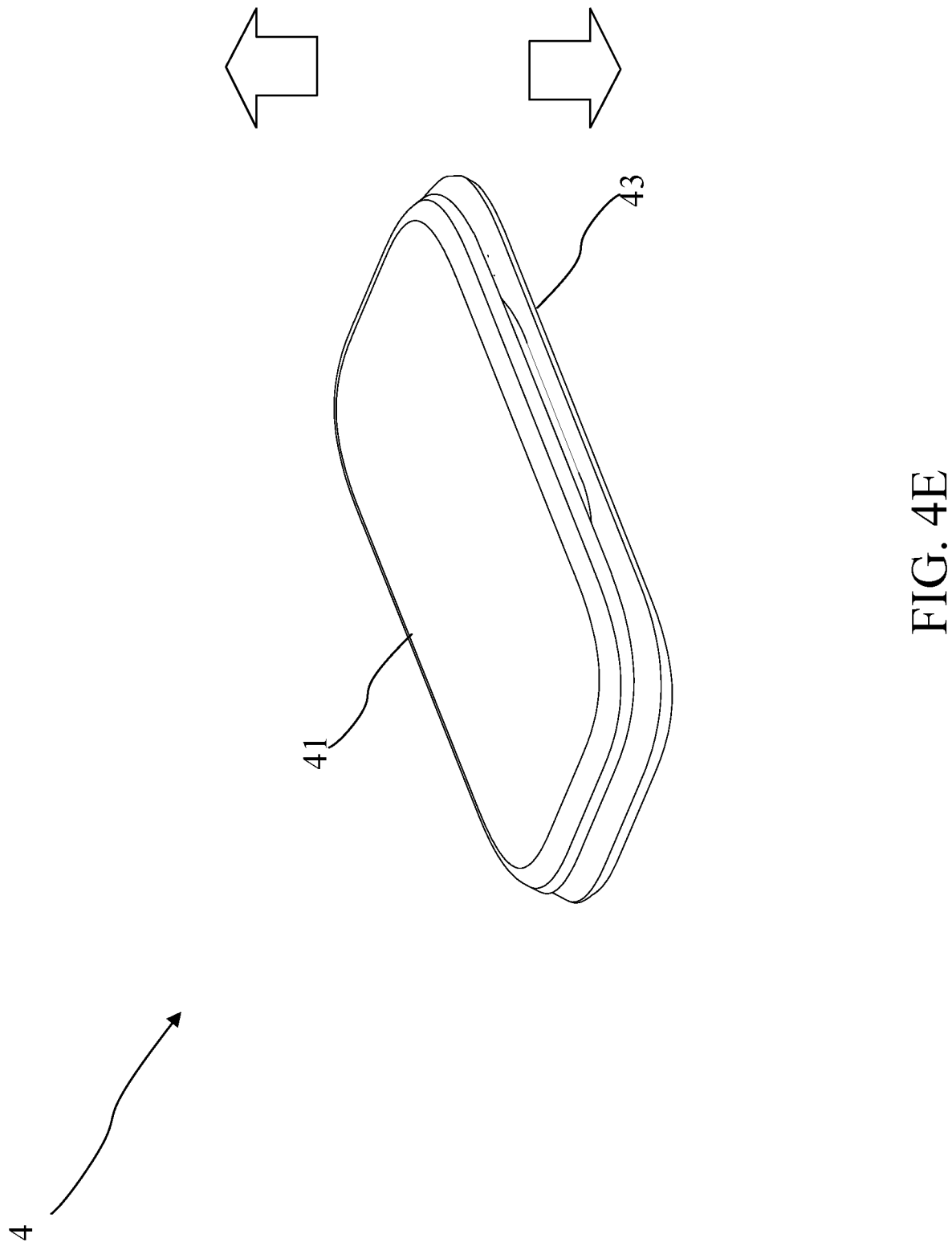
FIGS. 4E and 4F are operation schematic diagrams of an accessory according to some embodiments of the present invention.

Please also refer to FIG. 4E, which shows an operation schematic diagram of the accessory 4 according to some embodiments of the present invention. Specifically, when a distance between the first base 41 and the second base 43 increases (as shown by the arrows), the first base 41 pulls one end of the first flexible element 45 into motion. Since the fastener 431 of the second base 43 is engaged with the first track 451 of the first flexible element 45, the fastener 431 slides along the first track 451 when one end of the first flexible element 45 moves with the first base 41. As the fastener 431 slides to one end of the first track 451, as shown in FIG. 4B, a deformation occurs to the first flexible element 45, and such deformation can maintain a distance between one end of the first base 41 and one end of the second base 43.

Figure 4F:
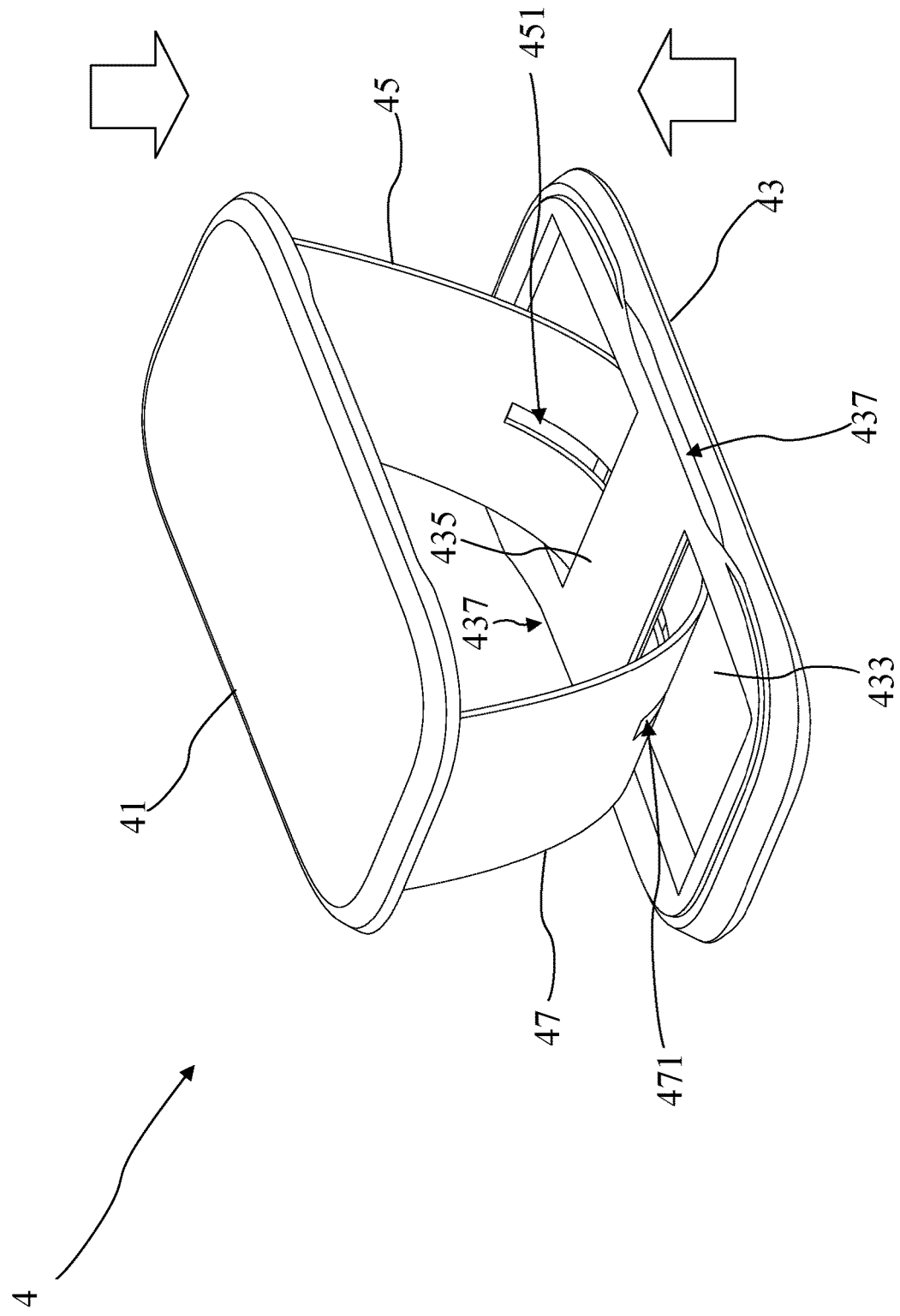

Please also refer to FIG. 4F, which shows another operation schematic diagram of the accessory 4 according to some embodiments of the present invention. In contrast to the above-described operation, when the distance between the first base 41 and the second base 43 decreases (as shown by the arrows), the first base 41 pushes one end of the first flexible element 45 into motion. Since the fastener 431 of the second base 43 is engaged with the first track 451 of the first flexible element 45, the fastener 431 slides along the first track 451 when one end of the first flexible element 45 moves with the first base 41. As the fastener 431 slides to another end of the first track 451, a deformation occurs to the first flexible element 45 for restoring the first flexible element 45 to its original state.

Similarly, when the distance between the first base 41 and the second base 43 increases, the first base 41 pulls one end of the second flexible element 47 into motion. Since the fastener 431 of the second base 43 is engaged with the second track 471 of the second flexible element 47, the fastener 431 slides along the second track 471 when one end of the second flexible element 47 moves with the first base 41. As the fastener 431 slides to one end of the second track 471, as shown in FIG. 4B, a deformation occurs to the second flexible element 47, and such deformation can maintain a distance between the other end 412 of the first base 41 and another end of the second base 43.

In contrast, when the distance between the first base 41 and the second base 43 decreases, the first base 41 pushes one end of the second flexible element 47 into motion. Since the fastener 431 of the second base 43 is engaged with the second track 471 of the second flexible element 47, the fastener 431 slides along the second track 471 when one end of the second flexible element 47 moves with the first base 41. Accordingly, a deformation occurs to the second flexible element 47 for restoring the second flexible element 47 to its original state.

Figure 4G:
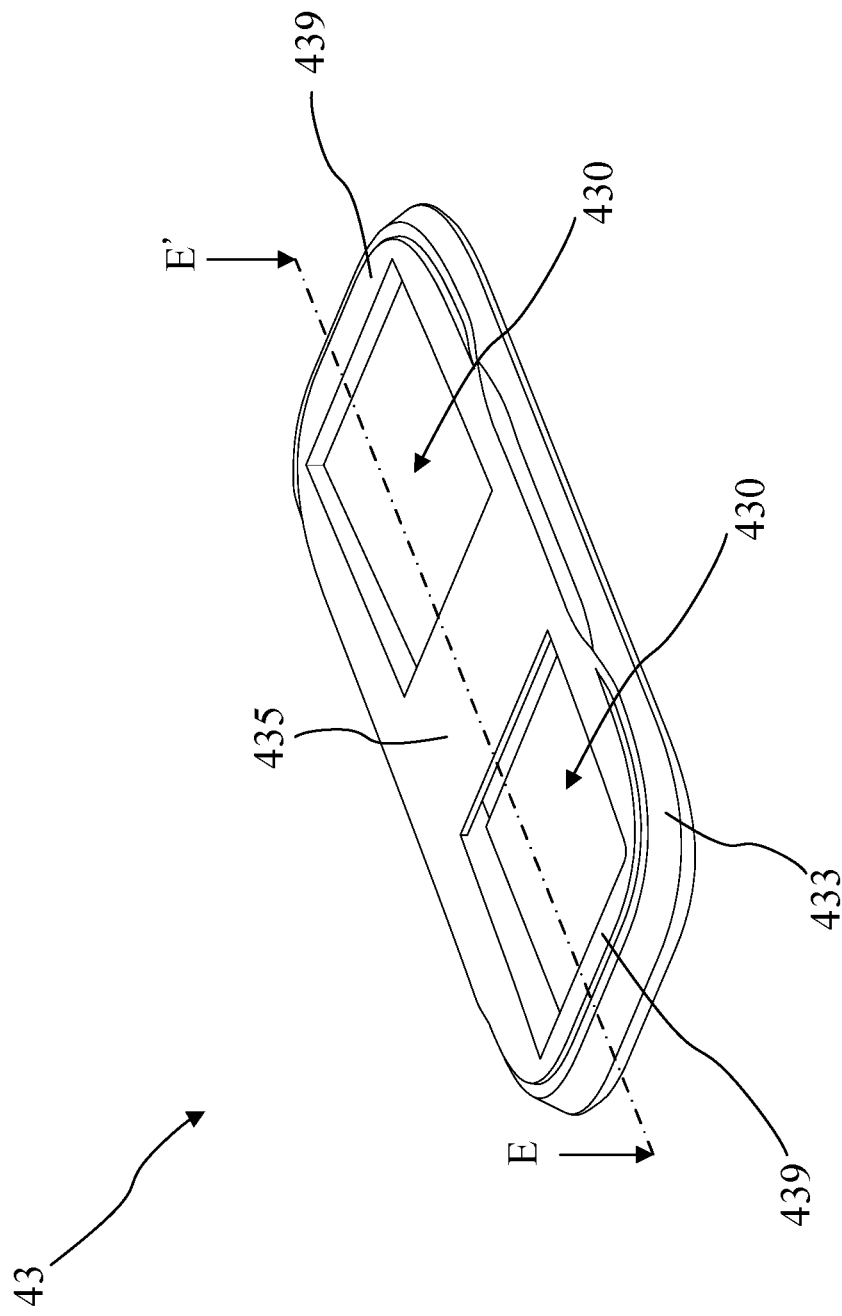
FIG. 4G is a three-dimensional diagram of a second base according to some embodiments of the present invention.
Figure 4H:
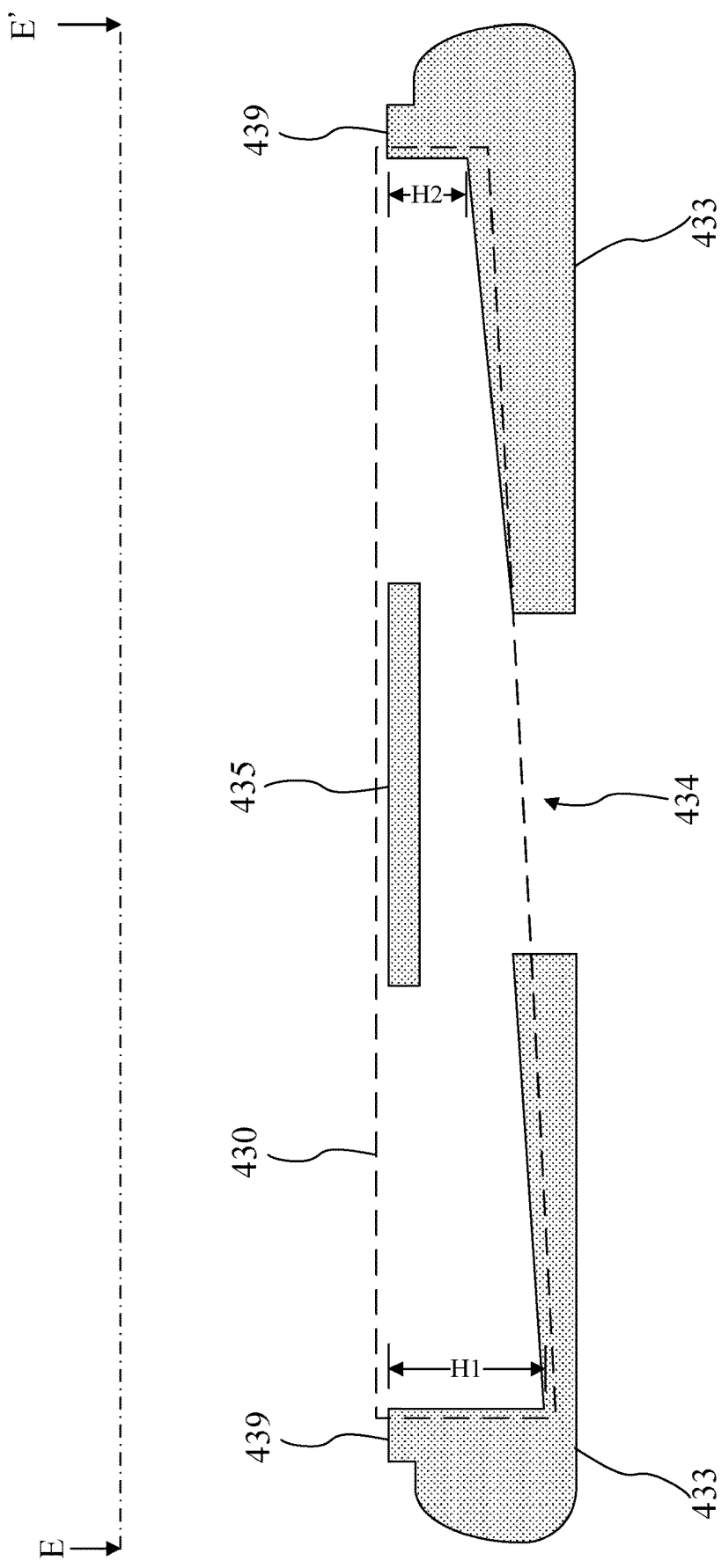
FIG. 4H is a cross-sectional diagram of a second base according to some embodiments of the present invention.

Please refer to FIGS. 4G and 4H. FIG. 4G shows a three-dimensional diagram of the second base 43 according to some embodiments of the present invention. FIG. 4H shows a cross-sectional diagram of the second base 43 taken along a section line E-E' in FIG. 4G according to some embodiments of the present invention. In some embodiments, the accommodating space 430 is formed at a recess of the second base 43, and a depth H1 of one end of the recess is different from a depth H2 of another end of the recess, so as to better enable the first flexible element 45 and the second flexible element 47 to slide in the accommodating space 430.

Figure 4I:
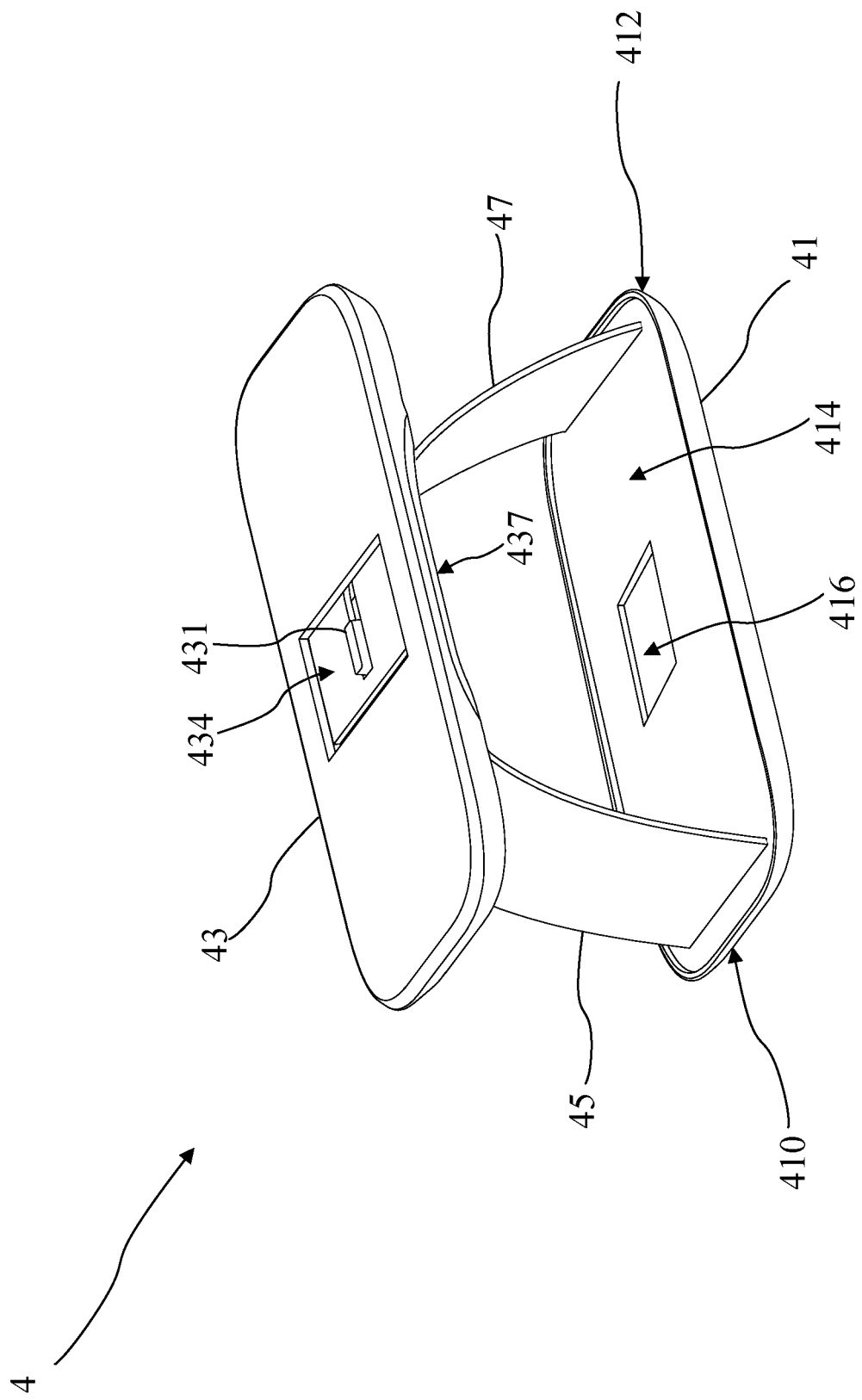
FIG. 4I is a three-dimensional diagram of an accessory according to some embodiments of the present invention.

In some embodiments, the second base 43 is disposed on a back surface of the handheld device, and the first base 41 is provided with a recess for placing an object depending on user requirements. Please refer to FIG. 4I, which shows a three-dimensional diagram of the accessory 4 according to some embodiments of the present invention. In some embodiments, the first base 41 is provided with a recess 416 for accommodating an object (for example, a sensor chip sch as a credit card chip or an EasyCard chip), to allow a user to perform a chip sensing operation using the first base 41.

Figure 5A:
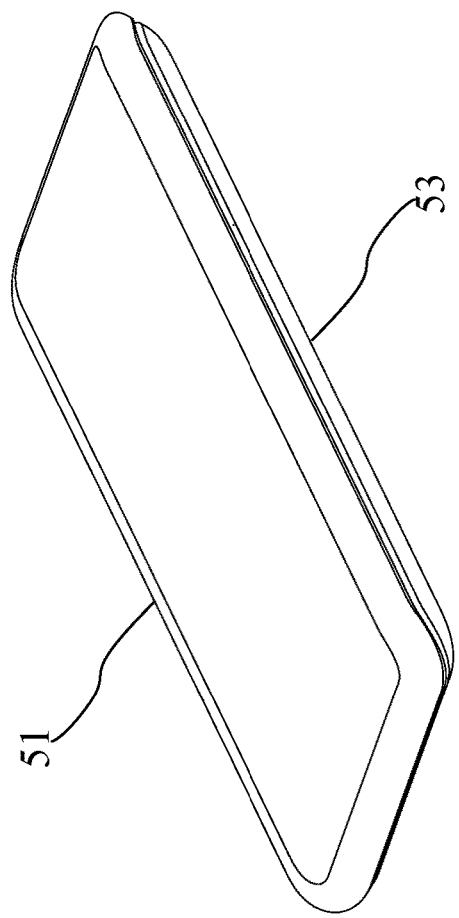
FIG. 5A is a three-dimensional diagram of an accessory according to some embodiments of the present invention.
Figure 5A:
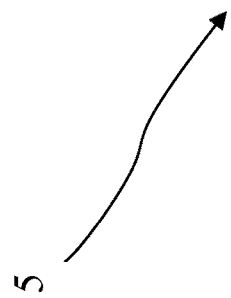
Figure 5B:
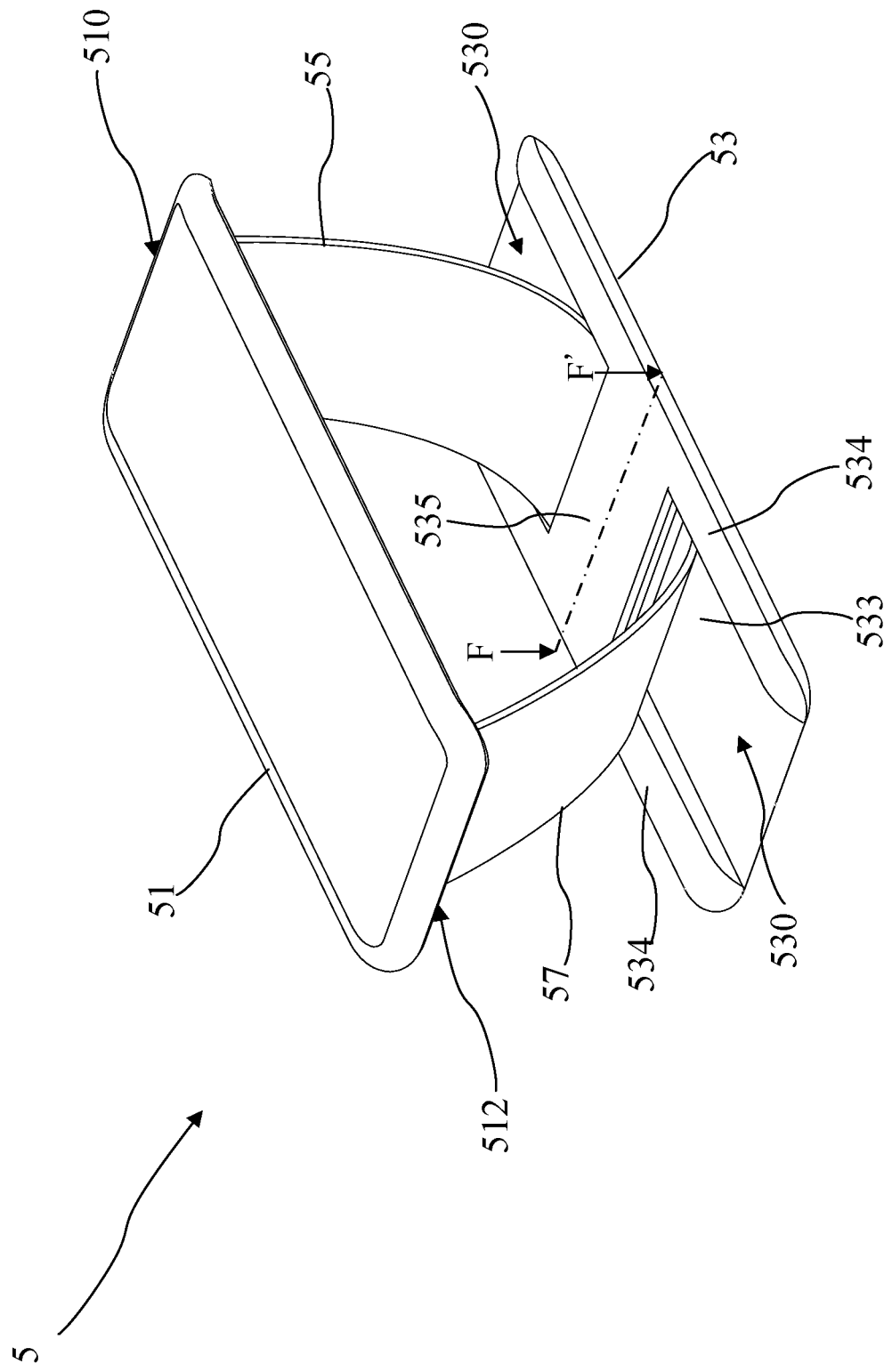
FIG. 5B is a three-dimensional diagram of an accessory according to some embodiments of the present invention.

Please refer to FIGS. 5A and 5B. FIG. 5A shows a three-dimensional diagram of an accessory 5 according to some embodiments of the present invention. FIG. 5B shows another three-dimensional diagram of the accessory 5 according to some embodiments of the present invention. The accessory 5 includes a first base 51, a second base 53, a first flexible element 55 and a second flexible element 57.

Specifically, the first flexible element 55 and the second flexible element 57 are respectively disposed at the first base 51, and are located between the first base 51 and the second base 53. One end of the first flexible element 55 is disposed on one end 510 of the first base 51, and one end of the second flexible element 57 is disposed on another end 512 of the first base 51. The second base 53 has an accommodating space 530, and the first flexible element 55 and the second flexible element 57 are accommodated in the accommodating space 530 when the first base 51 and the second base 53 are adjoining.

Figure 5C:
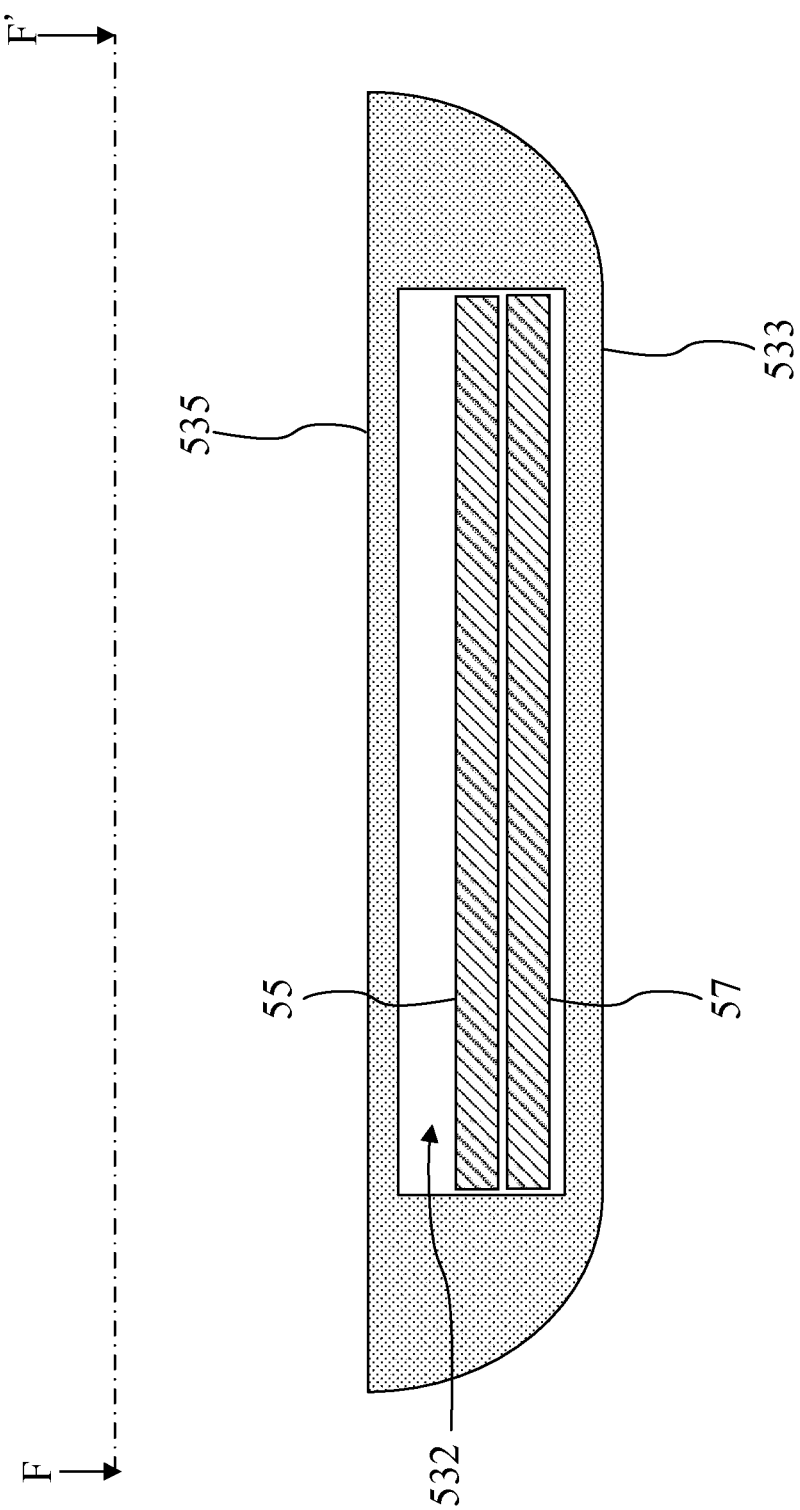
FIG. 5C is a cross-sectional diagram of an accessory according to some embodiments of the present invention.

Please also refer to FIG. 5C, which shows a cross-sectional diagram of the accessory 5 taken along a section line F-F' in FIG. 5B. Specifically, the second base 53 has a body 533, two sidewalls 534 and a baffle 535. The two sidewalls 534 are disposed at an interval at a top portion of the body 533 and together with the body 533 form the accommodating space 530. The baffle 535 bridges the two sidewalls 534, and the baffle 535 and the body 533 together define a space 532. The first flexible element 55 and the second flexible element 57 mutually overlap and pass through the space 532. The first flexible element 55 and the second flexible element 57 are flexed based on a change of a distance between the first base 51 and the second base 53.

Figure 5D:
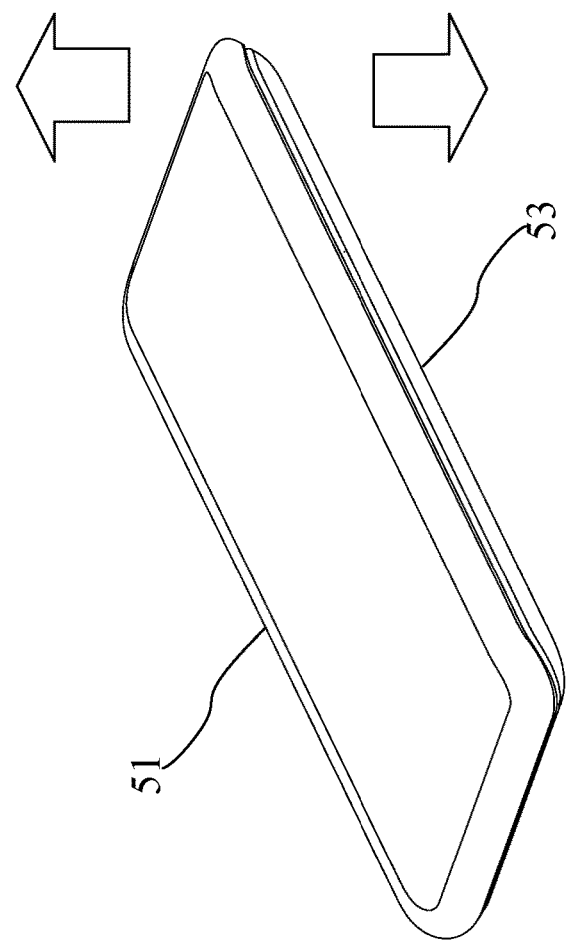
FIGS. 5D and 5E are operation schematic diagrams of an accessory according to some embodiments of the present invention.

Please refer to FIG. 5D, which shows an operation schematic diagram of the accessory 5 according to some embodiments of the present invention. Specifically, when the distance between the first base 51 and the second base 53 increases (as shown by the arrows), the first base 51 pulls one end of the first flexible element 55 into motion. Since the first flexible element 55 passes through the space 532 defined by the baffle 535 and the body 533, as one end of the first flexible element 55 moves with the first base 51, a deformation occurs to the first flexible element 55 as shown in FIG. 5B, and such deformation can maintain a distance between one end of the first base 51 and one end of the second base 53.

Figure 5E:
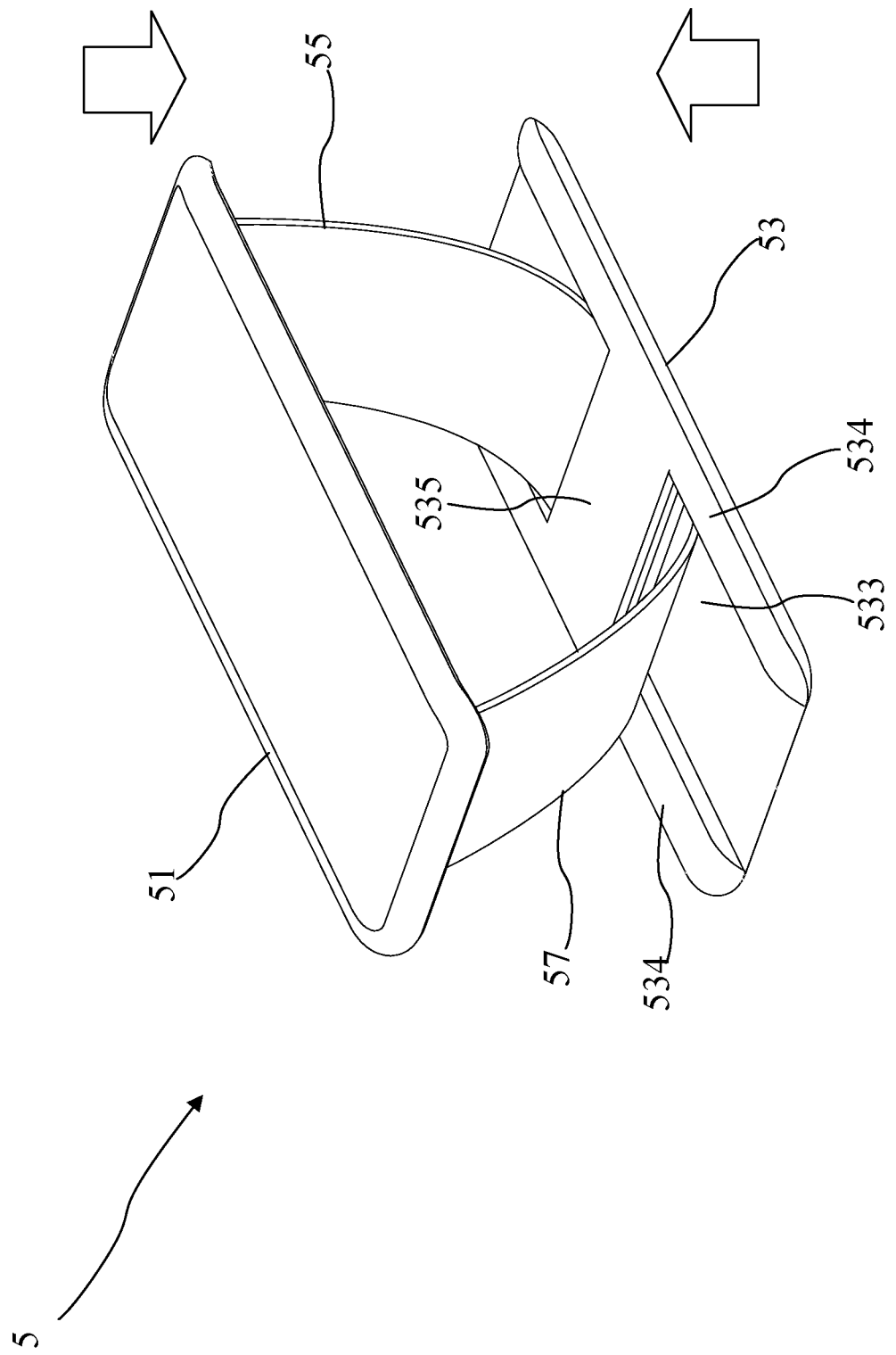

Please also refer to FIG. 5E, which shows another operation schematic diagram of the accessory 5 according to some embodiments of the present invention. In contrast to the above-described operation, when the distance between the first base 51 and the second base 53 decreases (as shown by the arrows), the first base 51 pushes one end of the first flexible element 55 into motion. Since the first flexible element 55 passes through the space 532 defined by the baffle 535 and the body 533, a deformation occurs to the first flexible element 55 for restoring the first flexible element 55 to its original state when one end of the first flexible element 55 moves with the first base 51.

Similarly, when the distance between the first base 51 and the second base 53 increases, the first base 51 pulls one end of the second flexible element 57 into motion. Since the second flexible element 57 passes through the space 532 defined by the baffle 535 and the body 533, when one end of the second flexible element 57 moves with the first base 51, a deformation occurs to the second flexible element 57 as shown in FIG. 5B, and such deformation can maintain the distance between one end of the first base 51 and one end of the second base 53.

In contrast, when the distance between the first base 51 and the second base 53 decreases, the first base 51 pushes one end of the second flexible element 57 into motion. Since the second flexible element 57 passes through the space 532 defined by the baffle 535 and the body 533, a deformation occurs to the second flexible element 57 for restoring the second flexible element 57 to its original state when one end of the second flexible element 57 moves with the first base 51.

Figure 6A:
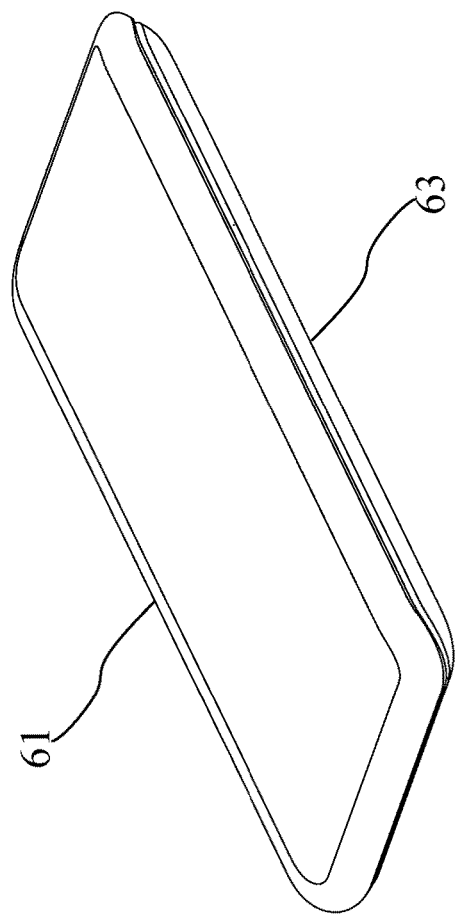
FIG. 6A is a three-dimensional diagram of an accessory according to some embodiments of the present invention.
Figure 6B:
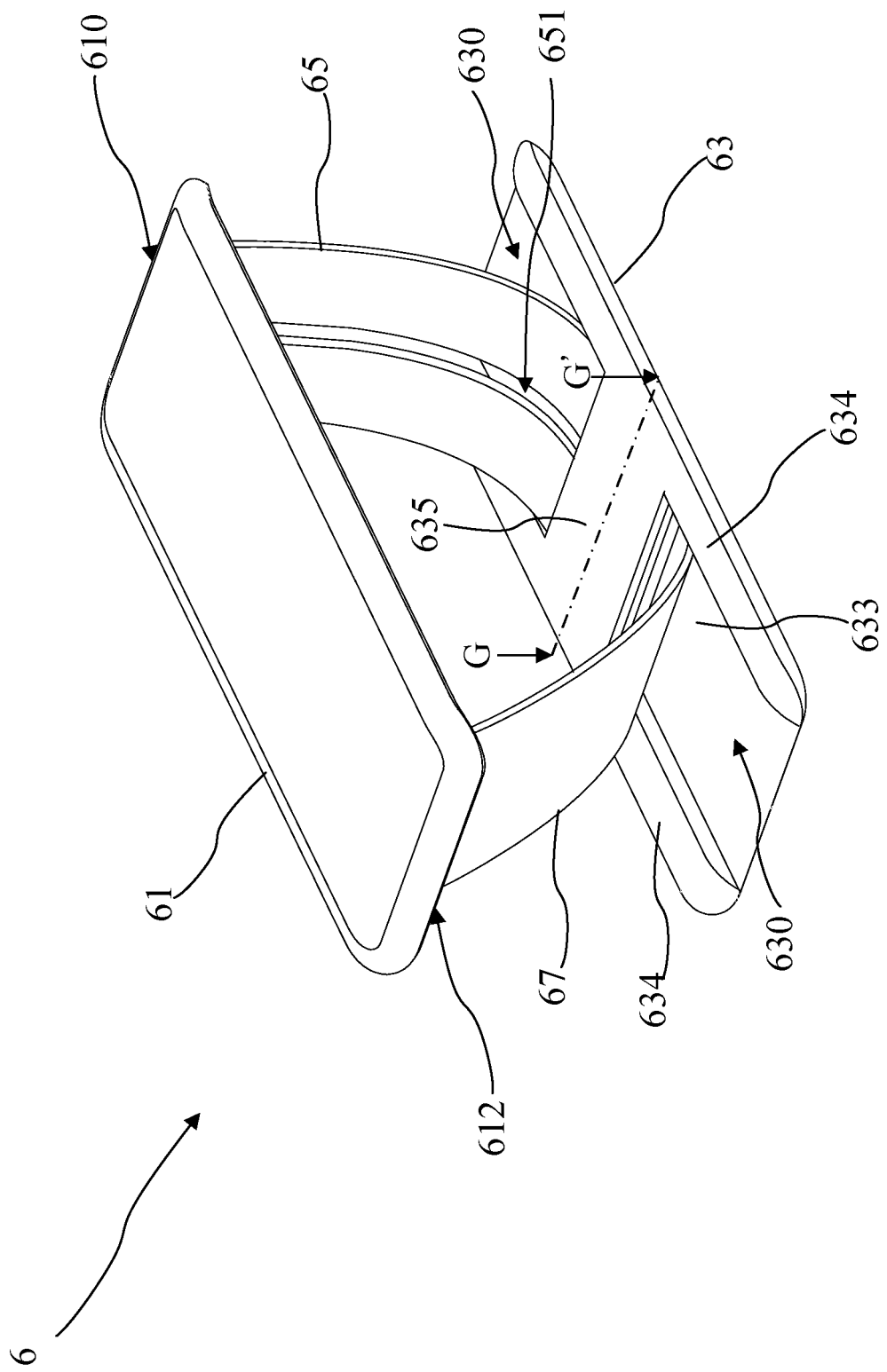
FIG. 6B is a three-dimensional diagram of an accessory according to some embodiments of the present invention.
Figure 6C:
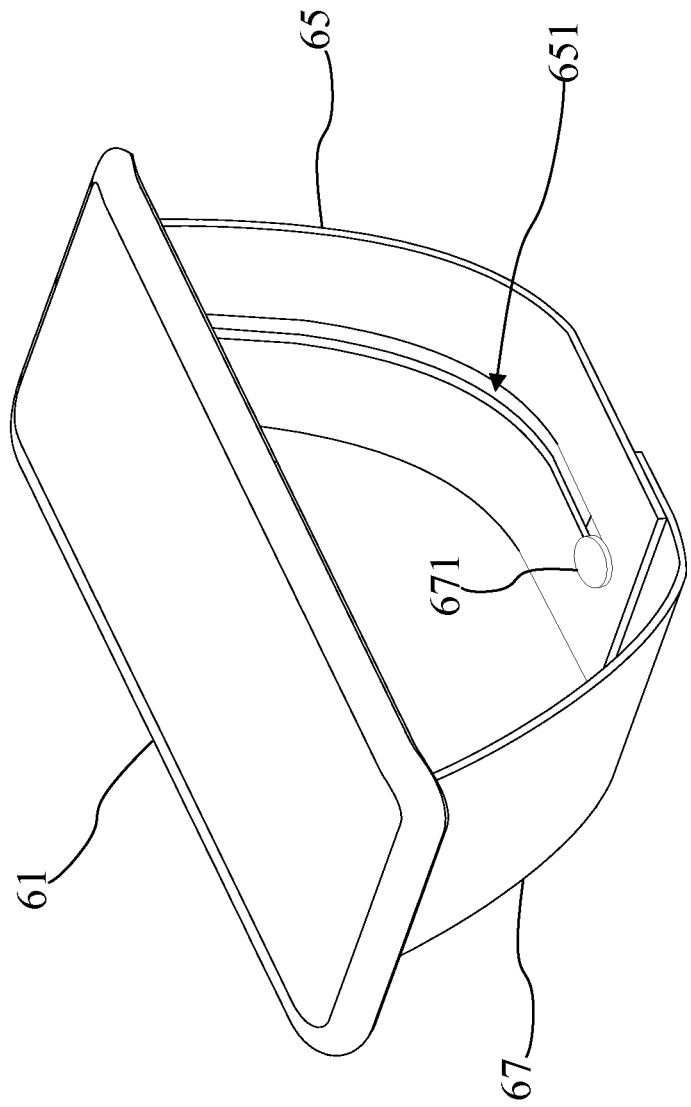
FIG. 6C is a schematic diagram of an accessory with a second base removed according to some embodiments of the present invention.

Please refer to FIGS. 6A and 6B. FIG. 6A shows a three-dimensional diagram of an accessory 6 according to some embodiments of the present invention. FIG. 6B shows another three-dimensional diagram of the accessory 6 according to some embodiments of the present invention. The accessory 6 includes a first base 61, a second base 63, a first flexible element 65 and a second flexible element 67. Please also refer to FIG. 6C, which shows a schematic diagram of the accessory 6 with the second base 63 removed according to some embodiments of the present invention.

Specifically, the first flexible element 65 and the second flexible element 67 are respectively disposed at the first base 61, and are located between the first base 61 and the second base 63. One end of the first flexible element 65 is disposed on one end 610 of the first base 61, and one end of the second flexible element 67 is disposed on another end 612 of the first base 61. The second base 63 has an accommodating space 630, and the first flexible element 65 and the second flexible element 67 are accommodated in the accommodating space 630 when the first base 61 and the second base 63 are adjoining. The first flexible element 65 has a first track 651. The second flexible element 67 has a fastener 671.

Figure 6D:
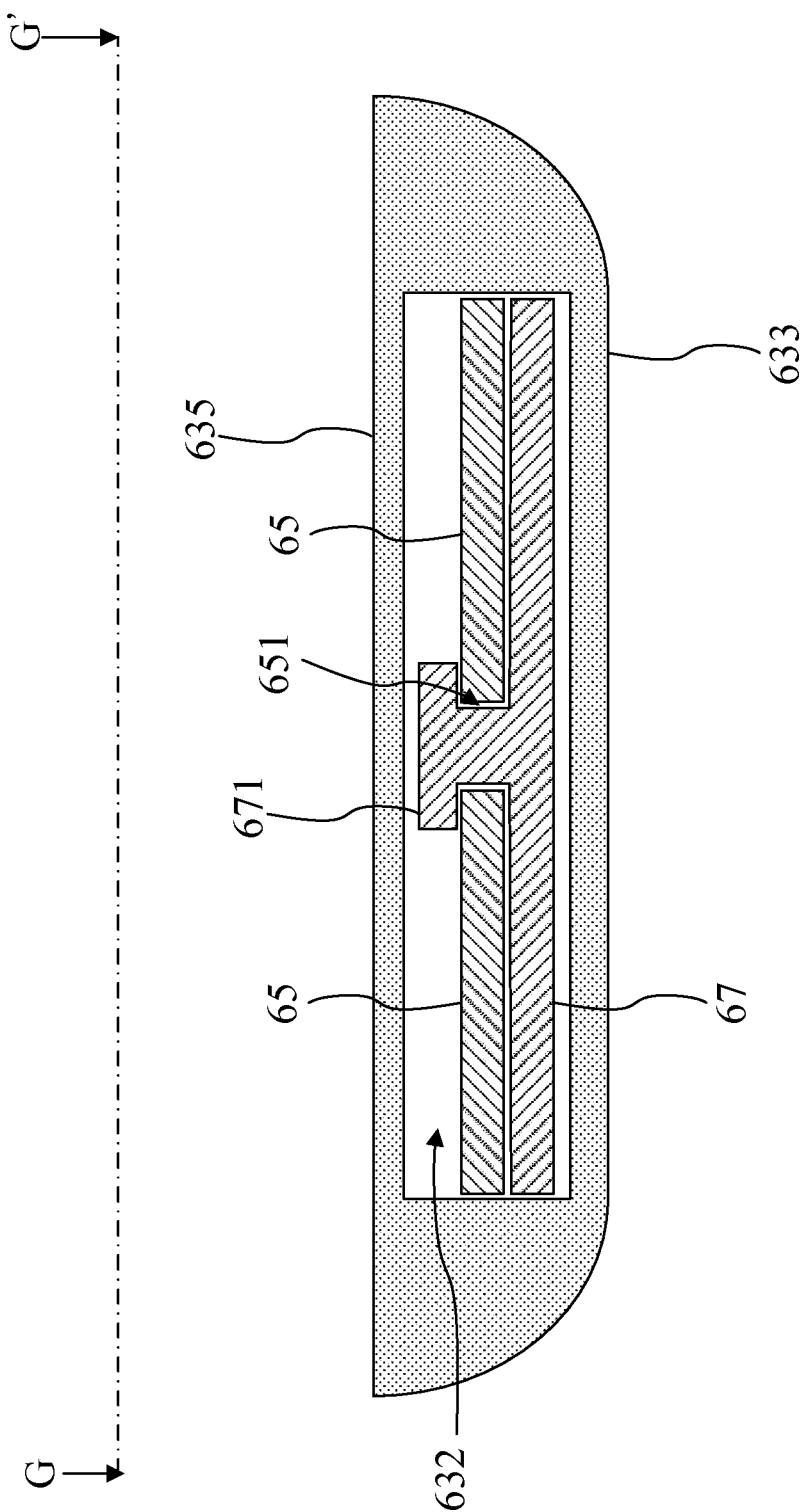
FIG. 6D is a cross-sectional diagram of an accessory according to some embodiments of the present invention.

Please also refer to FIG. 6D, which shows a cross-sectional diagram of the accessory 6 taken along a section line G-G' in FIG. 6B. Specifically, the second base 63 has a body 633, two sidewalls 634 and a baffle 635. The two sidewalls 634 are disposed at an interval at a top portion of the body 633 and together with the body 633 form the accommodating space 630. The baffle 635 bridges the two sidewalls 634, and the baffle 635 and the body 633 together define a space 632. The first flexible element 65 and the second flexible element 67 mutually overlap and pass through the space 632. The fastener 671 of the second flexible element 67 is for engaging with the first track 651 of the first flexible element 65, so that the first flexible element 65 and the second flexible element 67 may slide relative to each other. The first flexible element 65 is flexed based on sliding of the fastener 671 along the first track 651, and the second flexible element 67 is flexed based on sliding of the fastener 671 along the first track 651.

Figure 6E:
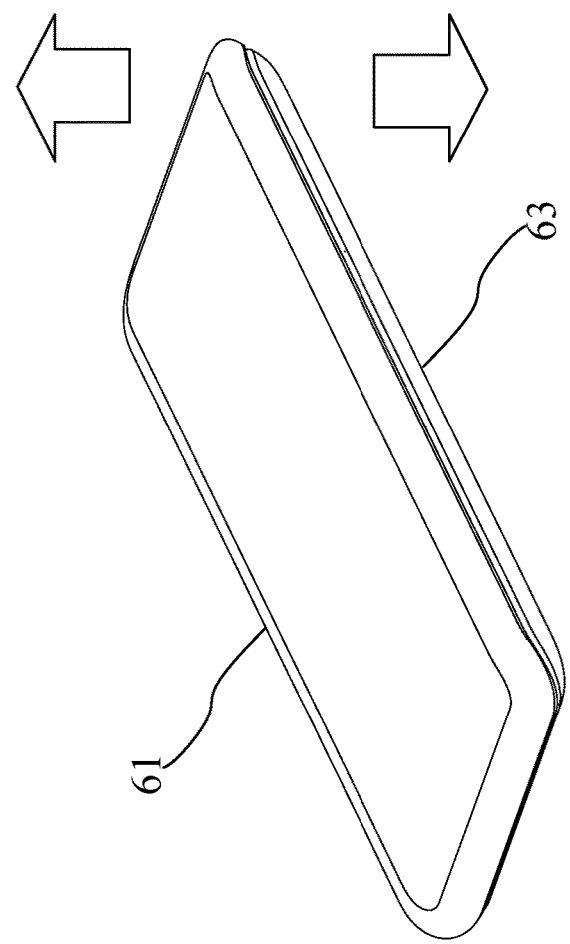
FIGS. 6E and 6F are operation schematic diagrams of an accessory according to some embodiments of the present invention.

Please also refer to FIG. 6E, which shows an operation schematic diagram of the accessory 6 according to some embodiments of the present invention. Specifically, when a distance between the first base 61 and the second base 63 increases (as shown by the arrows), the first base 61 pulls one end of the first flexible element 65 and one end of the second flexible element 67 into motion. Since the fastener 671 of the second flexible element 67 is engaged with the first track 651 of the first flexible element 65, the fastener 671 slides along the first track 651 when one end of the first flexible element 65 and one end of the second flexible element 67 move with the first base 61. As the fastener 671 slides to one end of the first track 651, as shown in FIG. 6B, a deformation occurs to the first flexible element 65 and the second flexible element 67, and such deformation can maintain a distance between the first base 61 and the second base 63.

Figure 6F:
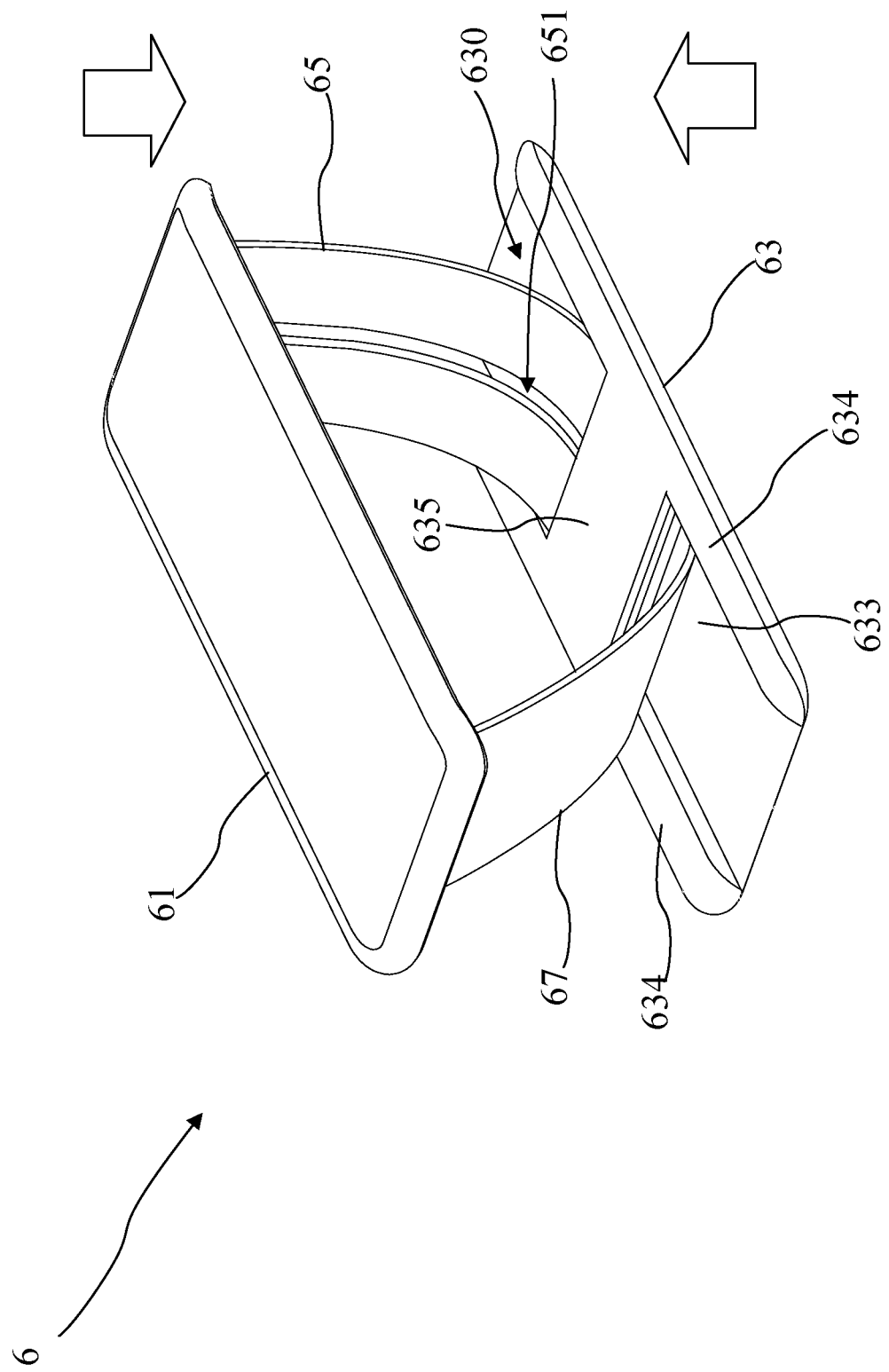

Please also refer to FIG. 6F, which shows another operation schematic diagram of the accessory 6 according to some embodiments of the present invention. Specifically, when the distance between the first base 61 and the second base 63 decreases (as shown by the arrows), the first base 61 pushes one end of the first flexible element 65 and one end of the second flexible element 67 into motion. Since the fastener 671 of the second flexible element 67 is engaged with the first track 651 of the first flexible element 65, the fastener 671 slides along the first track 651 as one end of the first flexible element 65 and one end of the second flexible element 67 move with the first base 61. As the fastener 671 slides to another end of the first track 651, a deformation occurs to the first flexible element 65 and the second flexible element 67 for restoring the first flexible element 65 and the second flexible element 67 to their original states.

Figure 7A:
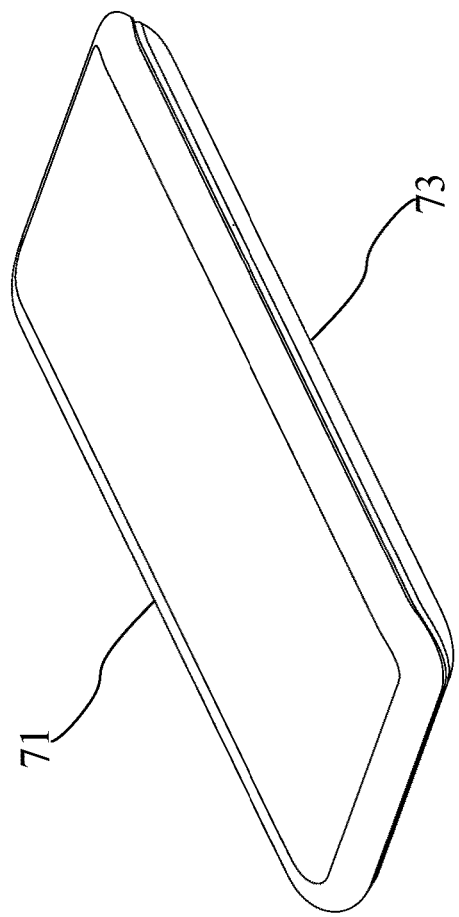
FIG. 7A is a three-dimensional diagram of an accessory according to some embodiments of the present invention.
Figure 7A:
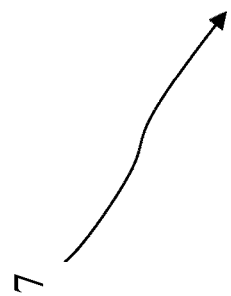
Figure 7B:
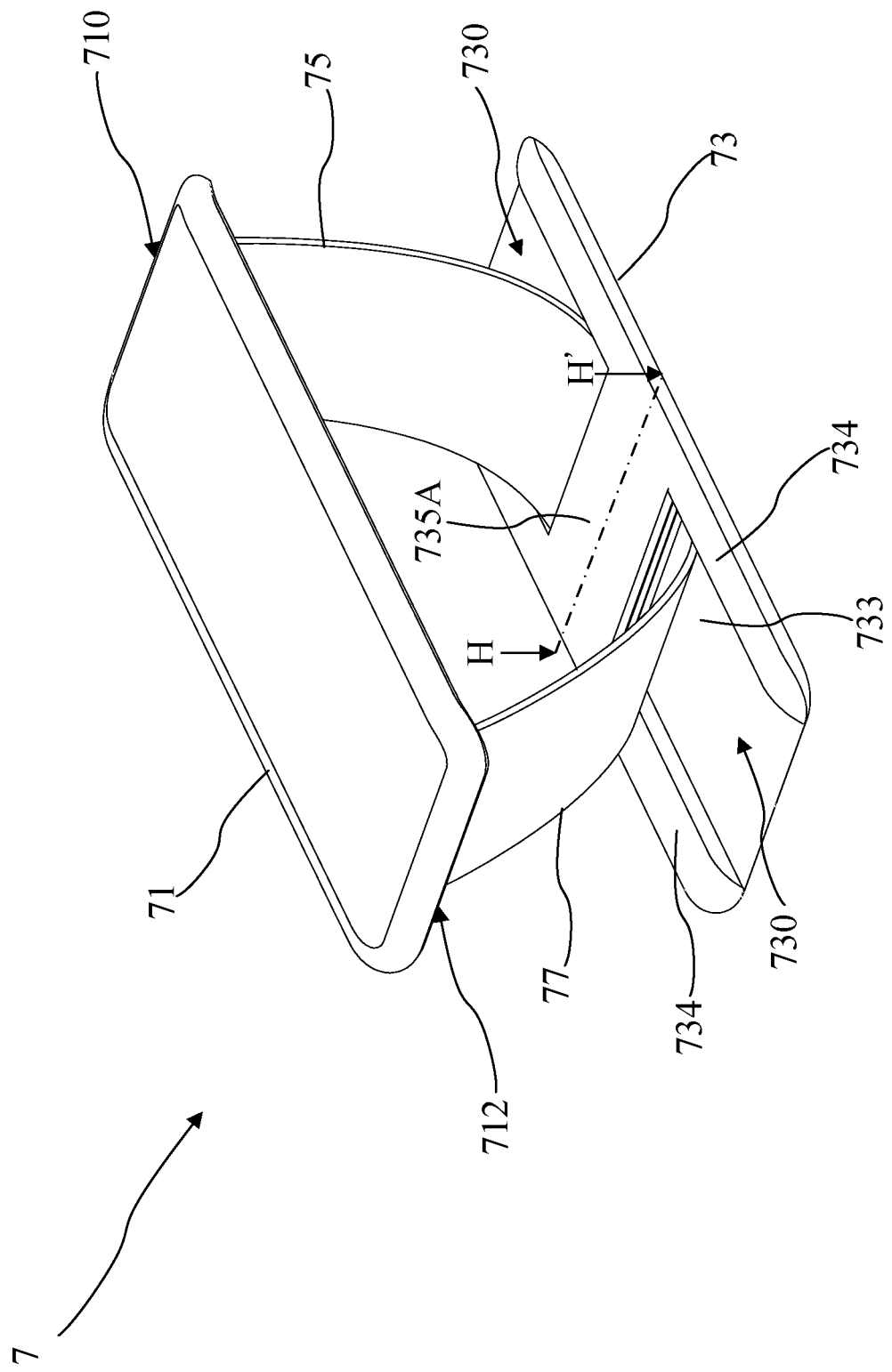
FIG. 7B is a three-dimensional diagram of an accessory according to some embodiments of the present invention.

Please refer to FIGS. 7A and 7B. FIG. 7A shows a three-dimensional diagram of an accessory 7 according to some embodiments of the present invention. FIG. 7B shows another three-dimensional diagram of the accessory 7 according to some embodiments of the present invention. The accessory 7 includes a first base 71, a second base 73, a first flexible element 75 and a second flexible element 77.

Specifically, the first flexible element 75 and the second flexible element 77 are respectively disposed at the first base 71, and are located between the first base 71 and the second base 73. One end of the first flexible element 75 is disposed on one end 710 of the first base 71, and one end of the second flexible element 77 is disposed on another end 712 of the first base 71. The second base 73 has an accommodating space 730, and the first flexible element 75 and the second flexible element 77 are accommodated in the accommodating space 730 when the first base 71 and the second base 73 are adjoining.

Figure 7C:
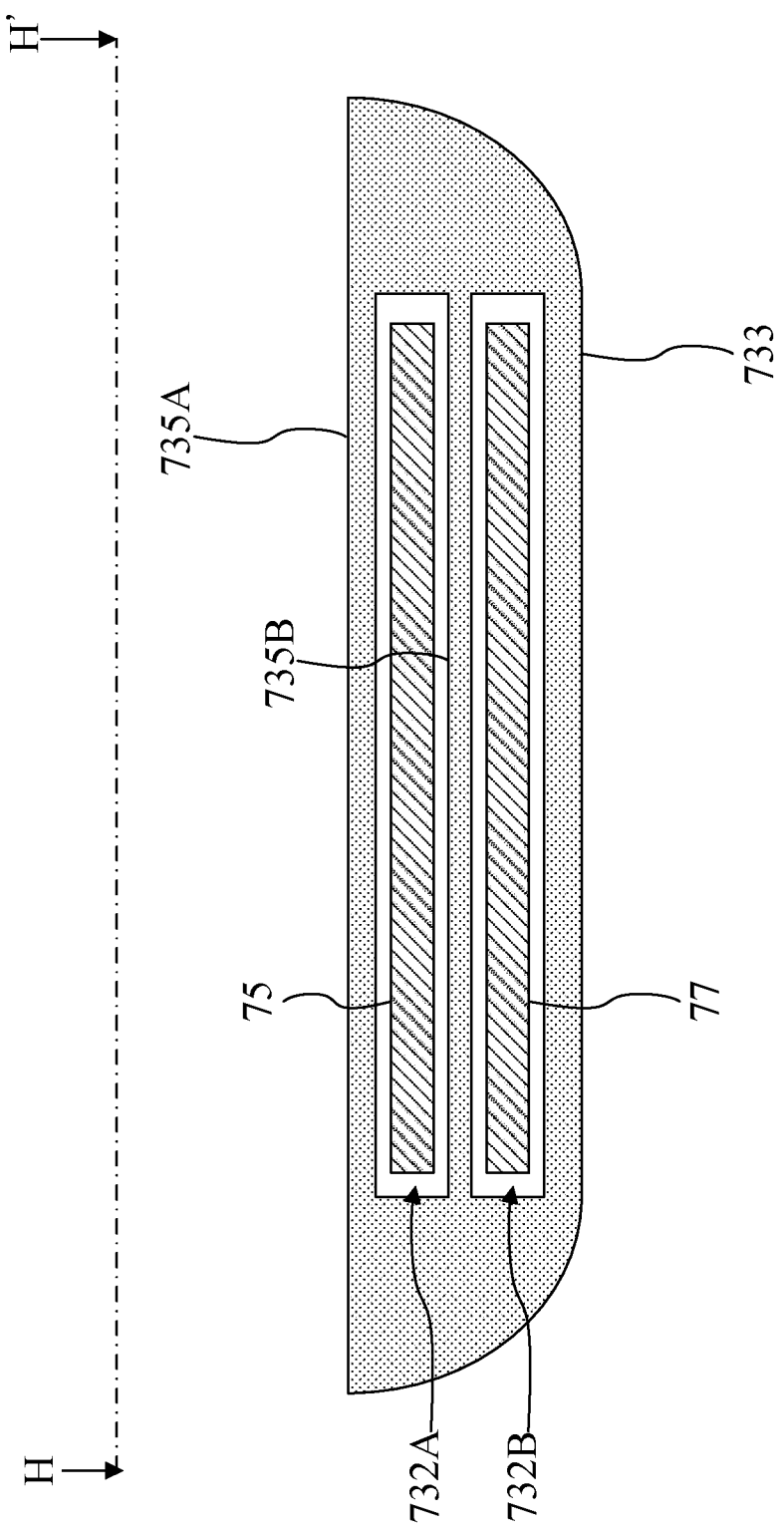
FIG. 7C is a cross-sectional diagram of an accessory according to some embodiments of the present invention.

Please also refer to FIG. 7C, which shows a cross-sectional diagram of the accessory 7 taken along a section line H-H' in FIG. 7B. Specifically, the second base 73 has a body 733, two sidewalls 734, a baffle 735A and another baffle 735B. The two sidewalls 734 are disposed at an interval on a top portion of the body 733, and together with the body 733 form the accommodating space 730. The baffle 735A and the baffle 735B respectively bridge the two sidewalls 734. The baffle 735B is located between the baffle 735A and the body 733. The baffle 735A and the baffle 735B define a space 732A therebetween, and the body 733 and the baffle 735B define a space 732B therebetween. The first flexible element 75 passes through the space 732A, and the second flexible element 77 passes through the space 732B. The first flexible element 75 and the second flexible element 77 are flexed based on a change of a distance between the first base 71 and the second base 73.

Figure 7D:
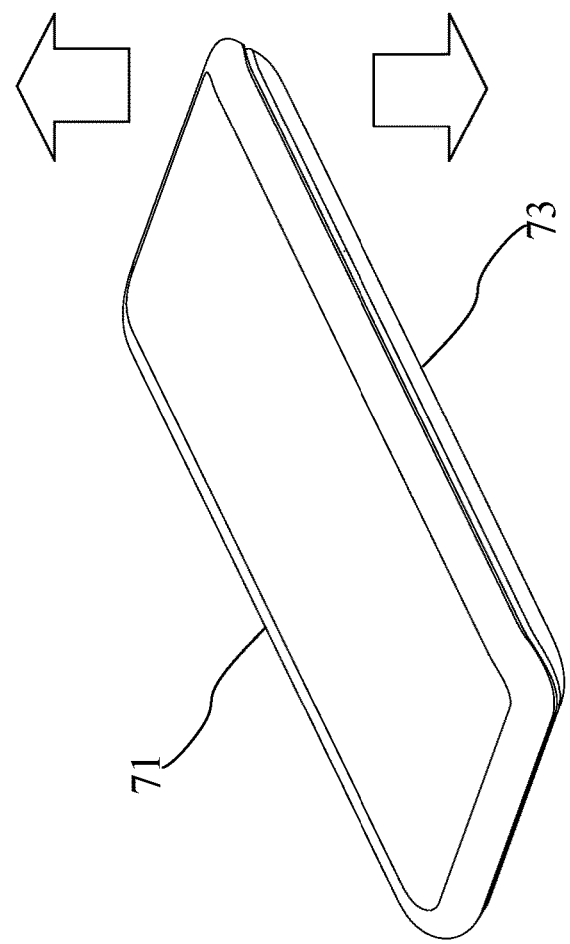
FIGS. 7D and 7E are operation schematic diagrams of an accessory according to some embodiments of the present invention.

Please refer to FIG. 7D, which shows an operation schematic diagram of the accessory 7 according to some embodiments of the present invention. Specifically, when the distance between the first base 71 and the second base 73 increases (as shown by the arrows), the first base 71 pulls one end of the first flexible element 75 into motion. Since the first flexible element 75 passes through the space 732A defined by the baffle 735A and the baffle 735B, when one end of the first flexible element 75 moves with the first base 71, a deformation occurs to the first flexible element 75 as shown in FIG. 7B, and such deformation can maintain a distance between one end of the first base 71 and one end of the second base 73.

Figure 7E:
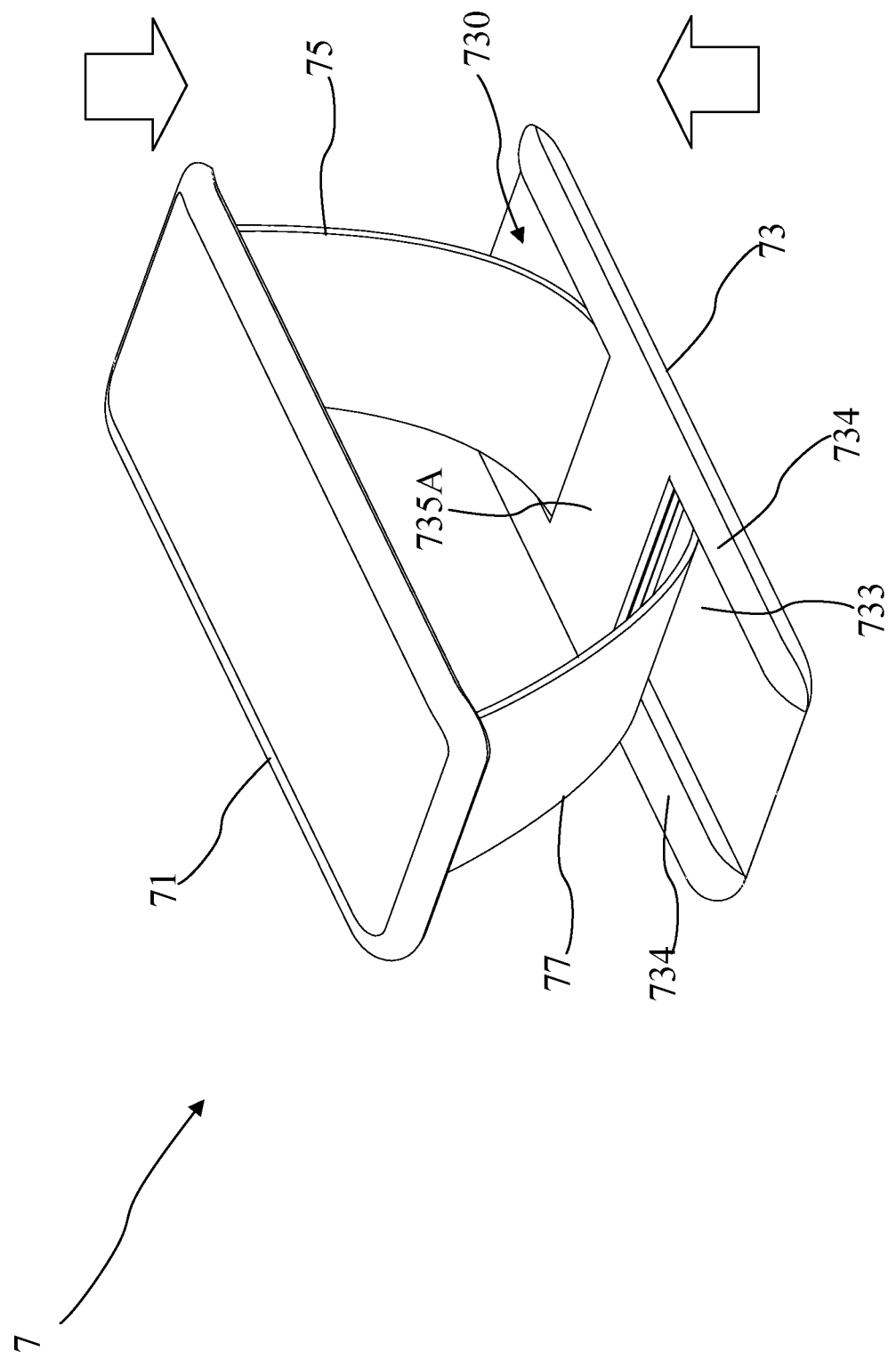

Please also refer to FIG. 7E, which shows another operation schematic diagram of the accessory 7 according to some embodiments of the present invention. In contrast to the above-described operation, when the distance between the first base 71 and the second base 73 decreases (as shown by the arrows), the first base 71 pushes one end of the first flexible element 75 into motion. Since the first flexible element 75 passes through the space 732A defined by the baffle 735A and the baffle 735B, a deformation occurs to the first flexible element 75 for restoring the first flexible element 75 to its original state when one end of the first flexible element 75 moves with the first base 71.

Similarly, when the distance between the first base 71 and the second base 73 increases, the first base 71 pulls one end of the second flexible element 77 into motion. Since the second flexible element 77 passes through the space 732B defined by the baffle 735B and the body 733, as one end of the second flexible element 77 moves with the first base 71, a deformation occurs to the second flexible element 77 as shown in FIG. 7B, and such deformation can maintain a distance between one end of the first base 71 and one end of the second base 73.

In contrast, when the distance between the first base 71 and the second base 73 decreases, the first base 71 pushes one end of the second flexible element 77 into motion. Since the second flexible element 77 passes through the space 732B defined by the baffle 735B and the body 733, a deformation occurs to the second flexible element 77 for restoring the second flexible element 77 to its original state when one end of the second flexible element 77 moves with the first base 71.

Figure 7F:
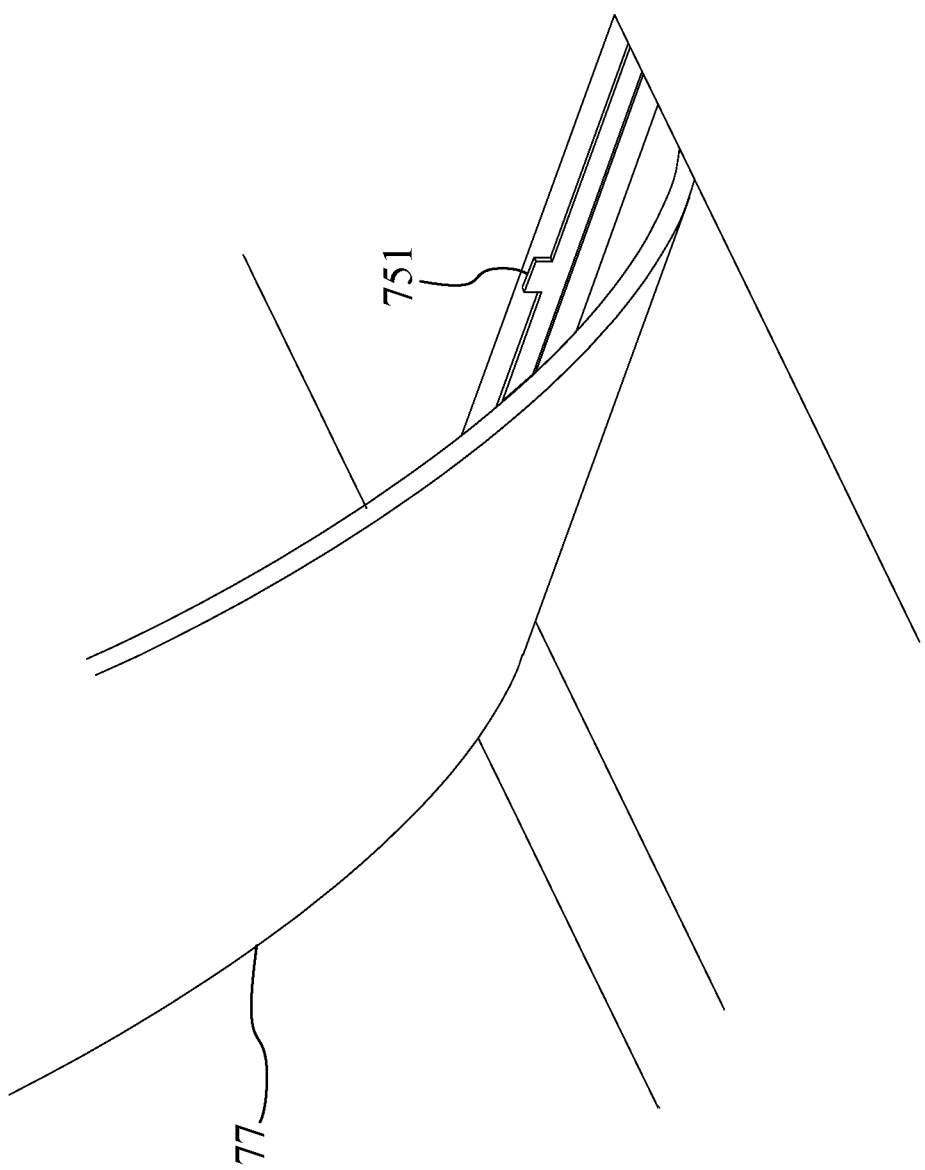
FIG. 7F is a partial enlarged diagram of an accessory according to some embodiments of the present invention.

In some embodiments, as shown in FIG. 7F, one end of the first flexible element 75 that passes through the space 732A has a stopping structure 751. When the distance between the first base 71 and the second base 73 increases, the stopping structure 751 presses against the baffle 735A to prevent the first flexible element 75 from departing the space 732A. Similarly, one end of the second flexible element 77 that passes through the space 732B has a stopping structure (not shown) for pressing against the baffle 735B to prevent the second flexible element 77 from departing the space 732B.

Figure 8A:
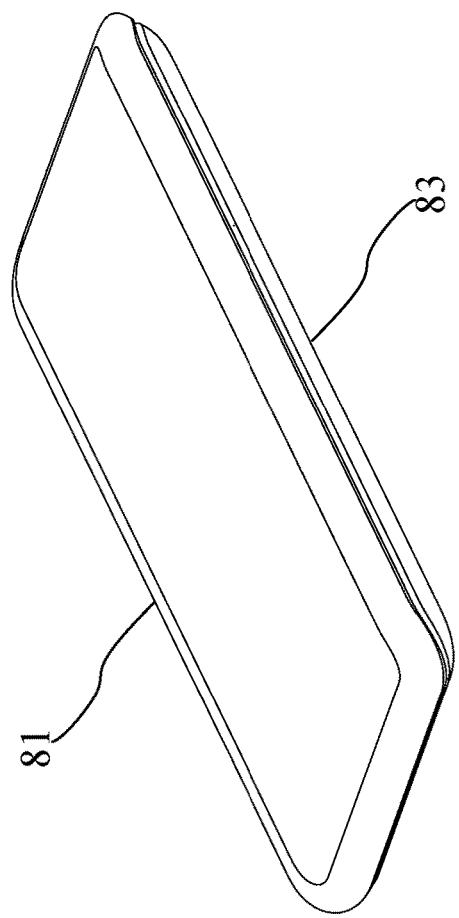
FIG. 8A is a three-dimensional diagram of an accessory according to some embodiments of the present invention.
Figure 8A:
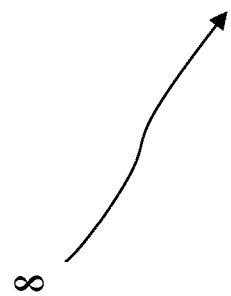
Figure 8B:
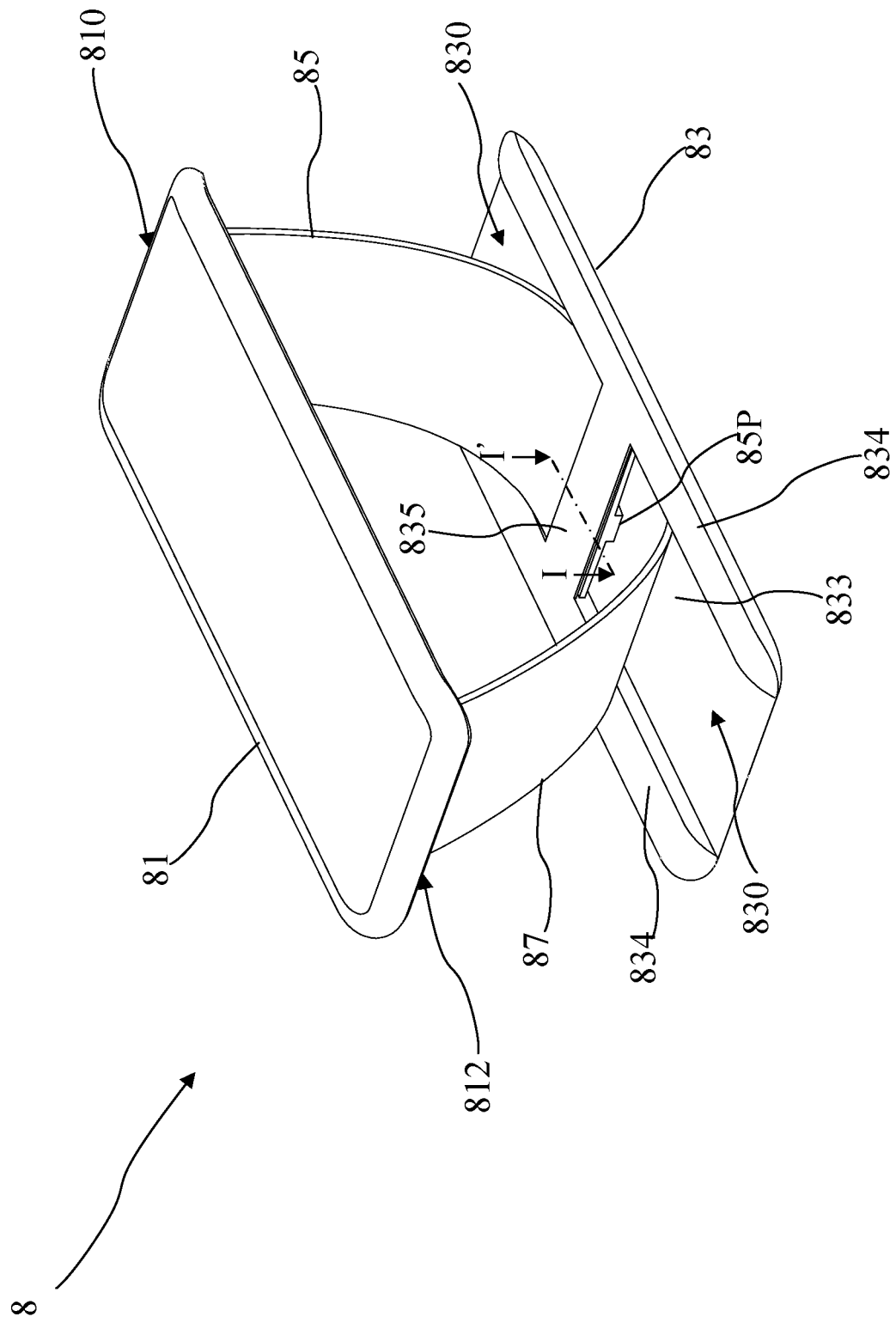
FIG. 8B is a three-dimensional diagram of an accessory according to some embodiments of the present invention.
Figure 8C:
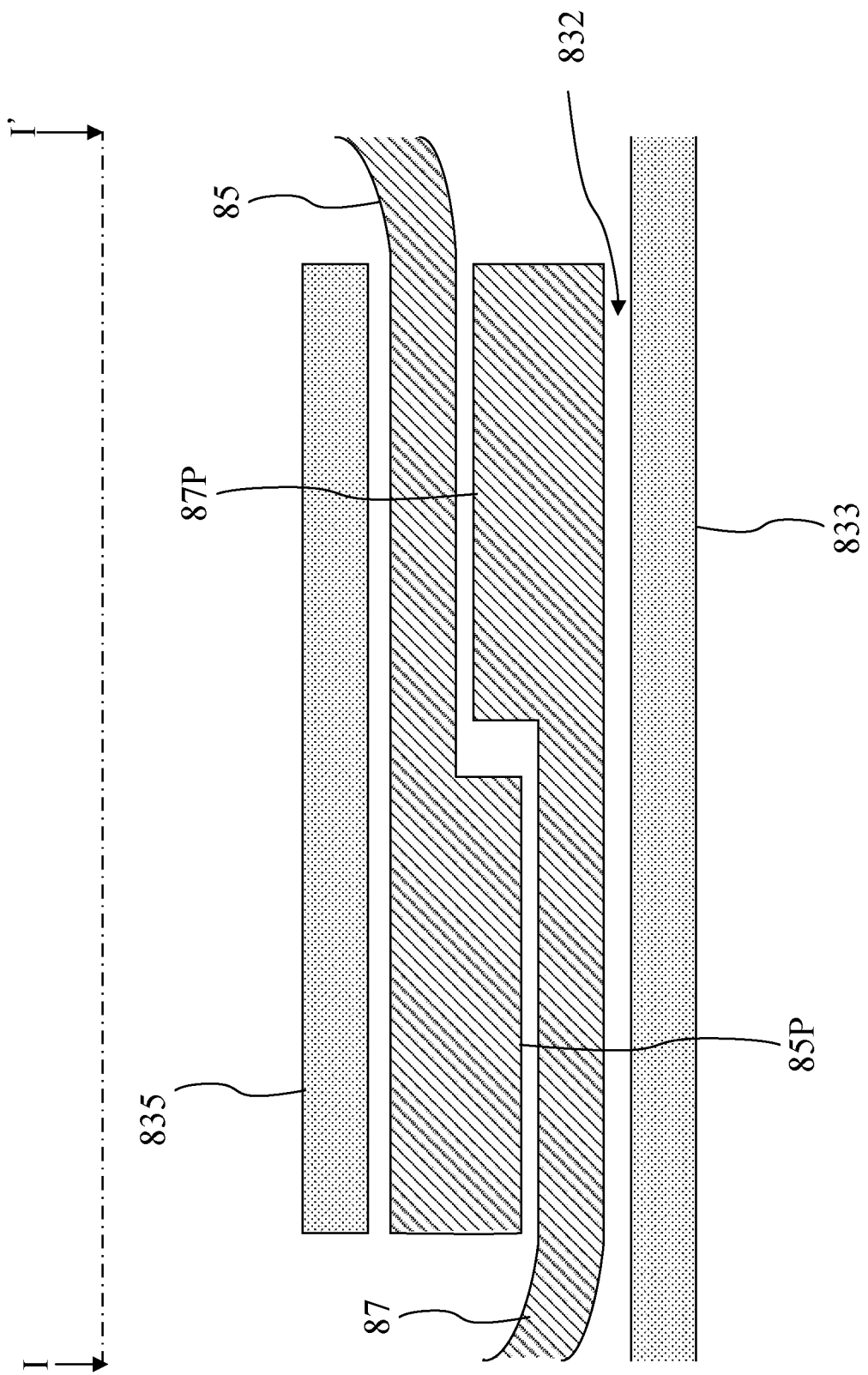
FIG. 8C is a cross-sectional diagram of an accessory according to some embodiments of the present invention.

Please refer to FIGS. 8A to 8C. FIG. 8A shows a three-dimensional diagram of an accessory 8 according to some embodiments of the present invention. FIG. 8B shows another three-dimensional diagram of the accessory 8 according to some embodiments of the present invention. FIG. 8C is a cross-sectional diagram of the accessory 8 taken along a section line I-I' in FIG. 8B. The accessory 8 includes a first base 81, a second base 83, a first flexible element 85 and a second flexible element 87.

Specifically, the first flexible element 85 and the second flexible element 87 are respectively disposed at the first base 81, and are located between the first base 81 and the second base 83. One end of the first flexible element 85 is disposed on one end 810 of the first base 81, and one end of the second flexible element 87 is disposed on another end 812 of the first base 81. The second base 83 has an accommodating space 830, and the first flexible element 85 and the second flexible element 87 are accommodated in the accommodating space 830 when the first base 81 and the second base 83 are adjoining. The second base 83 has a body 833, two sidewalls 834 and a baffle 835. The two sidewalls 834 are disposed at an interval at a top portion of the body 833 and together with the body 833 form the accommodating space 830. The baffle 835 bridges the two sidewalls 834, and the baffle 835 and the body 833 together define a space 832.

The first flexible element 85 and the second flexible element 87 mutually overlap and pass through the space 832. In the space 832, the first flexible element 85 is located between the baffle 835 and the second flexible element 87, and the second flexible element 87 is located between the first flexible element 85 and the body 833. Relative to one end of the first flexible element 85 disposed at the first base 81, another end of the first flexible element 85 has a first fastener 85P protruding toward the second flexible element 87. Relative to one end of the second flexible element 87 disposed at the first base 81, another end of the second flexible element 87 has a second fastener 87P protruding toward the first flexible element 85.

Figure 8D:
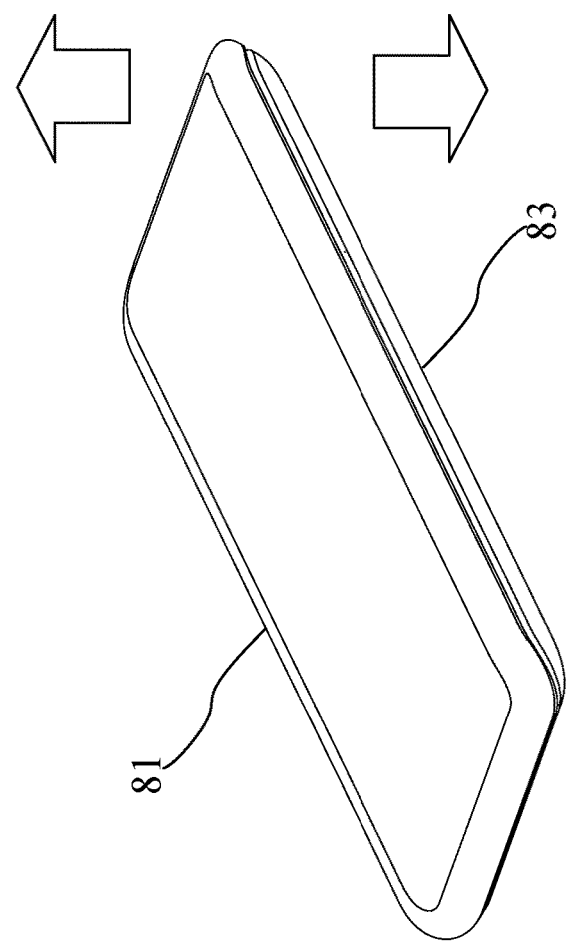
FIGS. 8D and 8E are operation schematic diagrams of an accessory according to some embodiments of the present invention.

Please refer to FIG. 8D, which shows an operation schematic diagram of the accessory 8 according to some embodiments of the present invention. Specifically, when a distance between the first base 81 and the second base 83 increases (as shown by the arrows), the first base 81 pulls one end of the first flexible element 85 into motion. Since the first flexible element 85 passes through the space 832 defined by the baffle 835 and the body 833, as one end of the first flexible element 85 moves with the first base 81, a deformation occurs to the first flexible element 85 as shown in FIG. 8B, and such deformation can maintain a distance between one end of the first base 81 and one end of the second base 83.

Figure 8E:
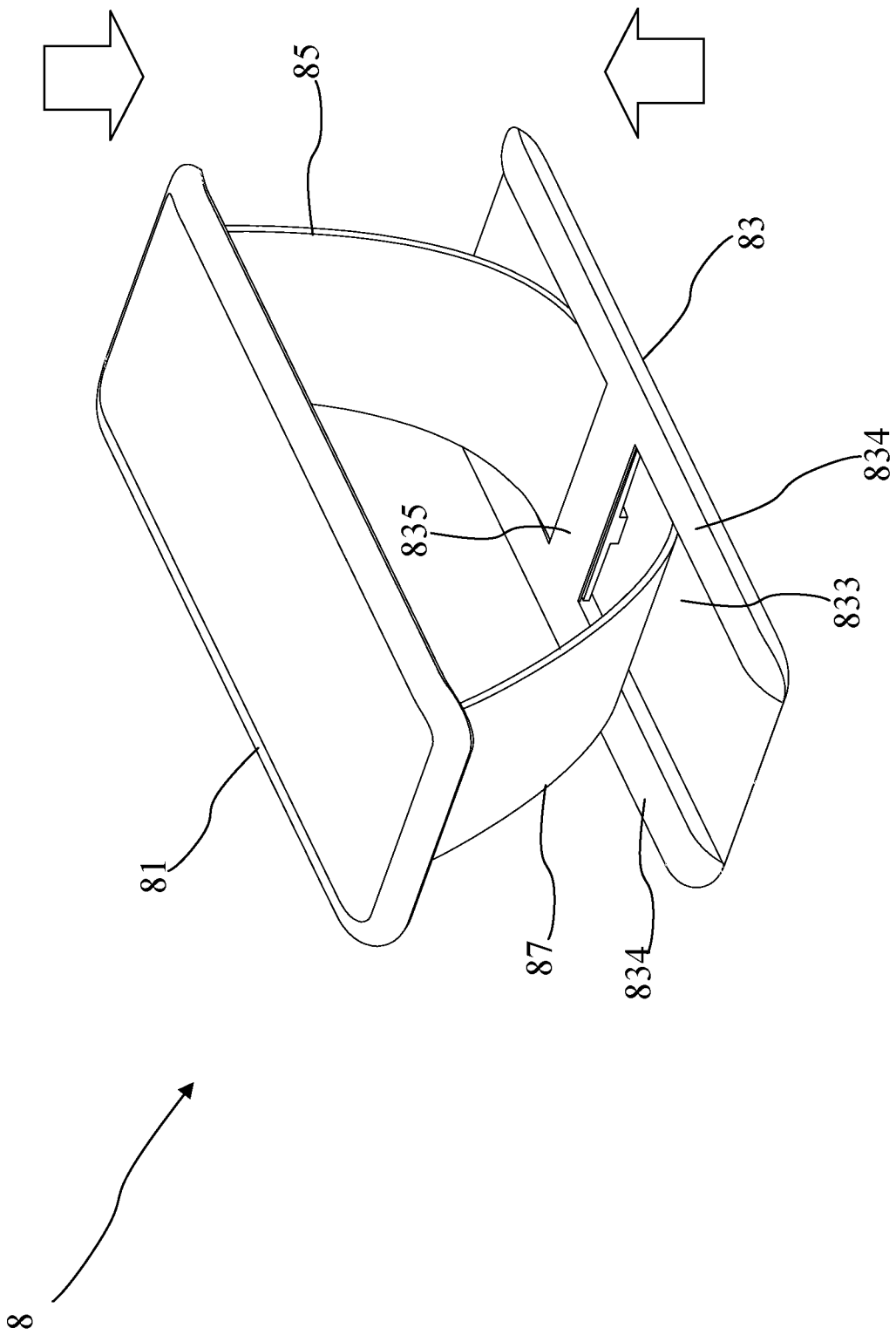

Please also refer to FIG. 8E, which shows another operation schematic diagram of the accessory 8 according to some embodiments of the present invention. In contrast to the above-described operation, when the distance between the first base 81 and the second base 83 decreases (as shown by the arrows), the first base 81 pushes one end of the first flexible element 85 into motion. Since the first flexible element 85 passes through the space 832 defined by the baffle 835 and the body 833, a deformation occurs to the first flexible element 85 for restoring the first flexible element 85 to its original state when one end of the first flexible element 85 moves with the first base 81.

Similarly, when the distance between the first base 81 and the second base 83 increases, the first base 81 pulls one end of the second flexible element 87 into motion. Since the second flexible element 87 passes through the space 832 defined by the baffle 835 and the body 833, as one end of the second flexible element 87 moves with the first base 81, a deformation occurs to the second flexible element 87 as shown in FIG. 8B, and such deformation can maintain the distance between one end of the first base 81 and one end of the second base 83.

In contrast, when the distance between the first base 81 and the second base 83 decreases, the first base 81 pushes one end of the second flexible element 87 into motion. Since the second flexible element 87 passes through the space 832 defined by the baffle 835 and the body 833, a deformation occurs to the second flexible element 87 for restoring the second flexible element 87 to its original state when one end of the second flexible element 87 moves with the first base 81.

In these embodiments, when the distance between the first base 81 and the second base 83 increases, the first fastener 85P of the first flexible element 85 and the second fastener 87P of the second flexible element 87 approach each other during sliding of the first flexible member 85 and the second flexible element 87, and the first fastener 85P and the second fastener 87P can abut in the space 832. As such, as shown in FIG. 8C, the first fastener 85P and the second fastener 87P can be mutually fitted when abutted in the space 832, so as to prevent the first flexible element 85 and the second flexible element 87 from departing the space 832.

Figure 9A:
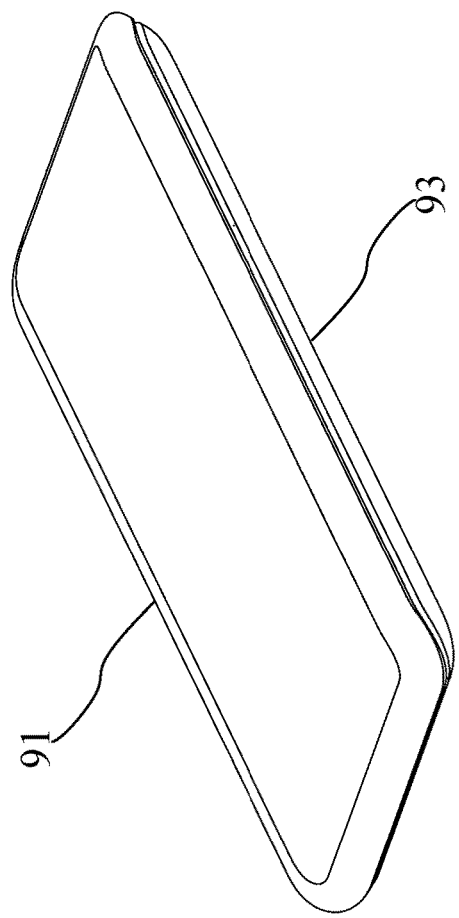
FIG. 9A is a three-dimensional diagram of an accessory according to some embodiments of the present invention.
Figure 9A:
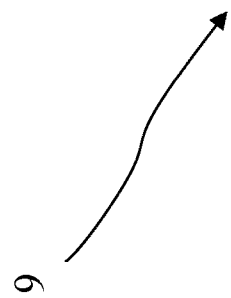
Figure 9B:
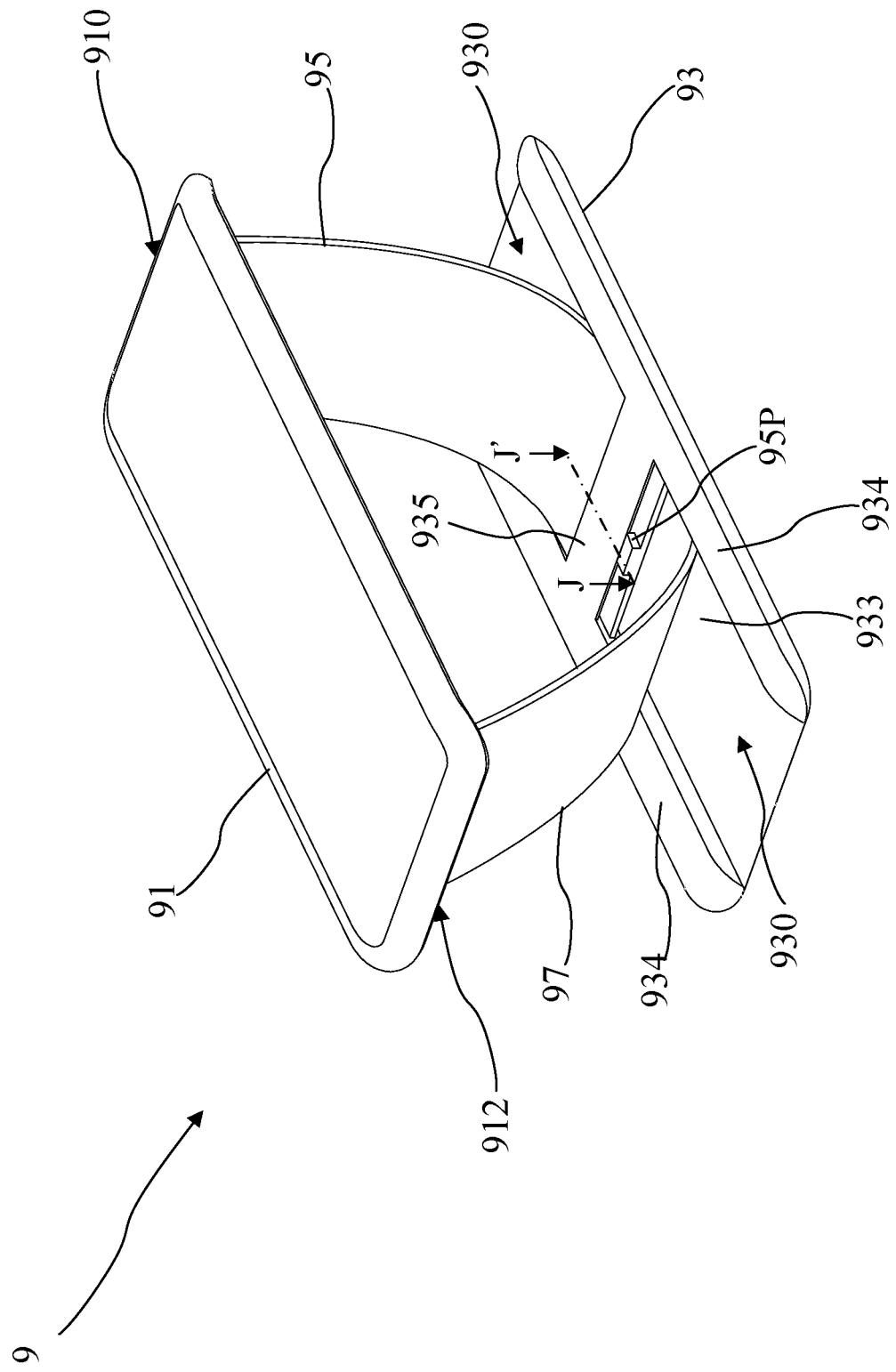
FIG. 9B is a three-dimensional diagram of an accessory according to some embodiments of the present invention.

Please refer to FIGS. 9A and 9B. FIG. 9A shows a three-dimensional diagram of an accessory 9 according to some embodiments of the present invention. FIG. 9B shows another three-dimensional diagram of the accessory 9 according to some embodiments of the present invention. The accessory 9 includes a first base 91, a second base 93, a first flexible element 95 and a second flexible element 97.

Specifically, the first flexible element 95 and the second flexible element 97 are respectively disposed at the first base 91, and are located between the first base 91 and the second base 93. One end of the first flexible element 95 is disposed on one end 910 of the first base 91, and one end of the second flexible element 97 is disposed on another end 912 of the first base 91. The second base 93 has an accommodating space 930, and the first flexible element 95 and the second flexible element 97 are accommodated in the accommodating space 930 when the first base 91 and the second base 93 are adjoining.

Figure 9C:
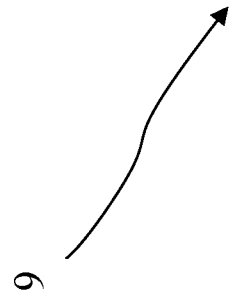
FIG. 9C is a three-dimensional diagram of a second base according to some embodiments of the present invention.
Figure 9C:
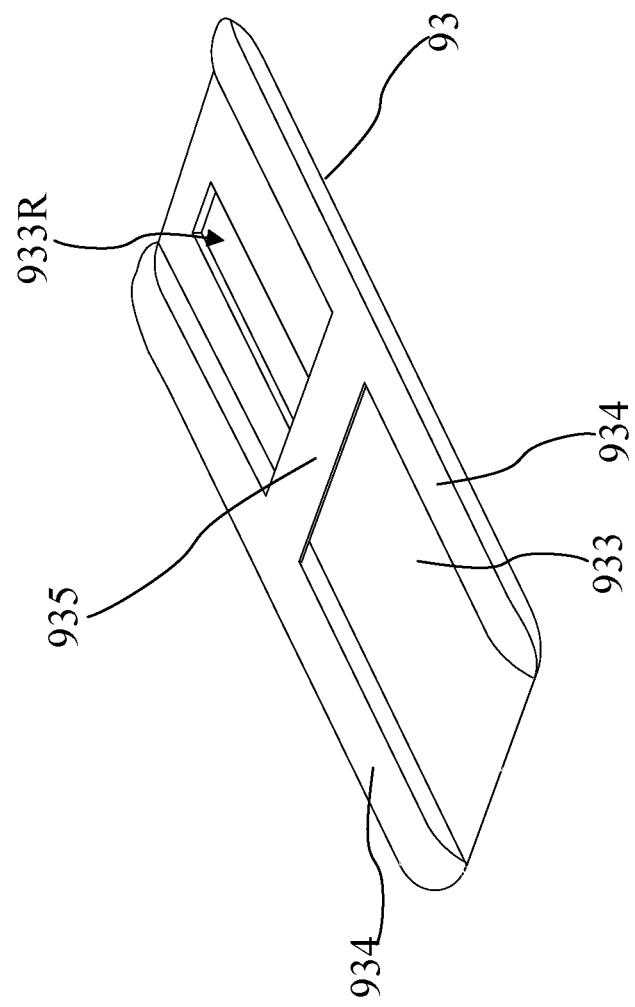
Figure 9D:
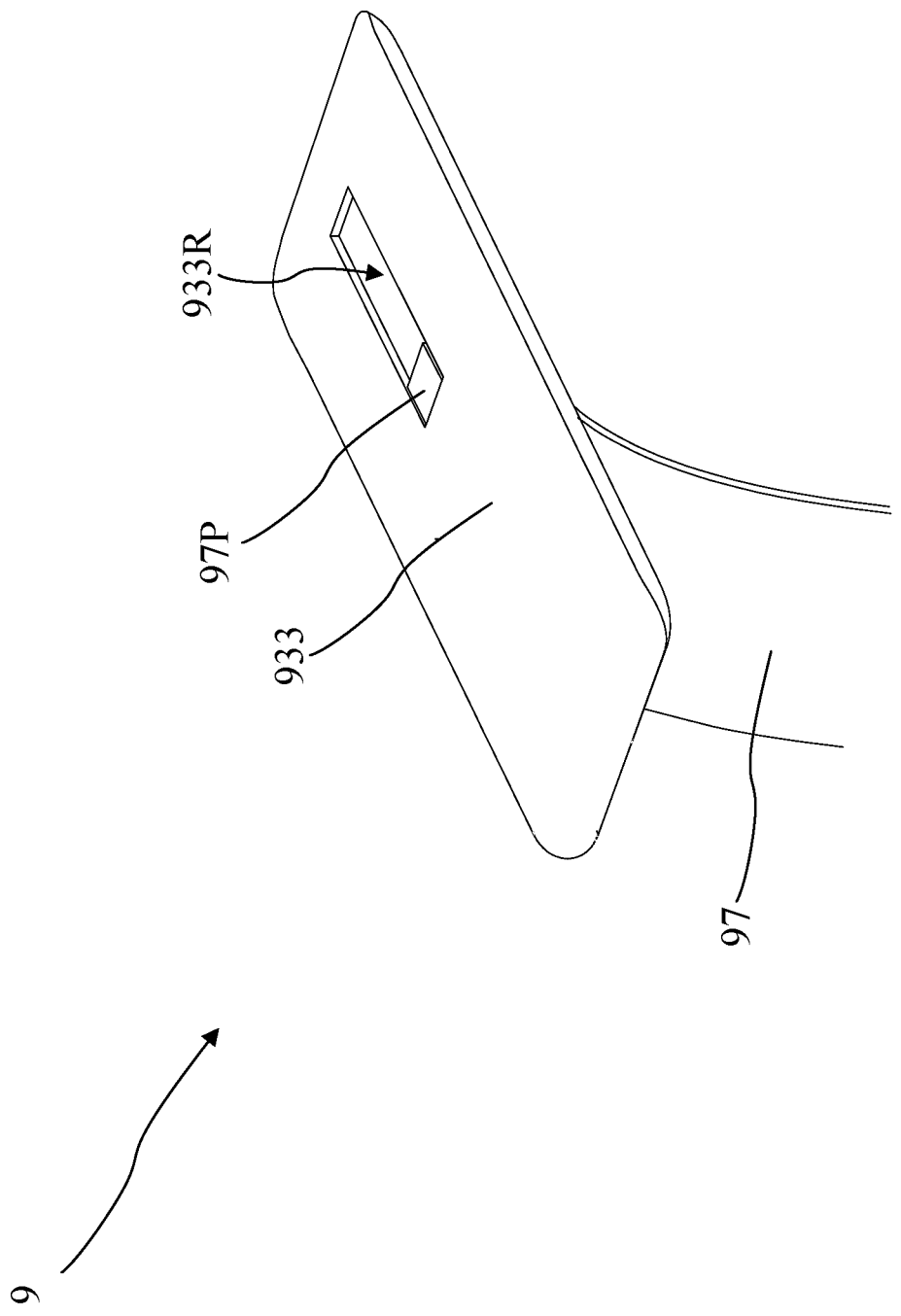
FIG. 9D is a three-dimensional diagram of a second base engaged with a second flexible element according to some embodiments of the present invention.
Figure 9E:
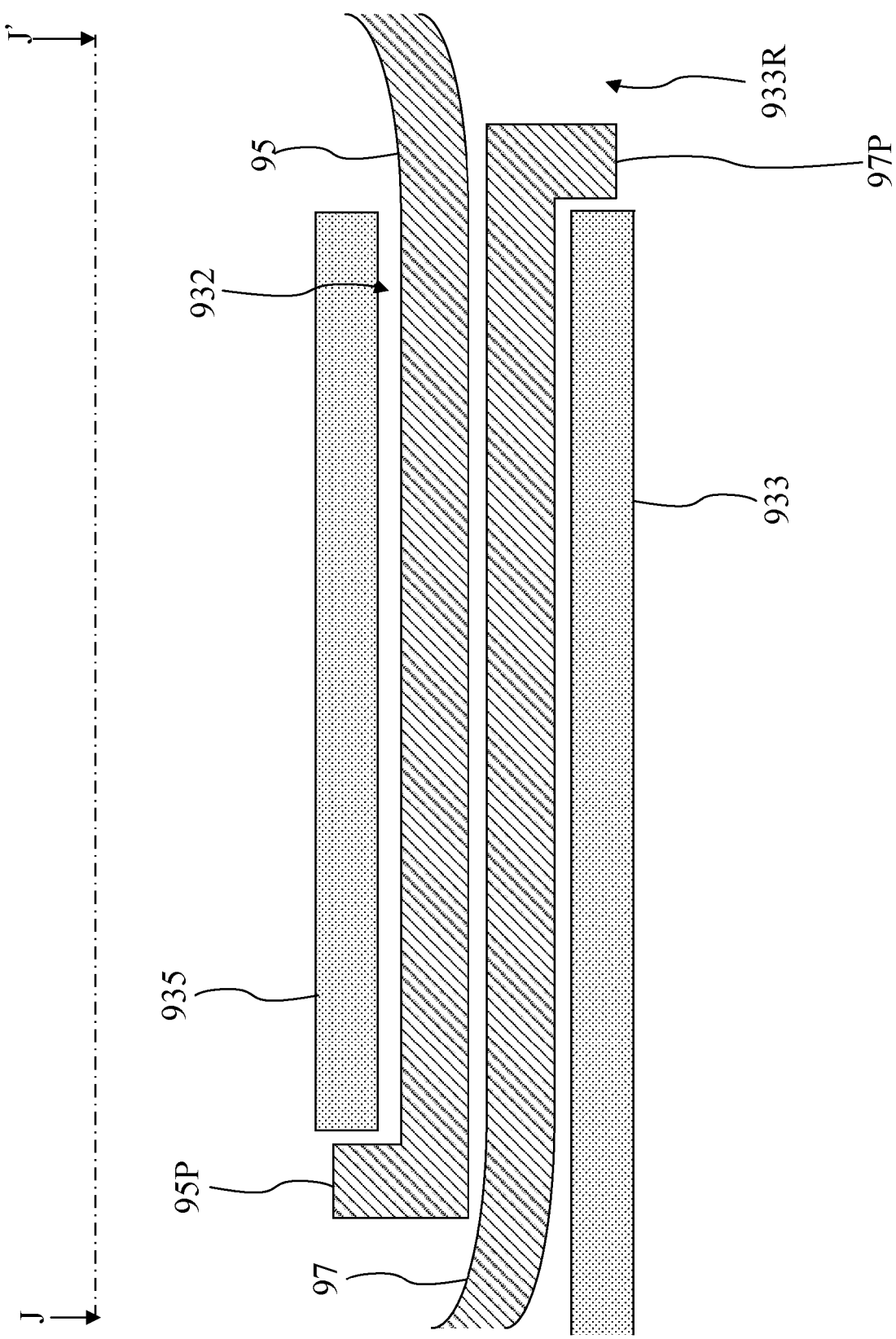
FIG. 9E is a cross-sectional diagram of an accessory according to some embodiments of the present invention.

Please refer to FIGS. 9C to 9E. FIG. 9C shows a three-dimensional diagram of the second base 93 according to some embodiments of the present invention. FIG. 9D shows a three-dimensional diagram of the second base 93 engaged with the second flexible element 97 according to some embodiments of the present invention. FIG. 9E is a cross-sectional diagram of the accessory 9 taken along a section line J-J' in FIG. 9B. Specifically, the second base 93 has a body 933, two sidewalls 934 and a baffle 935. The two sidewalls 934 are disposed at an interval at a top portion of the body 933 and together with the body 933 form the accommodating space 930. The baffle 935 bridges the two sidewalls 934, and the baffle 935 and the body 933 together define a space 932. The first flexible element 95 and the second flexible element 97 pass through the space 932.

In the space 932, the first flexible element 95 is located between the baffle 935 and the second flexible element 97, and the second flexible element 97 is located between the first flexible element 95 and the body 933. Relative to one end of the first flexible element 95 disposed at the first base 91, another end of the first flexible element 95 has a first fastener 95P protruding in a direction toward the baffle 935. Relative to one end of the second flexible element 97 disposed at the first base 91, another end of the second flexible element 97 has a second fastener 97P protruding in a direction toward the body 933. The body 933 has a track 933R for engaging with the second fastener 97P. The track 933R may include a hollow portion formed in the body 933 or a groove formed in the body 933. In these embodiments, the track 933R is formed at a hollow portion of the body 933.

Figure 9F:
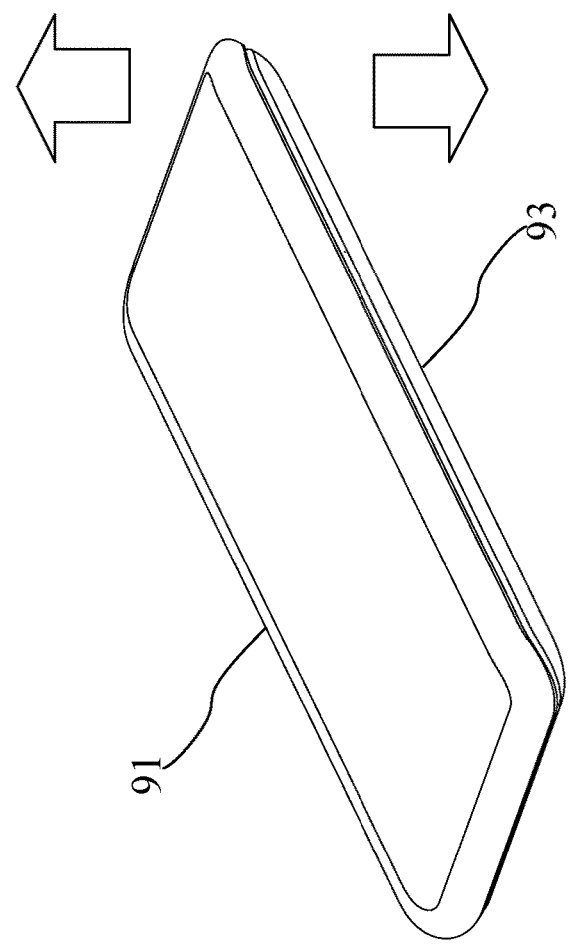
FIGS. 9F and 9G are operation schematic diagrams of an accessory according to some embodiments of the present invention.

Please refer to FIG. 9F, which shows an operation schematic diagram of the accessory 9 according to some embodiments of the present invention. Specifically, when a distance between the first base 91 and the second base 93 increases (as shown by the arrows), the first base 91 pulls one end of the first flexible element 95 into motion. Since the first flexible element 95 passes through the space 932 defined by the baffle 935 and the body 933, as one end of the first flexible element 95 moves with the first base 91, a deformation occurs to the first flexible element 95 as shown in FIG. 9B, and such deformation can maintain a distance between one end of the first base 91 and one end of the second base 93.

In these embodiments, as the distance between the first base 91 and the second base 93 increases, the first fastener 95P of the first flexible element 95 approaches the baffle 935 during sliding of the first flexible element 95 in the space 932. As such, as shown in FIG. 9B, the first fastener 95P protruding in the direction toward the baffle 935 abuts against the baffle 935 on a side of the baffle 935, so as to prevent the first flexible element 95 from departing the space 932.

Figure 9G:
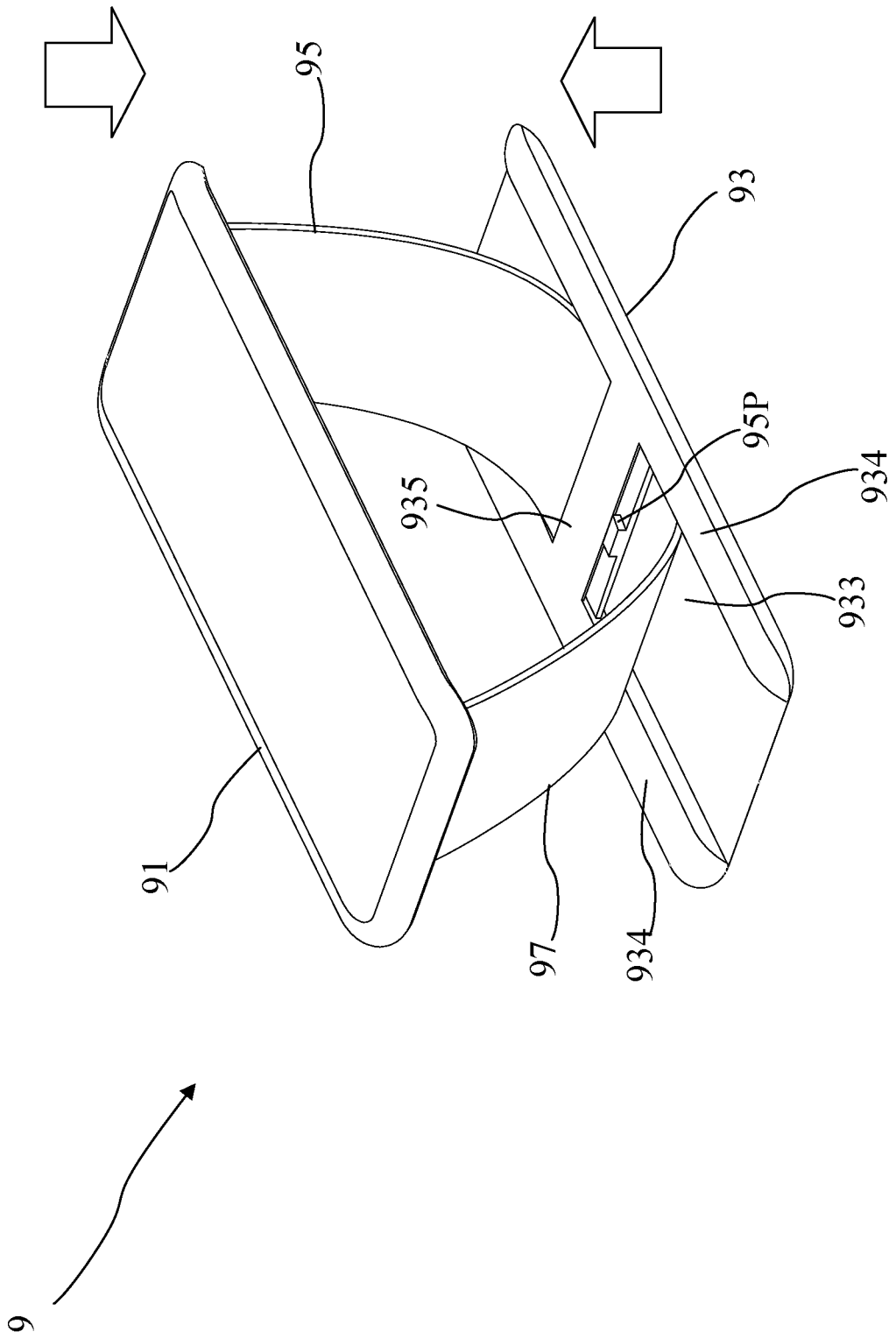

Please also refer to FIG. 9G, which shows another operation schematic diagram of the accessory 9 according to some embodiments of the present invention. In contrast to the above-described operation, when the distance between the first base 91 and the second base 93 decreases (as shown by the arrows), the first base 91 pushes one end of the first flexible element 95 into motion. Since the first flexible element 95 passes through the space 932 defined by the baffle 935 and the body 933, a deformation occurs to the first flexible element 95 for restoring the first flexible element 95 to its original state when one end of the first flexible element 95 moves with the first base 91.

Similarly, when the distance between the first base 91 and the second base 93 increases, the first base 91 pulls one end of the second flexible element 97 into motion. Since the second flexible element 97 passes through the space 932 defined by the baffle 935 and the body 933, as one end of the second flexible element 97 moves with the first base 91, a deformation occurs to the second flexible element 97 as shown in FIG. 9B, and such deformation can maintain the distance between one end of the first base 91 and one end of the second base 93.

In these embodiments, when the distance between the first base 91 and the second base 93 increases, the second fastener 97P of the second flexible element 97 approaches one end of the track 933R along the track 933R during sliding of the second flexible element 97 in the space 932. As such, as shown in FIG. 9D, the second fastener 97P protruding in the direction toward the body 933 abuts against one end of the track 933R on the track 933R, so as to prevent the second flexible element 97 from departing the space 932.

In contrast, when the distance between the first base 91 and the second base 93 decreases, the first base 91 pushes one end of the second flexible element 97 into motion. Since the second flexible element 97 passes through the space 932 defined by the baffle 935 and the body 933, when one end of the second flexible element 97 moves with the first base 91, a deformation occurs to the second flexible element 97 for restoring the second flexible element 97 to its original state and the second fastener 97P slides toward another end of the track 933R along the track 933R.

Figure 10A:
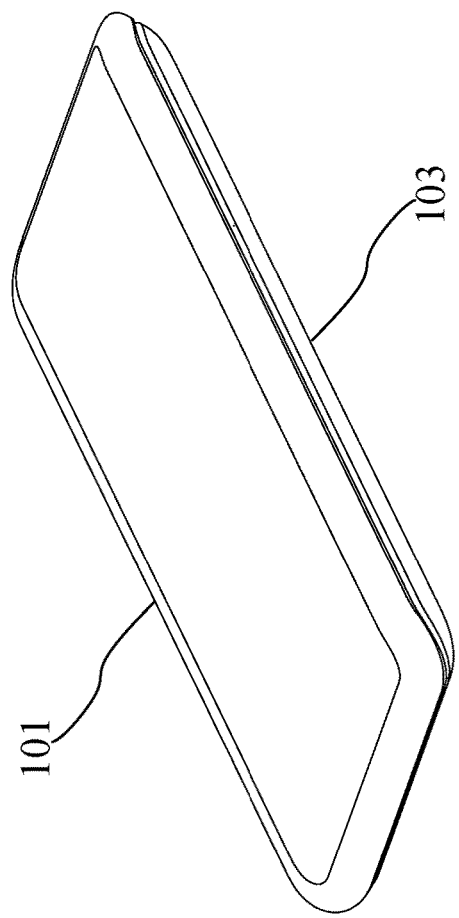
FIG. 10A is a three-dimensional diagram of an accessory according to some embodiments of the present invention.
Figure 10B:
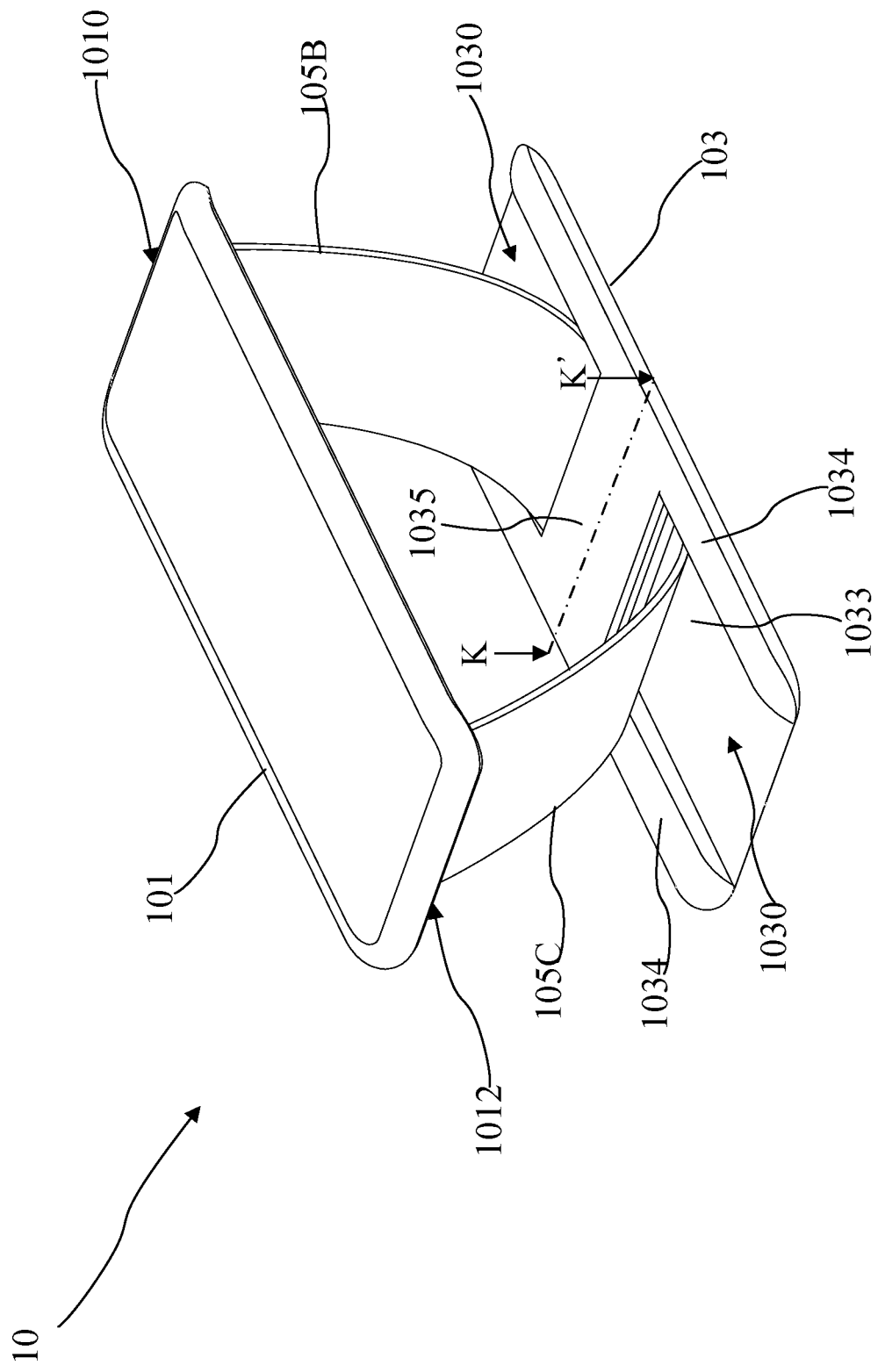
FIG. 10B is a three-dimensional diagram of an accessory according to some embodiments of the present invention.
Figure 10C:
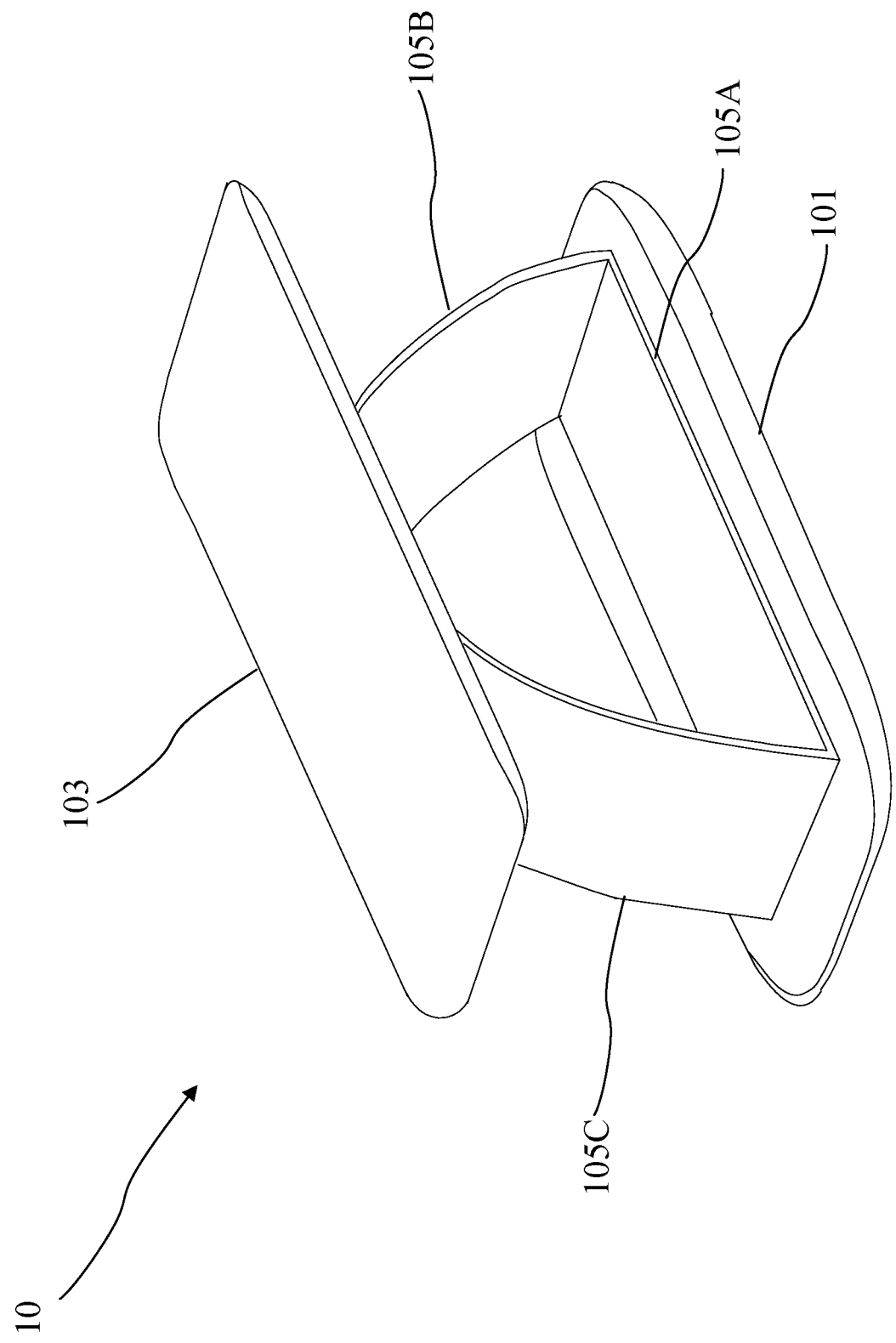
FIG. 10C is a three-dimensional diagram of an accessory from another angle according to some embodiments of the present invention.

Please refer to FIGS. 10A to 10C. FIG. 10A shows a three-dimensional diagram of an accessory 10 according to some embodiments of the present invention. FIG. 10B shows another three-dimensional diagram of the accessory 10 according to some embodiments of the present invention. FIG. 10C shows a three-dimensional diagram of the accessory 10 from another angle according to some embodiments of the present invention. The accessory 10 includes a first base 101, a second base 103 and a support assembly. The support assembly includes a support body 105A, a first flexible element 105B and a second flexible element 105C. The support assembly is disposed at the first base 101, and is located between the first base 101 and the second base 103.

Specifically, the support body 105A is disposed at the first base 51, the first flexible element 105B is connected to one end of the support body 105A, and the second flexible element 105C is connected to another end of the support body 105A. The second base 103 has an accommodating space 1030, and the first flexible element 105B and the second flexible element 105C are accommodated in the accommodating space 1030 when the first base 101 and the second base 103 are adjoining.

Figure 10D:
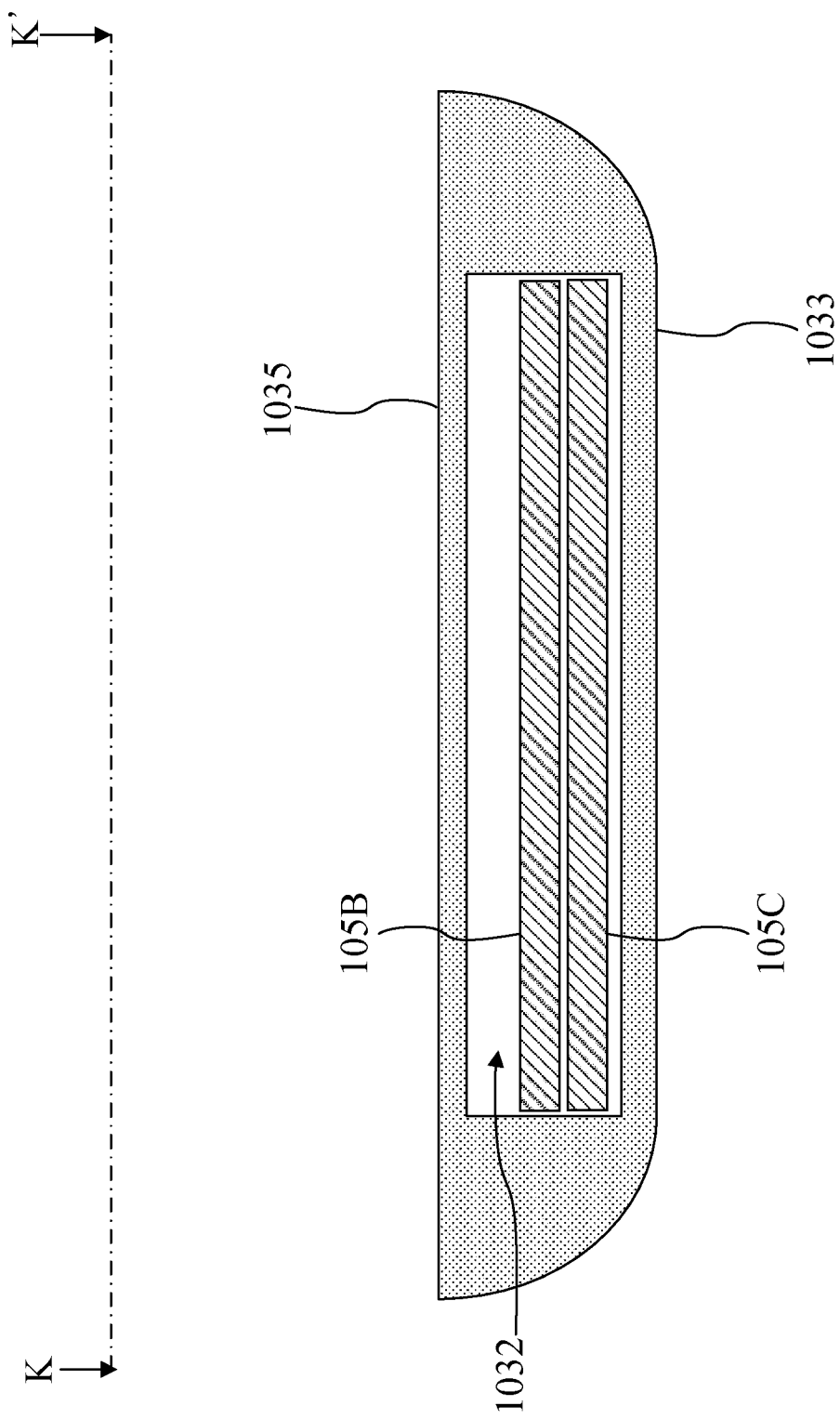
FIG. 10D is a cross-sectional diagram of an accessory according to some embodiments of the present invention.

Please also refer to FIG. 10D, which shows a cross-sectional diagram of the accessory 10 taken along a section line K-K' in FIG. 10B. Specifically, the second base 103 has a base body 1033, two sidewalls 1034 and a baffle 1035. The two sidewalls 1034 are disposed at an interval at a top portion of the base body 1033 and together with the base body 1033 form the accommodating space 1030. The baffle 1035 bridges the two sidewalls 1034, and the baffle 1035 and the base body 1033 together define a space 1032. The first flexible element 105B and the second flexible element 105C pass through the space 1032. The first flexible element 105B and the second flexible element 105C are flexed based on a change of a distance between the first base 101 and the second base 103.

Figure 10E:
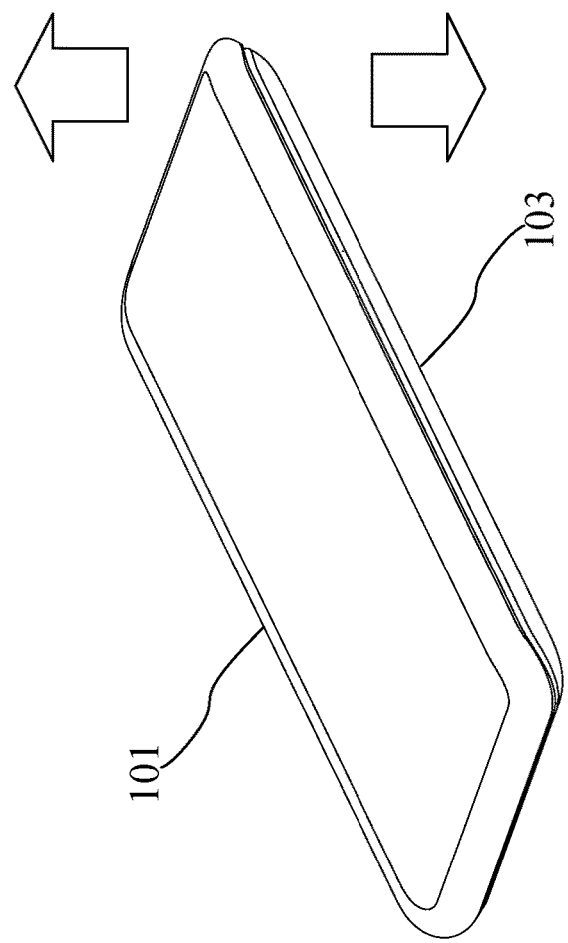
FIGS. 10E and 10F are operation schematic diagrams of an accessory according to some embodiments of the present invention.
Figure 10E:
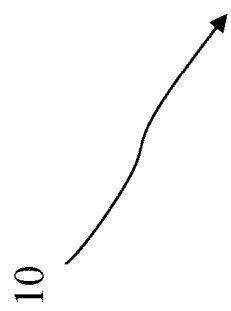

Please also refer to FIG. 10E, which shows an operation schematic diagram of the accessory 10 according to some embodiments of the present invention. Specifically, when the distance between the first base 101 and the second base 103 increases (as shown by the arrows), the first base 101 pulls one end of the first flexible element 105B into motion. Since the first flexible element 105B passes through the space 1032 defined by the baffle 1035 and the base body 1033, as one end of the first flexible element 105B moves with the first base 101, a deformation occurs to the first flexible element 105B as shown in FIG. 10B, and such deformation can maintain a distance between one end of the first base 101 and one end of the second base 103.

Figure 10F:
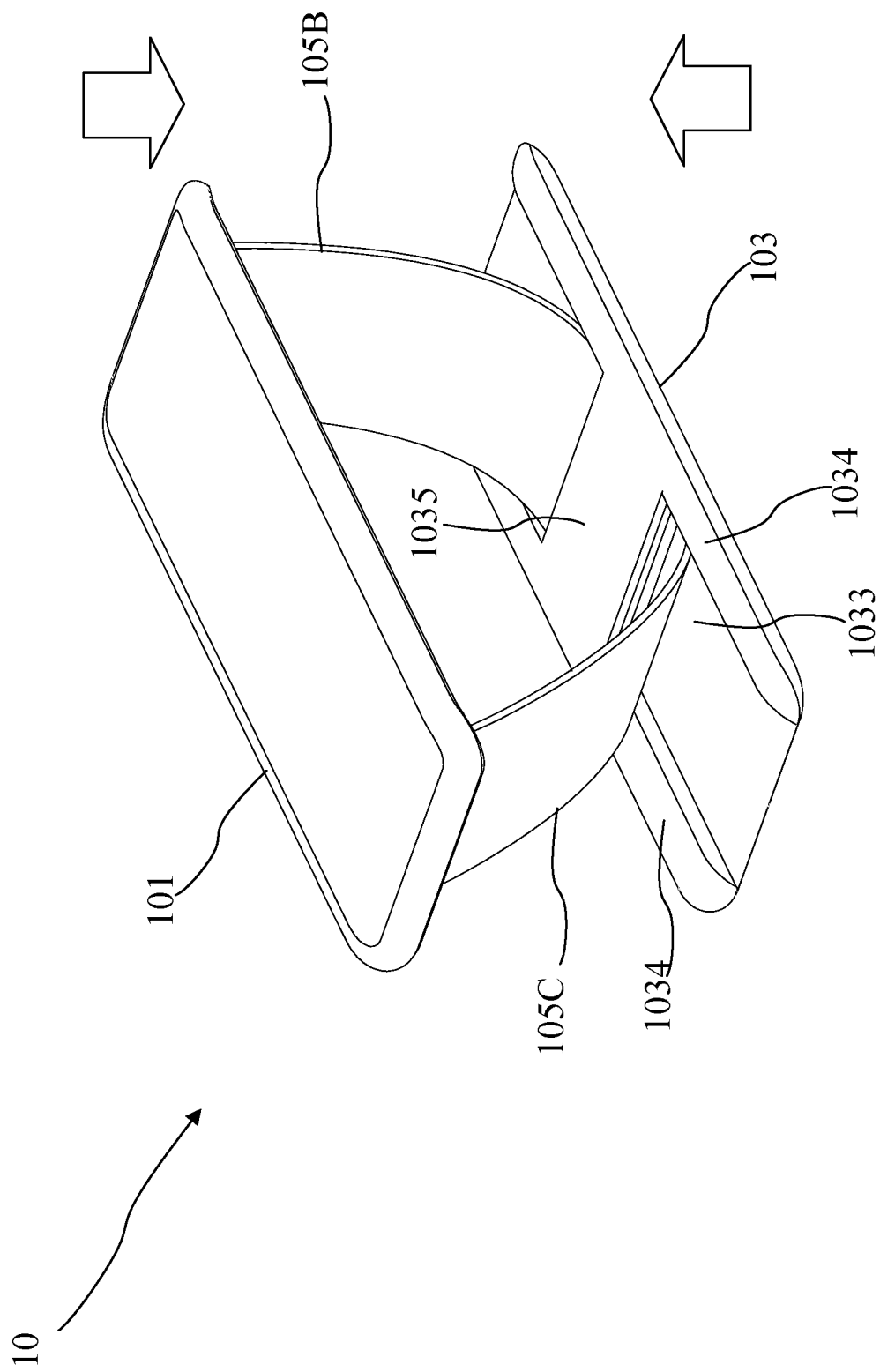

Please also refer to FIG. 10F, which shows another operation schematic diagram of the accessory 10 according to some embodiments of the present invention. In contrast to the above-described operation, when the distance between the first base 101 and the second base 103 decreases (as shown by the arrows), the first base 101 pushes one end of the first flexible element 105B into motion. Since the first flexible element 105B passes through the space 1032 defined by the baffle 1035 and the base body 1033, a deformation occurs to the first flexible element 105B for restoring the first flexible element 105B to its original state when one end of the first flexible element 105B moves with the first base 101.

Similarly, when the distance between the first base 101 and the second base 103 increases, the first base 101 pulls one end of the second flexible element 105C into motion. Since the second flexible element 105C passes through the space 1032 defined by the baffle 1035 and the base body 1033, as one end of the second flexible element 105C moves with the first base 101, a deformation occurs to the second flexible element 105C as shown in FIG. 10B, and such deformation can maintain the distance between one end of the first base 101 and one end of the second base 103.

In contrast, when the distance between the first base 101 and the second base 103 decreases, the first base 101 pushes one end of the second flexible element 105C into motion. Since the second flexible element 105C passes through the space 1032 defined by the baffle 1035 and the base body 1033, a deformation occurs to the second flexible element 105C for restoring the second flexible element 105C to its original state when one end of the second flexible element 105C moves with the first base 101.

In some embodiments, the support body 105A, the first flexible element 105B and the second flexible element 105C may be independent components. In some embodiments, the support body 105A, the first flexible element 105B and the second flexible element 105C may be integrally formed.

Figure 10G:
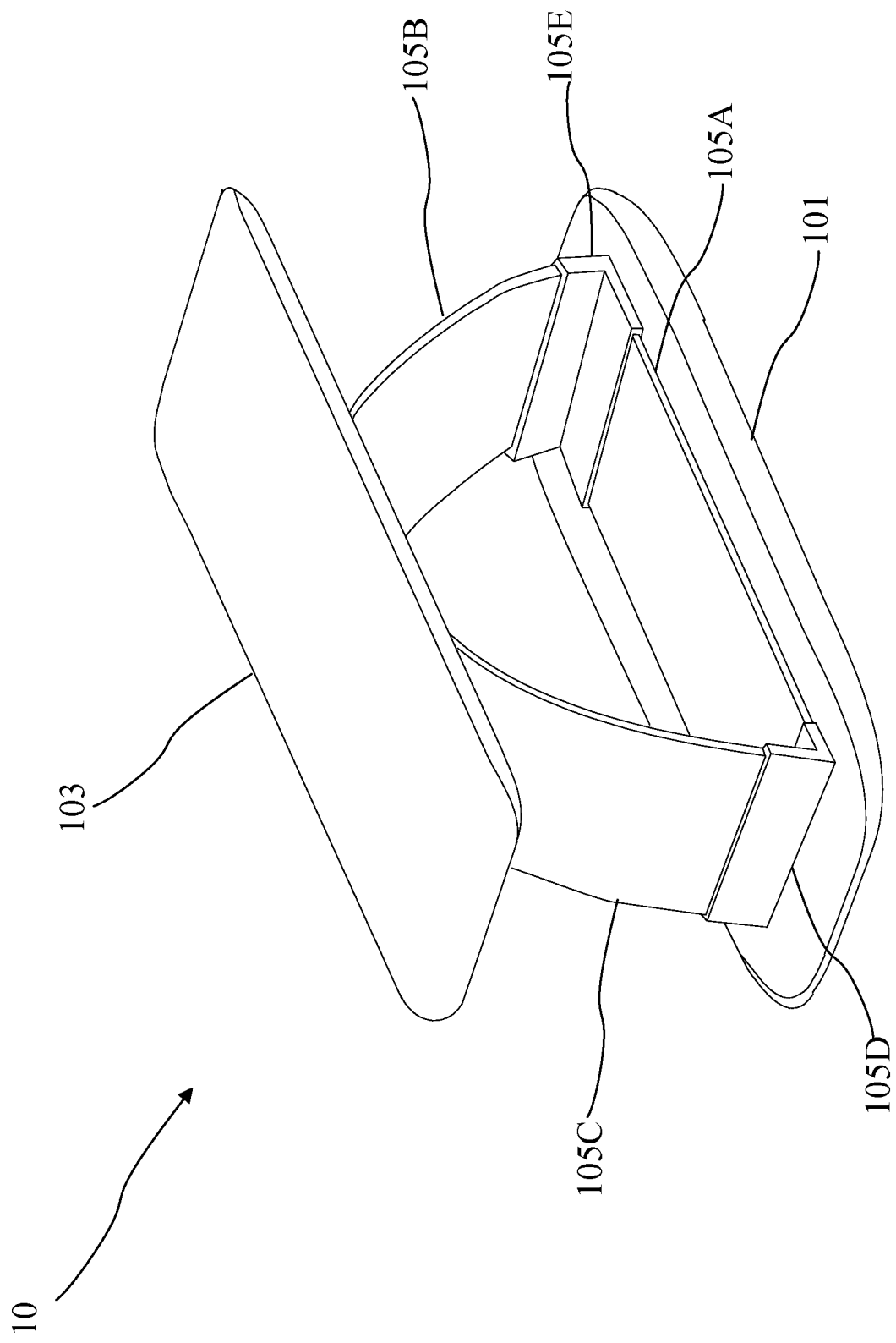
FIG. 10G is a three-dimensional diagram of an accessory according to some embodiments of the present invention.

In some embodiments, as shown in FIG. 10G, the support assembly further includes a first connecting element 105D and a second connecting element 105E. The second connecting element 105E covers a joint between the first flexible element 105B and the support body 105A, and the first connecting element 105D covers a joint between the second flexible element 105C and the support body 105A, so as to reinforce the connection strength of the first flexible element 105B and the second flexible element 105C with the support body 105A. In some implementation examples, the connecting elements 105D and 105E may include flexible strip elements, for example, adhesive tape.

Figure 10H:
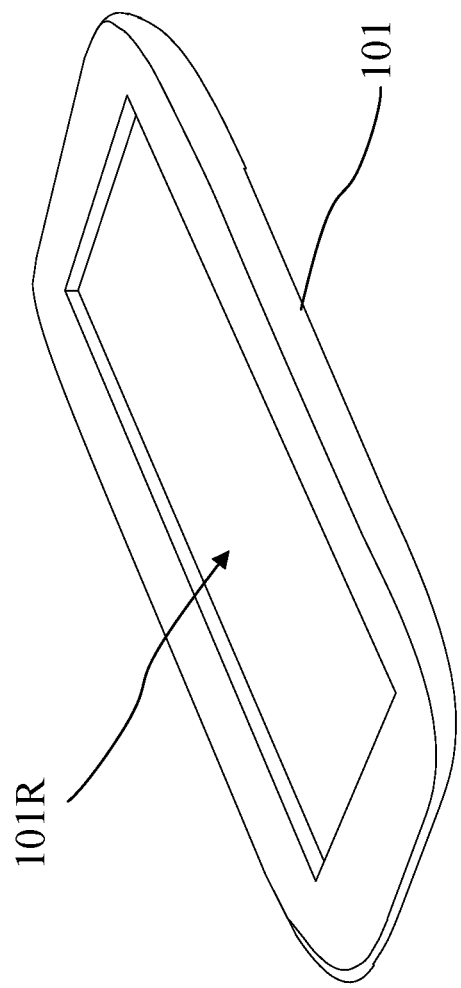
FIG. 10H is a three-dimensional diagram of a first base according to some embodiments of the present invention.
Figure 10I:
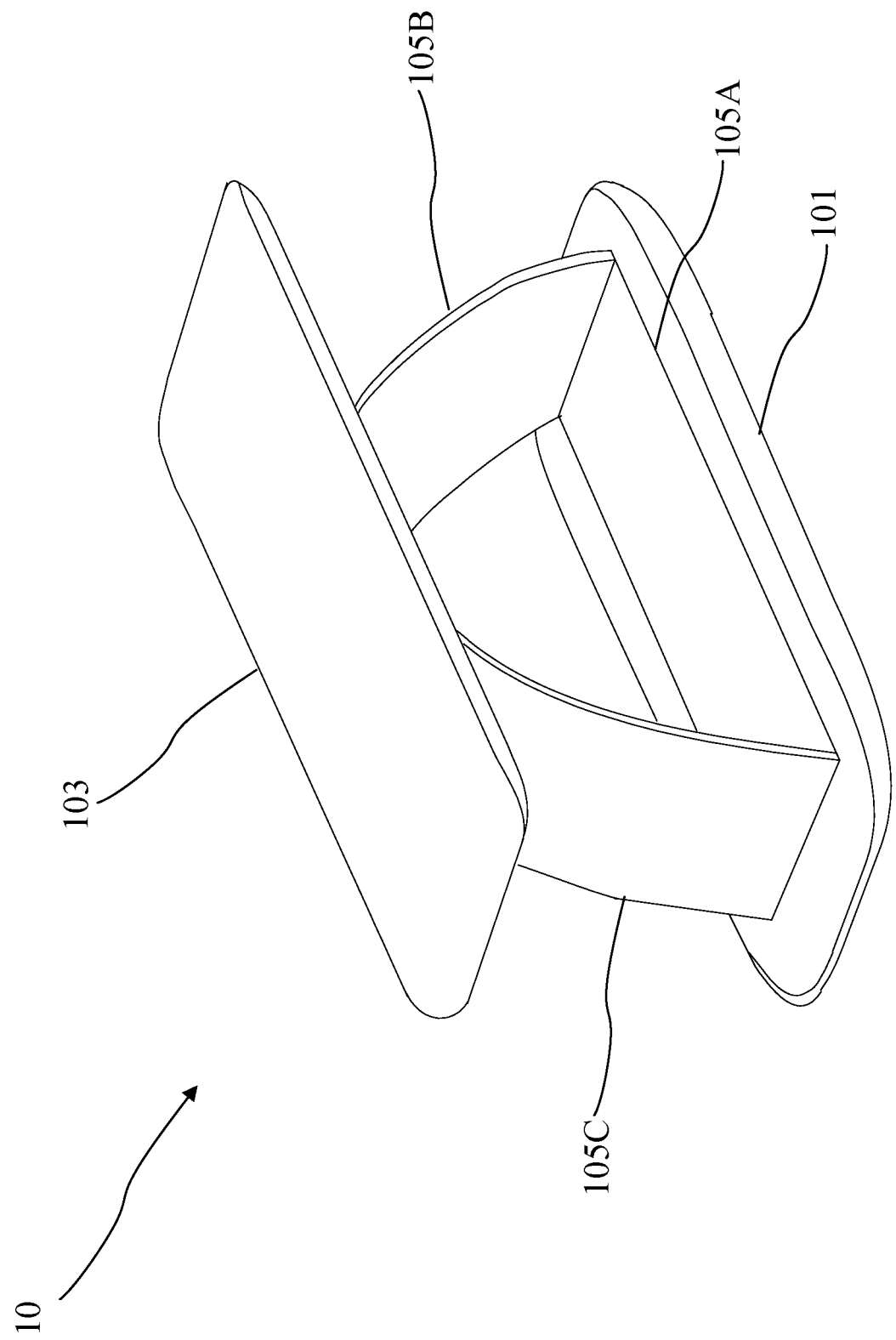
FIG. 10I is a three-dimensional diagram of an accessory according to some embodiments of the present invention.
Figure 11:
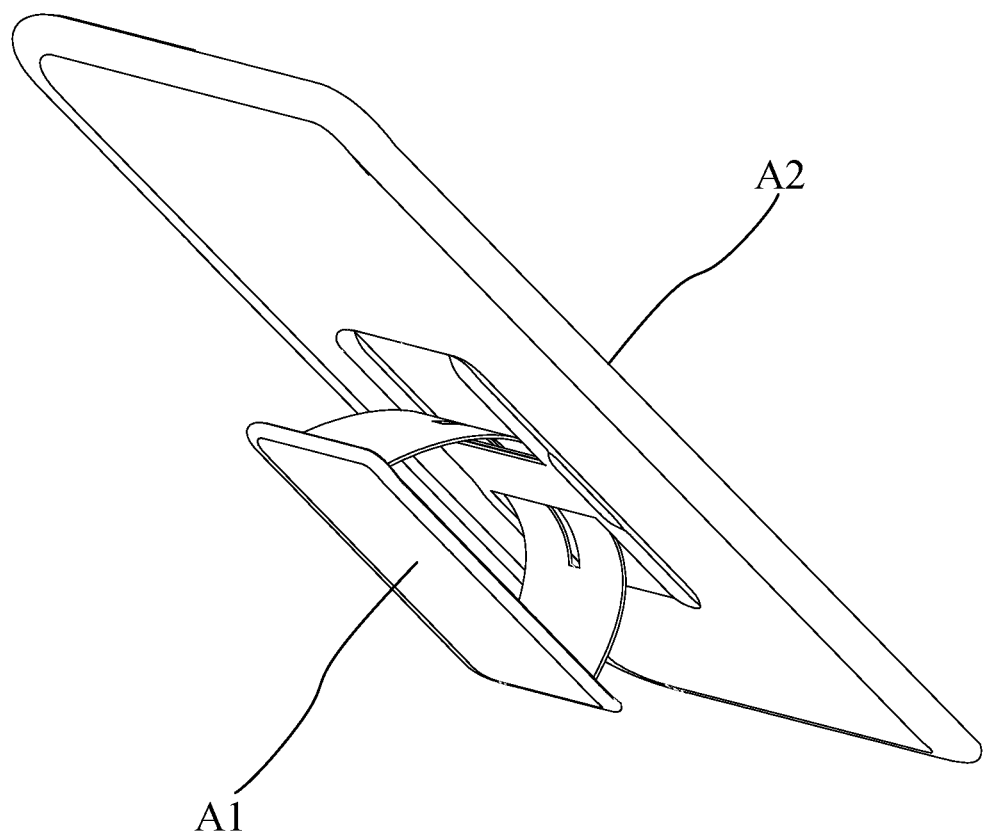
FIG. 11 is a schematic diagram of an accessory attached to a handheld device according to some embodiments of the present invention.

In some embodiments, as shown in FIG. 10H and FIG. 10I, the first base 101 may include a groove 101R for accommodating the support body 105A of the support assembly. In other words, when the support assembly is disposed at the first base 101, the support body 105A is disposed in the groove 101R of the first base 101, so that the first base 101 and the second base 103 can be more closely engaged while adjoining each other.

It should be noted that the fastener of the accessory of the present invention may include one or more fasteners, the track may include one or more tracks corresponding to the number of the fastener(s), and the values given in the embodiments above are not to impose limitations on the numbers of the track(s) or fastener(s).

The embodiments above are merely examples of implementation forms of the disclosure to explain the technical features of the disclosure, and are not to be construed as limitations to the scope of protection of the disclosure. Any changes or equivalent arrangements that could be easily accomplished by a person skilled in the art are encompassed within the scope of the disclosure, and the scope of protection of the disclosure shall be defined by the appended claims.

What is claimed is:

1. An accessory for a handheld device, comprising:
   a first base;

a first flexible element and a second flexible element, respectively disposed at the first base; and a second base, having a body and a baffle, wherein the body and the baffle define at least one space therebetween, and the first flexible element and the second flexible element mutually overlap and pass through the at least one space;

wherein the first flexible element and the second flexible element are flexed based on a change of a distance between the first base and the second base.

2. The accessory according to claim 1, wherein the at least one space comprises a first space and a second space, and the first flexible element and the second flexible element respectively pass through the first space and the second space.

3. An accessory for a handheld device, comprising:
a first base;
a support assembly, comprising:
   a support body, disposed at the first base;
   a first flexible element, connected to one end of the support body; and
   a second flexible element, connected to another end of the support body; and
a second base, having a base body and a baffle, wherein the base body and the baffle define a space therebetween, and the first flexible element and the second flexible element mutually overlap and pass through the space;
wherein the first flexible element and the second flexible element are flexed based on a change of a distance between the first base and the second base.

4. The accessory according to claim 3, wherein the support assembly further comprises:

a first connecting element, covering a joint between the first flexible element and the support body; and
a second connecting element, covering a joint between the second flexible element and the support body.

5. An accessory for a handheld device, comprising:
a first base;
a first flexible element and a second flexible element, wherein the first flexible element is disposed on one end of the first base and the second flexible element is disposed on another end of the first base; and
a second base, having a body and a baffle, wherein the baffle bridges two parallel sidewalls of the second base, the body and the baffle define at least one space therebetween, and the first flexible element and the second flexible element pass through the at least one space;
wherein the first flexible element and the second flexible element are flexed based on a change of a distance between the first base and the second base.

6. An accessory for a handheld device, comprising: a first base; a first flexible element and a second flexible element, wherein the first flexible element is disposed on one end of the first base and the second flexible element is disposed on another end of the first base; and a second base, having a body and a baffle, wherein the baffle bridges two sidewalls of the second base, the body and the baffle define at least one space therebetween, and the first flexible element and the second flexible element pass through the at least one space; wherein the first flexible element and the second flexible element are flexed based on a change of a distance between the first base and the second base; and at least one opening through the sidewall that communicates with the space.

* * * * *